(12) United States Patent
Li et al.

(10) Patent No.: US 11,765,463 B2
(45) Date of Patent: Sep. 19, 2023

(54) MULTI-CHANNEL VIDEO RECORDING METHOD AND DEVICE

(71) Applicant: HONOR DEVICE CO., LTD., Shenzhen (CN)

(72) Inventors: Yuanyou Li, Shenzhen (CN); Wei Luo, Shenzhen (CN); Jieguang Huo, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/440,406

(22) PCT Filed: Feb. 24, 2020

(86) PCT No.: PCT/CN2020/076409
§ 371 (c)(1),
(2) Date: Sep. 17, 2021

(87) PCT Pub. No.: WO2020/186969
PCT Pub. Date: Sep. 24, 2020

(65) Prior Publication Data
US 2022/0159183 A1    May 19, 2022

(30) Foreign Application Priority Data
Mar. 18, 2019   (CN) .......................... 201910205090.0

(51) Int. Cl.
*H04N 23/698*   (2023.01)
*H04N 5/77*     (2006.01)
(Continued)

(52) U.S. Cl.
CPC .......... *H04N 23/698* (2023.01); *H04N 5/772* (2013.01); *H04N 23/62* (2023.01); *H04N 23/632* (2023.01);
(Continued)

(58) Field of Classification Search
CPC ....... H04N 5/232933; H04N 5/232939; H04N 5/23222; H04N 5/265; H04N 5/23245;
(Continued)

(56) References Cited

U.S. PATENT DOCUMENTS 7,663,662 B2 *  2/2010  Miller .................... H04N 23/11
                                                         250/330
8,823,857 B2    9/2014  Kazama
(Continued)

FOREIGN PATENT DOCUMENTS

CN      103907338 A    7/2014
CN      103916582 A    7/2014
(Continued)

OTHER PUBLICATIONS

Samsung: "User Manual—Samsung SM-N9005 (Galaxy Note 3)," Sep. 1, 2013 (Sep. 1, 2013), pp. 1-177, XP055902820.

*Primary Examiner* — Pritham D Prabhakher
(74) *Attorney, Agent, or Firm* — WOMBLE BOND DICKINSON (US) LLP

(57) ABSTRACT

A multi-channel video recording method comprises: starting, by an electronic device, a camera; acquiring images by using a first camera lens and a second camera lens in a plurality of camera lenses; displaying a preview interface, where the preview interface includes a first image and a second image; the first image is an image acquired by the first camera lens, the second image is from the second camera lens, and the second image corresponds to a central area of an image acquired by the second camera lens; and the first image is located in a first area in the preview interface, and the second image is located in a second area in the preview interface; starting video recording after detecting a video recording instruction operation of a user; and display-
(Continued)

ing a shooting screen, where the shooting screen includes the first area and the second area.

20 Claims, 39 Drawing Sheets

(51) Int. Cl.
  *H04N 23/62* (2023.01)
  *H04N 23/63* (2023.01)
  *H04N 23/667* (2023.01)
  *H04N 23/68* (2023.01)
(52) U.S. Cl.
  CPC ......... *H04N 23/635* (2023.01); *H04N 23/667* (2023.01); *H04N 23/683* (2023.01); *H04N 23/6812* (2023.01); *H04M 2250/22* (2013.01)
(58) Field of Classification Search
  CPC ........... H04N 5/23254; H04N 5/23238; H04N 5/772; H04N 5/23267; H04N 5/2258; H04N 5/23258; H04N 5/232945; H04N 5/23216; H04N 5/232935; G06T 5/002; H04M 2250/22
  See application file for complete search history.

(56) References Cited

U.S. PATENT DOCUMENTS

| | | | |
|---|---|---|---|
| 8,922,695 B2 | 12/2014 | He et al. | |
| 9,185,286 B2* | 11/2015 | Na | H04N 23/73 |
| 9,325,903 B2* | 4/2016 | Kim | H04N 23/631 |
| 9,497,380 B1 | 11/2016 | Jannard et al. | |
| 9,641,762 B2* | 5/2017 | Sakai | H04N 23/54 |
| 9,769,365 B1* | 9/2017 | Jannard | H04N 23/698 |
| 10,015,400 B2* | 7/2018 | Kim | H04N 23/6811 |
| 10,122,931 B2 | 11/2018 | Bernstein et al. | |
| 10,318,574 B1* | 6/2019 | Bonechi | G06F 16/447 |
| 10,423,194 B2* | 9/2019 | Lee | G02B 13/06 |
| 10,469,767 B2* | 11/2019 | Shikata | H04N 5/2628 |
| 10,511,757 B2* | 12/2019 | Yoshizawa | H04N 23/661 |
| 10,819,911 B2* | 10/2020 | Ryu | H04N 23/69 |
| 11,012,639 B2* | 5/2021 | Kim | H04N 5/272 |
| 2006/0175549 A1 | 8/2006 | Miller et al. | |
| 2011/0012812 A1 | 1/2011 | Onda et al. | |
| 2012/0268641 A1* | 10/2012 | Kazama | H04N 23/45 348/E5.051 |
| 2013/0120602 A1* | 5/2013 | Huang | H04M 1/72403 348/E5.024 |
| 2014/0192212 A1* | 7/2014 | He | G03B 17/17 399/296 |
| 2014/0232904 A1 | 8/2014 | Na et al. | |
| 2014/0232921 A1* | 8/2014 | Kim | H04N 23/631 348/333.05 |
| 2014/0253693 A1 | 9/2014 | Shikata et al. | |
| 2015/0163409 A1* | 6/2015 | Sakai | H04N 23/635 348/333.03 |
| 2015/0237268 A1* | 8/2015 | Vaiaoga | H04N 23/90 348/218.1 |
| 2017/0034449 A1 | 2/2017 | Eum et al. | |
| 2017/0244879 A1* | 8/2017 | Bezjian | H04N 23/45 |
| 2018/0063434 A1* | 3/2018 | Seol | G06V 40/197 |
| 2018/0121082 A1 | 5/2018 | Zhu et al. | |
| 2018/0131876 A1* | 5/2018 | Bernstein | H04N 23/90 |
| 2018/0196472 A1* | 7/2018 | Lee | G06F 3/0488 |
| 2018/0278836 A1 | 9/2018 | Siminoff et al. | |
| 2019/0045135 A1 | 2/2019 | Ryu et al. | |
| 2022/0159183 A1 | 5/2022 | Li et al. | |

FOREIGN PATENT DOCUMENTS

| | | |
|---|---|---|
| CN | 105847937 A | 8/2016 |
| CN | 106412412 A | 2/2017 |
| CN | 107087107 A | 8/2017 |
| CN | 107222677 A | 9/2017 |
| CN | 107277371 A | 10/2017 |
| CN | 107820016 A | 3/2018 |
| CN | 108353126 A | 7/2018 |
| CN | 108536364 A | 9/2018 |
| CN | 110072070 A | 7/2019 |
| EP | 3125524 A1 | 2/2017 |
| JP | 2012227839 A | 11/2012 |
| RU | 2680763 C1 | 2/2019 |
| WO | 2016172619 A1 | 10/2016 |

* cited by examiner (a)

(b)

(c)

(d)

(e)

(a) (b) (c)

(d) (e) (f)

(a) (b) (c)

(d) (e)

(a)

(b)

CONT.
FROM
FIG. 23A

After detecting an operation performed by the user on a second control, switch the second image displayed in the second area to an image acquired by a front-facing camera lens — 2308

If detecting a further operation performed by the user on the second control, switch, to the second image, the image that is acquired by the front-facing camera lens and that is displayed in the second area — 2309

Adjust a video resolution after detecting a preset operation of the user, where the video resolution corresponds to an aspect ratio of an area formed after the first area and the second area are spliced — 2311

Adjust a zoom ratio of the second image in the second area after detecting an operation performed by the user on a third control — 2312

Display the second image in the second area based on an adjusted zoom ratio — 2313

Stop video recording after detecting an end instruction operation of the user — 2314

Generate a video file — 2315

Display a playing interface after detecting a playing operation performed by the user on the video file, where the playing interface includes the first area and the second area — 2316

FIG. 23B

MULTI-CHANNEL VIDEO RECORDING METHOD AND DEVICE

This application is a National Stage of International Application No. PCT/CN2020/076409, filed on Feb. 24, 2020, which claims priority to Chinese Patent Application No. 201910205090.0, filed on Mar. 18, 2019, both of which are hereby incorporated by reference in their entireties.

TECHNICAL FIELD

Embodiments of this application relate to the field of electronic technologies, and in particular, to a multi-channel video recording method and device.

BACKGROUND

With the development of electronic technologies, a user may shoot various photos and videos by using a camera lens of an electronic device such as a mobile phone or a tablet computer, to record beautiful pictures such as wonderful moments and moving scenes.

SUMMARY

Embodiments of this application provide a multi-channel video recording method and device, so that a plurality of channels of videos can be simultaneously recorded by using a plurality of camera lenses, to obtain a plurality of channels of video images and more abundant picture information.

To achieve the foregoing objective, the following technical solutions are used in the embodiments of this application:

According to one aspect, an embodiment of this application provides a video recording method, applied to an electronic device having a display screen and a plurality of camera lenses, where the method includes: starting, by the electronic device, a camera; then acquiring, by the electronic device, images by using a first camera lens and a second camera lens in the plurality of camera lenses, where the first camera lens is a rear-facing wide-angle camera lens or a rear-facing ultra-wide-angle camera lens, and the second camera lens is the wide-angle camera lens, the ultra-wide-angle camera lens, or a rear-facing long-focus camera lens; displaying, by the electronic device, a preview interface, where the preview interface includes a first image and a second image; the first image is an image acquired by the first camera lens, the second image is from the second camera lens, and the second image corresponds to a central area of an image acquired by the second camera lens; and the first image is located in a first area in the preview interface, and the second image is located in a second area in the preview interface; starting, by the electronic device, video recording after detecting a video recording instruction operation of a user; and displaying, by the electronic device, a shooting screen, where the shooting screen includes the first area and the second area.

In this solution, the electronic device may simultaneously record images by using the long-focus camera lens and the wide-angle camera lens or the ultra-wide-angle camera lens that have different fields of view, to obtain a panoramic image and a close-up image that correspond to different ranges and different zoom-in levels at a same moment or in a same scene, to present more abundant image information to the user. In addition, when the second image in the second area is the central area of the image acquired by the second camera lens, a close-up picture of a focus object or a key object may be presented to the user, to provide the user with detail information of the focus object or the key object.

In an embodiment, the second image is the central area of the image acquired by the second camera lens, or the second image is a zoomed-in image of the central area of the image acquired by the second camera lens.

In other words, the second image is from the second camera lens, and the second image is an image acquired by the second camera lens.

In an embodiment, an aspect ratio of the first area is equal to an image output ratio of a photosensitive element of the first camera lens; and an area formed after the first area and the second area are spliced fully occupies a display area of the display screen.

In this way, it can be ensured that the first image has a maximum field of view. In addition, the display screen can be used to a maximum extent to present the images to the user.

In an embodiment, the preview interface includes a first control, and the method further includes: after the electronic device detects an operation performed by the user on the first control, if the first image displayed in the first area is an image acquired by the wide-angle camera lens, switching, by the electronic device, the first image to an image acquired by the ultra-wide-angle camera lens; and if the first image displayed in the first area is an image acquired by the ultra-wide-angle camera lens, switching, by the electronic device the first image to an image acquired by the wide-angle camera lens.

In this way, the electronic device may switch the first camera lens between the ultra-wide-angle camera lens and the wide-angle camera lens based on an operation performed by the user on the first control.

In an embodiment, the plurality of camera lenses further include a front-facing camera lens, the preview interface includes a second control, and the method further includes: after detecting an operation performed by the user on the second control, switching, by the electronic device, the second image displayed in the second area to an image acquired by the front-facing camera lens; and if detecting a further operation performed by the user on the second control, switching, by the electronic device to the second image, the image that is acquired by the front-facing camera lens and that is displayed in the second area.

In this way, the electronic device may switch, based on an operation performed by the user on the second control, the image in the second area to the rear-facing second camera lens or the front-facing camera lens, that is, switch between a rear close-up mode and a front-rear mode.

In an embodiment, before the displaying, by the electronic device, a preview interface, the method further includes: performing, by the electronic device, image stabilization processing on each image acquired by the first camera lens and the second camera lens.

In this way, the electronic device may obtain a clear image through image stabilization processing, and then display the clear image.

In an embodiment, the method further includes: adjusting, by the electronic device, a video resolution after detecting a preset operation of the user, where the video resolution corresponds to an aspect ratio of the area formed after the first area and the second area are spliced.

In other words, when the area formed after the first area and the second area are spliced fully occupies the display area of the display screen, adjusting a resolution of the display screen by the user is adjusting the aspect ratio of the area formed after the splicing.

In an embodiment, the shooting screen includes a third control, and the method further includes: adjusting, by the electronic device, a zoom ratio of the second image in the second area after detecting an operation performed by the user on the third control, where if an adjusted zoom ratio is equal to 1, the second camera lens is the wide-angle camera lens, and the second image is a central area of the image acquired by the wide-angle camera lens; or if an adjusted zoom ratio is greater than 1 and less than a first preset value, the second camera lens is the wide-angle camera lens, and the second image is a zoomed-in image of a central area of the image acquired by the wide-angle camera lens; or if an adjusted zoom ratio is equal to the first preset value, the second camera lens is the long-focus camera lens, and the second image is a central area of an image acquired by the long-focus camera lens; or if an adjusted zoom ratio is greater than the first preset value, the second camera lens is the long-focus camera lens, and the second image is a zoomed-in image of a central area of an image acquired by the long-focus camera lens; or if an adjusted zoom ratio is less than 1 and greater than a second preset value, the second camera lens is the ultra-wide-angle camera lens, and the second image is a zoomed-in image of a central area of the image acquired by the ultra-wide-angle camera lens; or if an adjusted zoom ratio is equal to the second preset value, the second camera lens is the ultra-wide-angle camera lens, and the second image is a central area of the image acquired by the ultra-wide-angle camera lens; and displaying, by the electronic device, the second image in the second area based on the adjusted zoom ratio.

In other words, the electronic device may switch the second camera lens to the wide-angle camera lens, the long-focus camera lens, or the ultra-wide-angle camera lens based on different zoom ratios.

In an embodiment, the method further includes: stopping, by the electronic device, video recording after detecting an end instruction operation of the user; generating, by the electronic device, a video file; and displaying, by the electronic device, a playing interface after detecting a playing operation performed by the user on the video file, where the playing interface includes the first area and the second area.

In this way, the electronic device may further play a plurality of channels of recorded videos, and simultaneously play a plurality of image pictures in a plurality of areas in the playing interface.

In an embodiment, each frame of image in the video file includes a first sub-image and a second sub-image, the first sub-image is the first image, and the second sub-image is the second image or the image acquired by the front-facing camera lens in the plurality of camera lenses.

In other words, the image in the video file is an image obtained after the first image and the second image are composited (for example, spliced).

In an embodiment, when displaying the preview interface or the shooting screen, the electronic device may generate a first photo after detecting a photo generation instruction operation of the user, where the first photo includes the image in the first area and the image in the second area.

In an embodiment, when displaying the preview interface or the shooting screen, after detecting an operation that is performed by the user to specify a close-up object, the electronic device may display the second image in the second area based on the close-up object specified by the user.

According to another aspect, an embodiment of this application provides a photographing method, applied to an electronic device having a display screen and a plurality of camera lenses, where the method includes: starting, by the electronic device, a camera; then acquiring, by the electronic device, images by using a first camera lens and a second camera lens in the plurality of camera lenses, where the first camera lens is a rear-facing wide-angle camera lens or a rear-facing ultra-wide-angle camera lens, and the second camera lens is the wide-angle camera lens, the ultra-wide-angle camera lens, or a rear-facing long-focus camera lens; displaying, by the electronic device, a preview interface, where the preview interface includes a first image and a second image; the first image is an image acquired by the first camera lens, the second image is from the second camera lens, and the second image corresponds to a central area of an image acquired by the second camera lens; and the first image is located in a first area in the preview interface, and the second image is located in a second area in the preview interface; and after detecting a photographing instruction operation of a user, saving, by the electronic device, an image in a current interface to generate a photo, where the photo includes the first image and the second image.

According to another aspect, an embodiment of this application provides a video recording apparatus. The apparatus is included in an electronic device, and the apparatus has a function of implementing behavior of the electronic device in any method in the foregoing aspects and possible implementations. The function may be implemented by hardware, or may be implemented by hardware by executing corresponding software. The hardware or the software includes at least one module or unit corresponding to the function, for example, a start module or unit, an acquisition module or unit, a display module or unit, or a processing module or unit.

According to still another aspect, an embodiment of this application provides an electronic device, including one or more camera lenses, configured to acquire an image; one or more display screens, configured to display an interface; one or more processors; one or more memories; and one or more computer programs, where the one or more computer programs are stored in the memory, and the one or more computer programs include an instruction; and when the instruction is executed by the processor, the electronic device is enabled to perform the video recording method in any possible implementation of the foregoing aspect.

According to another aspect, an embodiment of this application provides a computer storage medium, including a computer instruction, where when the computer instruction is run on an electronic device, the electronic device is enabled to perform the video recording method in any possible implementation of the foregoing aspect.

According to still another aspect, an embodiment of this application provides a computer program product, where when the computer program product is run on a computer, the computer is enabled to perform the video recording method in any possible implementation of the foregoing aspect.

BRIEF DESCRIPTION OF DRAWINGS

FIG. 23A and FIG. 23B are a flowchart of a multi-channel video recording method according to an embodiment of this application.

DESCRIPTION OF EMBODIMENTS

The following describes the technical solutions in the embodiments of this application with reference to the accompanying drawings in the embodiments of this application. In description of the embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions in the embodiments of this application, "a plurality of" means two or more than two.

The embodiments of this application provide a multi-channel video recording method, which may be applied to an electronic device including a plurality of camera lenses. The electronic device may simultaneously use a plurality of camera lenses to perform video recording, to obtain a plurality of channels of video images and more abundant picture information.

The "video recording" may also be referred to as "recording a video/videos". In the following embodiments of this application, "video recording" and "recording a video/videos" have a same meaning.

For example, the electronic device may be specifically a mobile phone, a tablet computer, a wearable device, an in-vehicle device, an augmented reality (AR)/virtual reality (VR) device, a notebook computer, or an ultra-mobile personal computer (UMPC), a netbook, a personal digital assistant (PDA), a dedicated camera (for example, a single-lens reflex camera or a card camera), or the like. A specific type of the electronic device is not limited in the embodiments of this application.

Figure 1:
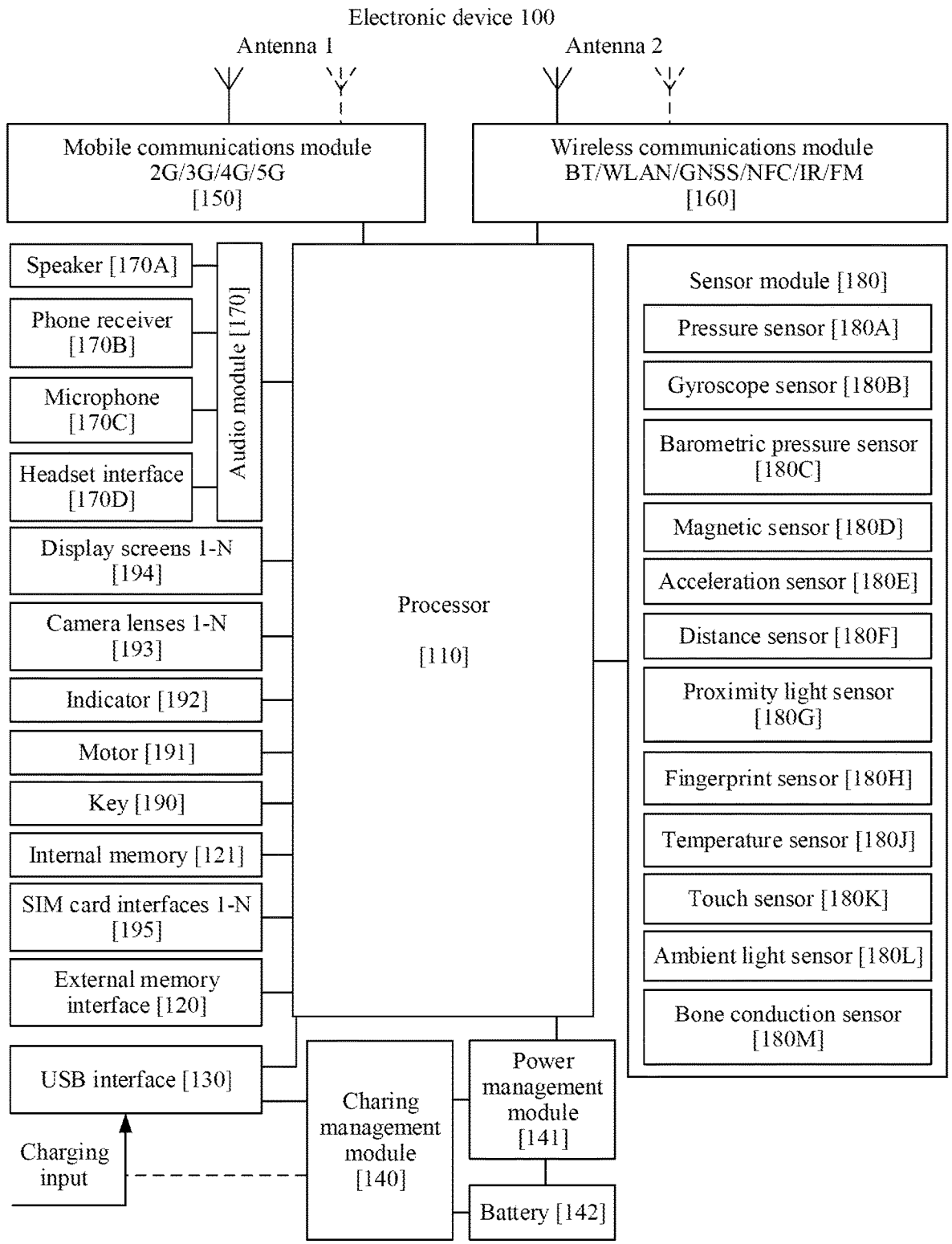
FIG. 1 is a schematic structural diagram of an electronic device according to an embodiment of this application.

For example, FIG. 1 is a schematic structural diagram of an electronic device 100. The electronic device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a phone receiver 170B, a microphone 170C, a headset interface 170D, a sensor module 180, a key 190, a motor 191, an indicator 192, a camera lens 193, a display screen 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, a proximity light sensor 180G, a fingerprint sensor 180H, a temperature sensor 180J, and a touch sensor 180K, an ambient light sensor 180L, a bone conduction sensor 180M, and the like.

It may be understood that the schematic structure in this embodiment of this application does not constitute a specific limitation on the electronic device 100. In some other embodiments of this application, the electronic device 100 may include more or fewer components than those shown in the figure, or have some components combined, or have some components split, or have a different component arrangement. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processor (NPU), and/or the like. Different processing units may be independent devices, or may be integrated into one or more processors.

In some embodiments, the processor 110 such as the controller or the GPU may be configured to: in a multi-channel video recording scenario, composite a plurality of frames of images simultaneously acquired by N (N is an integer greater than 1) camera lenses 193 into one frame of image in a manner of splicing, partial superimposition, or the like, so that the electronic device 100 may simultaneously display, based on a preset display style or a display style specified by a user, image pictures acquired by the N camera lenses 193.

The display style may include arrangement manners and sizes of images respectively acquired by different camera lenses 193.

In some other embodiments, the processor 110 such as the controller or the GPU may be configured to: in a multi-channel video recording scenario, perform image stabilization processing on an image acquired by each camera lens 193, and then composite images that are obtained after the image stabilization processing and that correspond to N camera lenses 193.

The controller may be a nerve center and a command center of the electronic device 100. The controller may generate an operation control signal based on instruction operation code and a timing signal, to complete control on instruction fetching and execution.

A memory may be further disposed in the processor 110, to store an instruction and data. In some embodiments, the memory in the processor 110 is a cache. The memory may store an instruction or data that was just used or is cyclically used by the processor 110. If the processor 110 needs to use the instruction or the data again, the processor 110 may directly invoke the instruction or the data from the memory. This avoids repeated access, and reduces a waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a bidirectional synchronous serial bus, and includes a serial data line (SDA) and a serial clock line (SCL). In some embodiments, the processor 110 may include a plurality of groups of I2C buses. The processor 110 may be respectively coupled to the touch sensor 180K, a charger, a flash, the camera lens 193, and the like by using different I2C bus interfaces. For example, the processor 110 may be coupled to the touch sensor 180K by using an I2C interface, so that the processor 110 communicates with the touch sensor 180K by using the I2C bus interface, to implement a touch function of the electronic device 100.

The I2S interface may be configured for audio communication. In some embodiments, the processor 110 may include a plurality of groups of I2S buses. The processor 110 may be coupled to the audio module 170 by using an I2S bus, to implement communication between the processor 110 and the audio module 170. In some embodiments, the audio module 170 may transfer an audio signal to the wireless communications module 160 by using an I2S interface, to implement a function of answering a call by using a Bluetooth headset.

The PCM interface may also be configured for audio communication, to sample, quantize, and encode an analog signal. In some embodiments, the audio module 170 and the wireless communications module 160 may be coupled by using a PCM bus interface. In some embodiments, the audio module 170 may alternatively transfer an audio signal to the wireless communications module 160 by using the PCM interface, to implement a function of answering a call by using a Bluetooth headset. Both the I2S interface and the PCM interfaces may be configured for audio communication.

The UART interface is a universal serial data bus, and is configured for asynchronous communication. The bus may be a bidirectional communications bus. It converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 by using the UART interface, to implement a Bluetooth function. In some embodiments, the audio module 170 may transfer an audio signal to the wireless communications module 160 by using the UART interface, to implement a function of playing music by using a Bluetooth headset.

The MIPI interface may be configured to connect the processor 110 to a peripheral device such as the display screen 194 and the camera lens 193. The MIPI interface includes a camera serial interface (CSI), a display serial interface (DSI), and the like. In some embodiments, the processor 110 communicates with the camera lens 193 by using the CSI interface, to implement a shooting function of the electronic device 100. The processor 110 communicates with the display screen 194 by using the DSI interface, to implement a display function of the electronic device 100.

The GPIO interface may be configured by using software. The GPIO interface may be configured for a control signal or a data signal. In some embodiments, the GPIO interface may be configured to connect the processor 110 to the camera lens 193, the display screen 194, the wireless communications module 160, the audio module 170, the sensor module 180, and the like. The GPIO interface may be further configured as an I2C interface, an I2S interface, a UART interface, an MIPI interface, or the like.

The USB interface 130 is an interface that complies with a USB standard specification, and may be specifically a Mini USB interface, a Micro USB interface, a USB Type C interface, or the like. The USB interface 130 may be configured to connect to a charger to charge the electronic device 100, and may also be configured to transmit data between the electronic device 100 and a peripheral device. It may also be configured to connect to a headset, to play audio by using the headset. The interface may be further configured to connect to another electronic device, for example, an AR device.

It may be understood that schematic interface connection relationships between modules in this embodiment of this application are merely an example for description, and do not constitute a limitation on a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The charger may be a wireless charger, or may be a wired charger. In some embodiments of wired charging, the charging management module 140 may receive a charging input of the wired charger by using the USB interface 130. In some embodiments of wireless charging, the charging management module 140 may receive a wireless charging input by using a wireless charging coil of the electronic device 100. When charging the battery 142, the charging management module 140 may further supply power for the electronic device by using the power management module 141.

The power management module 141 is configured to connect the battery 142, the charging management module 140, and the processor 110. The power management module 141 receives an input of the battery 142 and/or the charging management module 140, and supplies power for the processor 110, the internal memory 121, an external memory, the display screen 194, the camera lens 193, the wireless communications module 160, and the like. The power management module 141 may be further configured to monitor parameters such as a battery capacity, a battery cycle count, and a state of health (leakage or impedance) of the battery.

In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communications bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a solution for wireless communication including 2G/3G/4G/5G and the like to be applied to the electronic device 100. The mobile communications module 150 may include at least one filter, switch, power amplifier, low noise amplifier (LNA), and the like. The mobile communications module 150 may receive an electromagnetic wave by using the antenna 1, perform processing such as filtering or amplification on the received electromagnetic wave, and transfer the electromagnetic wave to the modem processor for demodulation. The mobile communications module 150 may further amplify a signal modulated by the modem processor, and convert the signal into an electromagnetic wave for radiation by using the antenna 1.

In some embodiments, at least some function modules in the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into an intermediate or high-frequency signal. The demodulator is configured to demodulate a received electromagnetic wave signal into a low-frequency baseband signal. Then the demodulator transfers the low-frequency baseband signal obtained through the demodulation to the baseband processor for processing. The low-frequency baseband signal is processed by the baseband processor and then transferred to the application processor. The application processor outputs a sound signal by using an audio device (which is not limited to the speaker 170A, the phone receiver 170B, or the like), or displays an image or a video by using the display screen 194.

In some embodiments, the modem processor may be an independent device. In some other embodiments, the modem processor may be independent of the processor 110, and is disposed in a same device as the mobile communications module 150 or another function module.

The wireless communications module 160 may provide a solution for wireless communication including a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, and the like to be applied to the electronic device 100. The wireless communications module 160 may be one or more devices integrating at least one communications processing module. The wireless communications module 160 receives an electromagnetic wave by using the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the to-be-sent signal, and convert the to-be-sent signal into an electromagnetic wave for radiation by using the antenna 2.

In some embodiments, the antenna 1 of the electronic device 100 is coupled to the mobile communications module 150, and the antenna 2 is coupled to the wireless communications module 160, so that the electronic device 100 may communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, GNSS, WLAN, NFC, FM, the IR technology, and/or the like. The GNSS may include a global positioning system (GPS), a global navigation satellite system (GLONASS), a BeiDou navigation satellite system (BDS), a quasi-zenith satellite system (QZSS), and/or a satellite-based enhancement system (SBAS).

The electronic device 100 implements a display function by using the GPU, the display screen 194, the application processor, and the like. The GPU is a microprocessor for image processing, and is connected to the display screen 194 and the application processor. The GPU is configured to perform mathematical and geometric calculation, and perform graphics rendering. The processor 110 may include one or more GPUs that execute a program instruction to generate or change display information.

The display screen 194 is configured to display an image, a video, and the like. The display screen 194 includes a display panel. The display panel may use a liquid crystal display (LCD), an organic light-emitting diode (OLED), an active-matrix organic light-emitting diode (AMOLED), a flexible light-emitting diode (FLED), a Miniled, a MicroLed, a Micro-oLed, a quantum dot light-emitting diode (QLED), or the like. In some embodiments, the electronic device 100 may include one or more display screens 194.

In some embodiments, in a multi-channel video recording scenario, the display screen 194 may display, in a manner of splicing, picture-in-picture, or the like and based on a preset display style or a display style specified by the user, images simultaneously acquired by N camera lenses 193, so that the plurality of channels of images acquired by the N camera lenses 193 may be simultaneously presented to the user.

The electronic device 100 may implement a shooting function by using the ISP, the camera lens 193, the video codec, the GPU, the display screen 194, the application processor, and the like.

The ISP is configured to process data fed back by the camera lens 193. For example, during photographing, when a shutter is enabled, light is transferred to a photosensitive element of the camera lens through a lens, an optical signal is converted into an electrical signal, and the photosensitive element of the camera lens transfers the electrical signal to the ISP for processing, to convert the electrical signal into an image visible to a naked eye. The ISP may further optimize an algorithm for noise, luminance, and complexion in an image. The ISP may further optimize parameters such as an exposure and a color temperature of a photographed scene. In some embodiments, the ISP may be disposed in the camera lens 193.

The camera lens 193 is configured to capture a static image or a video. An optical image of an object is generated through the lens, and projected to the photosensitive element. The photosensitive element may be a charge coupled device (CCD) or a complementary metal-oxide-semiconductor (CMOS) phototransistor. The photosensitive element converts the optical signal into an electrical signal, and then transfers the electrical signal to the ISP to convert the electrical signal into a digital image signal. The ISP outputs the digital image signal to the DSP for processing. The DSP converts the digital image signal into an image signal in a standard format such as RGB or YUV.

The electronic device 100 may include N (N is an integer greater than 1) or more camera lenses 193. The N camera lenses 193 may include a rear-facing camera lens and/or a front-facing camera lens. The N camera lenses 193 may be configured to record a plurality of channels of videos.

The digital signal processor is configured to process a digital signal. In addition to the digital image signal, the digital signal processor may further process another digital signal. For example, when the electronic device 100 selects a frequency, the digital signal processor is configured to perform Fourier transform or the like on frequency energy.

The video codec is configured to compress or decompress a digital video. The electronic device 100 may support one or more video codecs. In this way, the electronic device 100 may play or record videos in a plurality of encoding formats, for example, moving picture experts group (MPEG)1, MPEG2, MPEG3, and MPEG4.

The NPU is a neural-network (NN) computing processor, which quickly processes input information by referring to a biological neural network structure, for example, referring to a mode of transfer between human brain neurons, and may further continuously perform self-learning. Applications such as intelligent cognition of the electronic device 100, for example, image recognition, facial recognition, speech recognition, and text understanding, may be implemented by using the NPU.

The external memory interface 120 may be configured to connect to an external storage card, for example, a Micro SD card, to extend a storage capability of the electronic device 100. The external storage card communicates with the processor 110 by using the external memory interface 120, to implement a data storage function. For example, files such as music and videos are stored in the external storage card.

The internal memory 121 may be configured to store computer-executable program code. The executable program code includes an instruction. The processor 110 runs the instruction stored in the internal memory 121, to execute various function applications and data processing of the electronic device 100. The internal memory 121 may include a program storage area and a data storage area. The program storage area may store an operating system, an application required by at least one function (for example, a sound playing function or an image playing function), and the like. The data storage area may store data (such as audio data and an address book) created during use of the electronic device 100, and the like. In addition, the internal memory 121 may include a high-speed random access memory, and may further include a non-volatile memory, for example, at least one disk storage device, a flash memory device, or a universal flash storage (UFS).

The electronic device 100 may implement an audio function, for example, playing music and recorded sound, by using the audio module 170, the speaker 170A, the phone receiver 170B, the microphone 170C, the headset interface 170D, the application processor, and the like.

The audio module 170 is configured to convert digital audio information into an analog audio signal for output, and convert an analog audio input into a digital audio signal. The audio module 170 may be further configured to encode and decode audio signals. In some embodiments, the audio module 170 may be disposed in the processor 110, or some function modules of the audio module 170 are disposed in the processor 110.

The speaker 170A, also referred to as a "loudspeaker", is configured to convert an electrical audio signal into a sound signal. The electronic device 100 may listen to music or listen to a hands-free call by using the speaker 170A.

The phone receiver 170B, also referred to as an "earpiece", is configured to convert an electrical audio signal into a sound signal. When the electronic device 100 answers a call or receives a voice message, the phone receiver 170B may be placed close to a human ear to listen to a voice.

The microphone 170C, also referred to as a "mic" or a "sound transmitter", is configured to convert a sound signal into an electrical signal. When making a call or sending a voice message, the user may make a voice with the mouth near the microphone 170C, so that a sound signal is input to the microphone 170C. At least one microphone 170C may be disposed in the electronic device 100. In some other embodiments, two microphones 170C may be disposed in the electronic device 100, to collect a sound signal and implement a noise reduction function. In some other embodiments, alternatively, three, four, or more microphones 170C may be disposed in the electronic device 100, to collect a sound signal, reduce noise, identify a sound source to implement a directional sound recording function, and the like.

The headset interface 170D is configured to connect to a wired headset. The headset interface 170D may be a USB interface 130, or may be a 3.5 mm open mobile terminal platform (OMTP) standard interface or a US cellular telecommunications industry association (CTIA) standard interface.

The pressure sensor 180A is configured to sense a pressure signal, and may convert the pressure signal into an electrical signal. In some embodiments, the pressure sensor 180A may be disposed on the display screen 194. There are many types of pressure sensors 180A, for example, a resistive pressure sensor, an inductive pressure sensor, and a capacitive pressure sensor. The capacitive pressure sensor may include at least two parallel plates having a conductive material. When a force is applied to the pressure sensor 180A, capacitance between electrodes changes. The electronic device 100 determines pressure intensity based on the change of the capacitance. When a touch operation is applied to the display screen 194, the electronic device 100 detects touch operation intensity based on the pressure sensor 180A. The electronic device 100 may also calculate a touched location based on a signal detected by the pressure sensor 180A. In some embodiments, touch operations that are applied to a same touch location but have different touch operation intensity may correspond to different operation instructions. For example, when a touch operation with touch operation intensity less than a first pressure threshold is applied to an SMS message application icon, an instruction for viewing an SMS message is executed. When a touch operation with touch operation intensity greater than or equal to the first pressure threshold is applied to the SMS message application icon, an instruction for creating a new SMS message is executed.

The gyroscope sensor 180B may be configured to determine a motion posture of the electronic device 100. In some embodiments, angular velocities of the electronic device 100 around three axes (namely, x, y, and z axes) may be determined by using the gyroscope sensor 180B. The gyroscope sensor 180B may be configured for image stabilization during shooting. For example, when the shutter is pressed, the gyroscope sensor 180B detects an angle at which the electronic device 100 jitters, and calculates, based on the angle, a distance for which a lens module needs to compensate, so that a lens offsets the jitter of the electronic device 100 through reverse motion, to implement image stabilization. The gyroscope sensor 180B may be further used in navigation and motion sensing game scenarios.

The barometric pressure sensor 180C is configured to measure barometric pressure. In some embodiments, the electronic device 100 calculates an altitude by using the atmospheric pressure measured by the barometric pressure sensor 180C, to assist positioning and navigation.

The magnetic sensor 180D includes a Hall sensor. The electronic device 100 may detect, by using the magnetic sensor 180D, whether a flip leather case is opened or closed. In some embodiments, when the electronic device 100 is a flip phone, the electronic device 100 may detect, based on the magnetic sensor 180D, whether a flip cover is opened or closed, and set, based on a detected opened or closed state of the leather case or the flip cover, a feature such as automatic unlocking in response to the opened state.

The acceleration sensor 180E may detect magnitude of accelerations in different directions (generally on three axes) of the electronic device 100, may detect magnitude and a direction of gravity when the electronic device 100 is stationary, and may be further configured to recognize a posture of the electronic device, which is applied to switching between landscape orientation and portrait orientation, a pedometer, or other applications.

The distance sensor 180F is configured to measure a distance. The electronic device 100 may measure the distance by using infrared or laser. In some embodiments, for a photographed scene, the electronic device 100 may measure a distance by using the distance sensor 180F, to implement fast focusing.

The proximity light sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from an object nearby by using the photodiode. When the detected reflected light is sufficient, it may be determined that there is an object near the electronic device 100. When the detected reflected light is insufficient, the electronic device 100 may determine that there is no object near the electronic device 100. The electronic device 100 may detect, by using the proximity light sensor 180G, that the user holds the electronic device 100 close to an ear to make/answer a call, to automatically turn off the screen for power saving. The proximity light sensor 180G may also be configured to automatically unlock or lock the screen in a leather case mode or a pocket mode.

The ambient light sensor 180L is configured to sense ambient light brightness. The electronic device 100 may adaptively adjust luminance of the display screen 194 based on the sensed ambient light brightness. The ambient light sensor 180L may also be configured to automatically adjust white balance during photographing. The ambient light sensor 180L may further cooperate with the proximity light sensor 180G to detect whether the electronic device 100 is in a pocket, to prevent accidental touch.

The fingerprint sensor 180H is configured to collect a fingerprint. The electronic device 100 may implement fingerprint-based unlocking, application access locking, fingerprint-based photographing, fingerprint-based call answering, and the like by using a feature of the collected fingerprint.

The temperature sensor 180J is configured to detect a temperature. In some embodiments, the electronic device 100 executes a temperature processing policy by using the temperature detected by the temperature sensor 180J. For example, when a temperature reported by the temperature sensor 180J exceeds a threshold, the electronic device 100 lowers performance of a processor located near the temperature sensor 180J, to reduce power consumption for thermal protection. In some other embodiments, when a temperature is lower than another threshold, the electronic device 100 heats the battery 142 to prevent the low temperature from causing the electronic device 100 to shut down abnormally. In some other embodiments, when a temperature is lower than still another threshold, the electronic device 100 boosts an output voltage of the battery 142 to prevent the low temperature from causing an abnormal shutdown.

The touch sensor 180K is also referred to as a "touch panel". The touch sensor 180K may be disposed on the display screen 194. The touch sensor 180K and the display screen 194 constitute a touchscreen, also referred to as a "touch control screen". The touch sensor 180K is configured to detect a touch operation on or near the touch sensor. The touch sensor may transfer the detected touch operation to the application processor to determine a type of a touch event. A visual output related to the touch operation may be provided by using the display screen 194. In some other embodiments, the touch sensor 180K may alternatively be disposed on a surface of the electronic device 100 at a location different from that of the display screen 194.

The bone conduction sensor 180M may obtain a vibration signal. In some embodiments, the bone conduction sensor 180M may obtain a vibration signal of a vibrating bone of a human vocal-cord part. The bone conduction sensor 180M may also be in contact with a human body pulse to receive a beat-to-beat blood pressure signal. In some embodiments, the bone conduction sensor 180M may alternatively be disposed in a headset, which are combined into a bone conduction headset. The audio module 170 may parse out a voice signal based on the vibration signal, obtained by the bone conduction sensor 180M, of the vibrating bone of the vocal-cord part to implement a voice function. The application processor may parse out heart rate information based on the beat-to-beat blood pressure signal obtained by the bone conduction sensor 180M, to implement a heart rate detection function.

The key 190 includes a power key, a volume key, and the like. The key 190 may be a mechanical key, or may be a touch key. The electronic device 100 may receive a key input, generate a key signal input that is related to user setting and function control of the electronic device 100.

The motor 191 may generate a vibration prompt. The motor 191 may be configured for an incoming call vibration prompt and a touch vibration feedback. For example, touch operations applied to different applications (for example, photographing and audio playing) may correspond to different vibration feedback effects. The motor 191 may also generate different vibration feedback effects corresponding to touch operations applied to different areas of the display screen 194. Different application scenarios (for example, a time reminder, information receiving, an alarm clock, and a game) may also correspond to different vibration feedback effects. Customization of a touch vibration feedback effect may be further supported.

The indicator 192 may be an indicator light, and may be configured to indicate a charging status and a battery level change, and may also be configured to indicate a message, a missed call, a notification, and the like.

The SIM card interface 195 is configured to connect to a SIM card. The SIM card may be attached to and detached from the electronic device 100 by being inserted into the SIM card interface 195 or removed from the SIM card interface 195. The electronic device 100 may support one or more SIM card interfaces. The SIM card interface 195 may support a nano-SIM card, a micro-SIM card, a SIM card, and the like. A plurality of cards may be simultaneously inserted into a same SIM card interface 195. Types of the plurality of cards may be the same or may be different. The SIM card interface 195 may also be compatible with different types of SIM cards. The SIM card interface 195 may also be compatible with an external storage card. The electronic device 100 interacts with a network by using a SIM card, to implement functions such as a call and data communication. In some embodiments, the electronic device 100 uses an eSIM, namely, an embedded SIM card. The eSIM card may be embedded in the electronic device 100 and cannot be detached from the electronic device 100.

In this embodiment of this application, N camera lenses 193 in the mobile phone may simultaneously record a plurality of channels of videos. Such a shooting mode may be referred to as a multi-channel video recording mode. In the multi-channel video recording mode, in a video recording process or in a process of playing recorded videos, the display screen 194 may simultaneously display, in a same interface and based on a preset display style or a display style specified by the user, a plurality of frames of images respectively acquired by the N camera lenses 193. The plurality of frames of images respectively acquired by the N camera lenses 193 may be displayed in the same interface through splicing, or displayed in a picture-in-picture manner.

In some embodiments, in the multi-channel video recording mode, the processor 110 (for example, the controller or the GPU) may composite a plurality of frames of images simultaneously acquired by the N camera lenses 193 in a video recording process, to combine a plurality of channels of video streams acquired by the N camera lenses 193 into one channel of video stream. Then, a video encoder in the processor 110 may encode the one channel of composited video stream data, to generate a video file. In this way, each frame of image in the video file may include a plurality of images from the N camera lenses 193. When a frame of image in the video file is played, the display screen 194 may display, based on a preset display style or a display style specified by the user, a plurality of channels of images simultaneously acquired by the N camera lenses 193, to display, to the user, a plurality of image pictures that correspond to different ranges, different definitions, or different detail information at a same moment or in a same scene.

In some other embodiments, in the multi-channel video recording mode, the processor 110 may associate all frames of image simultaneously acquired by different camera lenses 193, so that when recorded videos are played, the display screen 194 may display associated image frames in a same interface based on a preset display style or a display style specified by the user. For example, the processor 110 may add a same tag to the plurality of frames of images simultaneously acquired by the N camera lenses 193, to associate the plurality of frames of images. In this case, videos recorded by different camera lenses 193 may be separately stored as different video files.

In still some embodiments, in the multi-channel video recording mode, the N camera lenses 193 may separately acquire images at a same frame rate. In other words, the N camera lenses 193 acquire a same quantity of image frames within a same time. Videos simultaneously recorded by different camera lenses 193 may be separately stored as different video files, and the different video files are associated with each other. In the video files, image frames are stored in a sequence of acquiring the image frames, and the different video files include a same quantity of image frames. When the recorded videos are played, the display screen 194 may perform display based on a preset display style or a display style specified by the user and in sequences of image frames included in associated video files, to display, in a same interface, a plurality of frames of images that correspond to a same sequence and that are in different video files.

In some other embodiments, in the multi-channel video recording mode, the N camera lenses 193 may separately acquire images at a same frame rate. In other words, the N camera lenses 193 acquire a same quantity of image frames within a same time. The processor 110 may add a timestamp to each frame of image acquired by different camera lenses 193, so that when recorded videos are played, the display screen 194 may simultaneously display, in a same interface and based on the timestamp and a preset display style or a display style specified by the user, a plurality of frames of images acquired by the N camera lenses 193. Videos recorded by different camera lenses 193 may be separately stored as different video files.

For ease of use, the mobile phone usually performs shooting in a mode of being handheld by the user. However, a picture shot in the mode of being handheld by the user usually suffers from jitter. In some embodiments, in the multi-channel video recording mode, the processor 110 may perform image stabilization processing on each image frame acquired by different camera lenses 193. Then, the display screen 194 displays an image obtained after the image stabilization processing.

The multi-channel video recording method provided in the embodiments of this application is described below by using an example in which an electronic device is a mobile phone having the foregoing touchscreen.

As described above, the touchscreen may include a display panel and a touch panel. The display panel may display an interface. In other words, the touchscreen is also a display screen. The touch panel may detect a touch operation of a user, and report the touch operation to a processor of the mobile phone for corresponding processing.

Figure 2A:
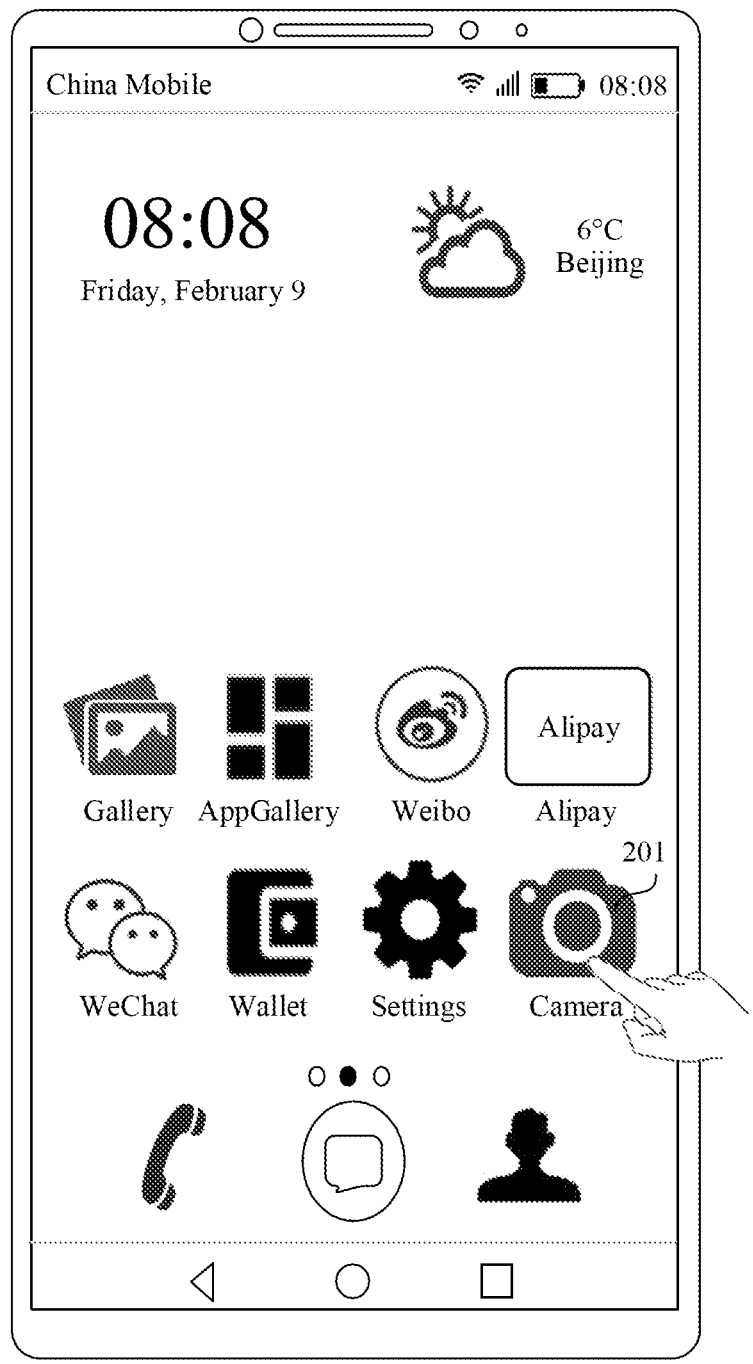
FIG. 2(a), FIG. 2(b), and FIG. 2(c) are schematic diagrams of a group of interfaces according to an embodiment of this application.

In some embodiments, when wanting to use the mobile phone to shoot an image, the user may instruct, through a touch operation, a key operation, a mid-air gesture operation, or a voice operation, the mobile phone to start a camera. The mobile phone enables a camera function according to the instruction of the user. For example, as shown in FIG. 2(a), after detecting an operation of tapping a camera icon 201 by the user, the mobile phone enables the camera function.

In some embodiments, after starting the camera, the mobile phone may automatically enter a shooting mode such as a photographing mode, a video recording mode (a single-channel video recording mode in which a single camera lens is used to record a video in the prior art), or a multi-channel video recording mode, and display a shooting preview interface. For example, after detecting the operation of tapping, by the user, the camera icon 201 shown in FIG. 2(a), the mobile phone may automatically enter the photographing mode, and display a preview window 202 shown in FIG. 2(b). A photographing preview interface may be displayed in the preview window 202.

In some other embodiments, after starting the camera, if having not entered the multi-channel video recording mode, the mobile phone may enter the multi-channel video recording mode according to an instruction of the user.

Figure 2B:
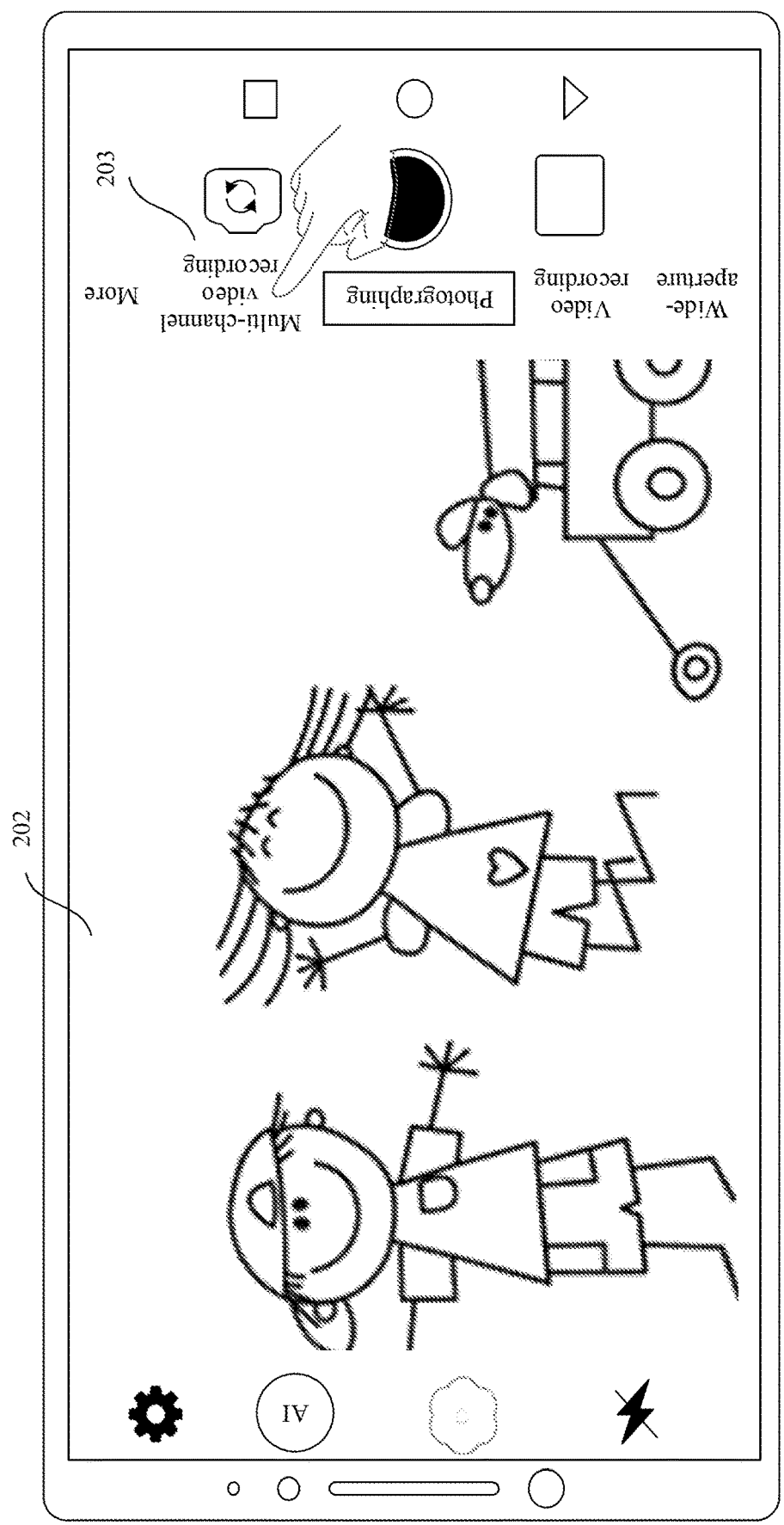
Figure 2C:
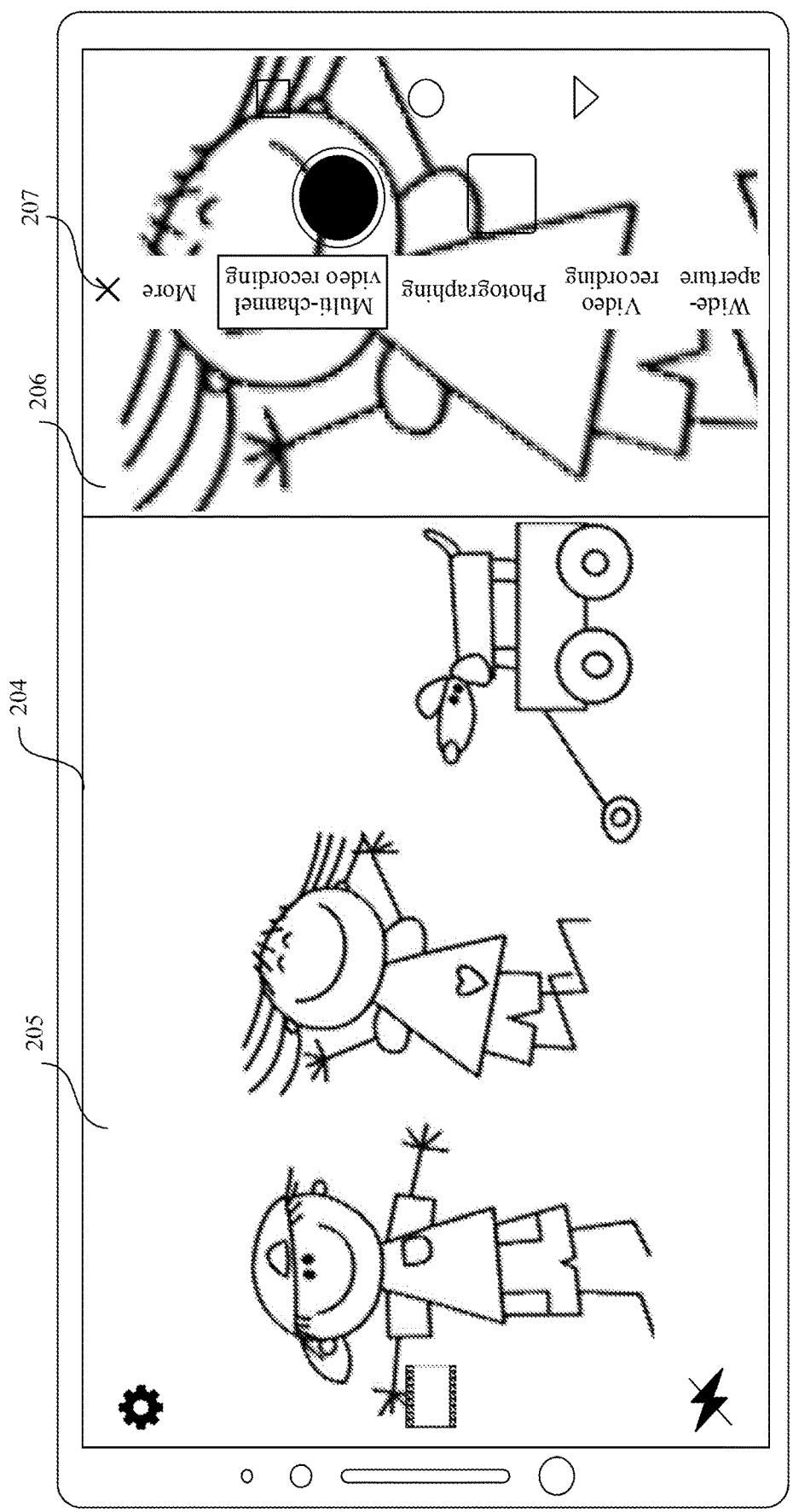

For example, in the photographing preview interface shown in FIG. 2(b), if the mobile phone detects an operation of tapping a control 203 by the user, the mobile phone may enter the multi-channel video recording mode, and display a preview window 204 shown in FIG. 2(c). A multi-channel video recording preview interface may be displayed in the preview window 204.

In the multi-channel video recording mode, the preview window 204 may include a plurality of areas, and different areas are respectively used to display images respectively acquired by different camera lenses that simultaneously record a plurality of channels of videos. For example, when the multi-channel video recording mode is a two-channel video recording mode, two camera lenses on the mobile phone are simultaneously used for multi-channel video recording. As shown in FIG. 2(c), the preview window 204 may include an area 205 and an area 206, an image acquired by one of the camera lenses may be displayed in the area 205, and an image acquired by the other camera lens may be displayed in the area 206.

Figure 3A:
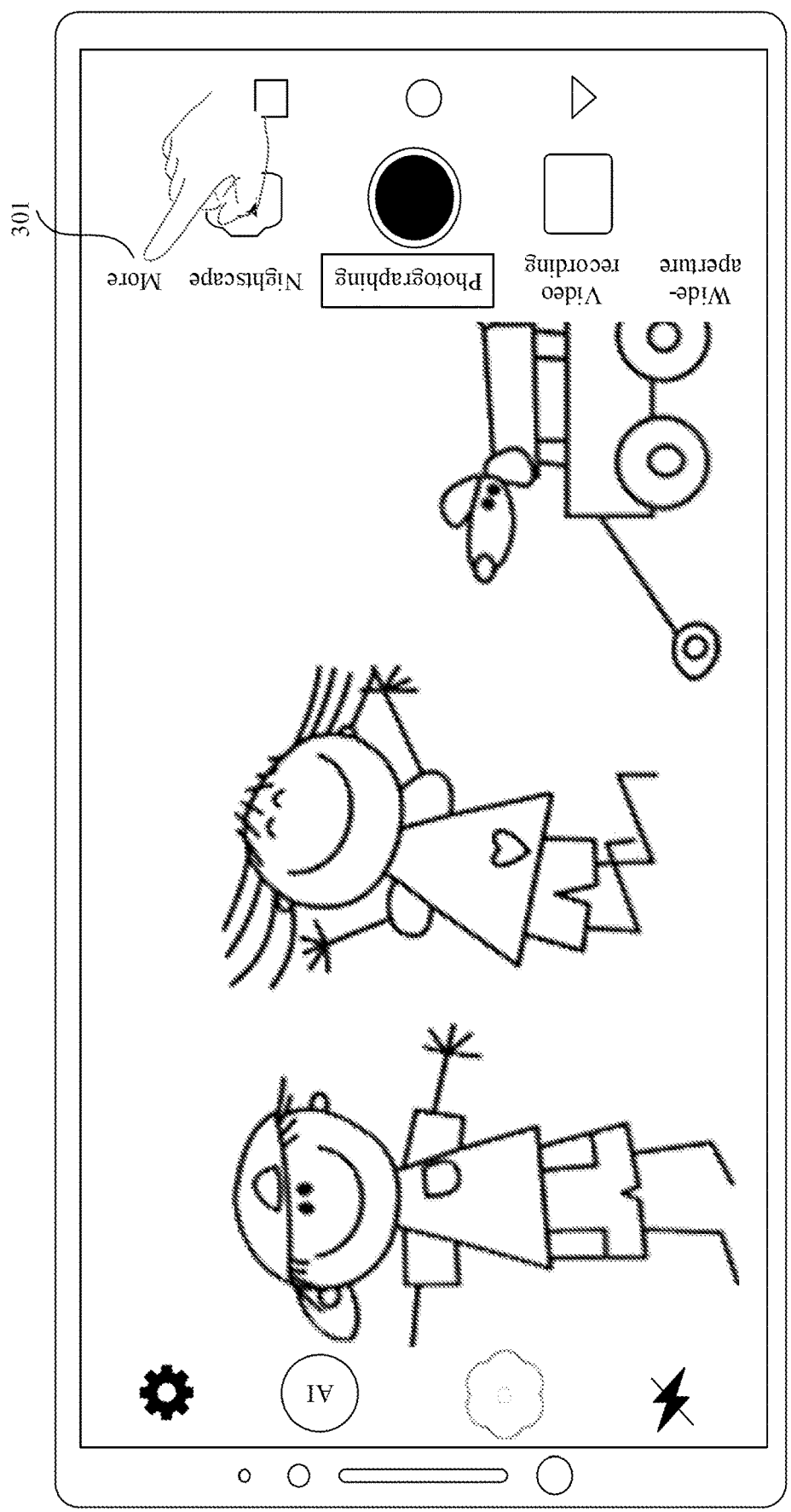
FIG. 3(a), FIG. 3(b), and FIG. 3(c) are schematic diagrams of another group of interfaces according to an embodiment of this application.
Figure 3B:
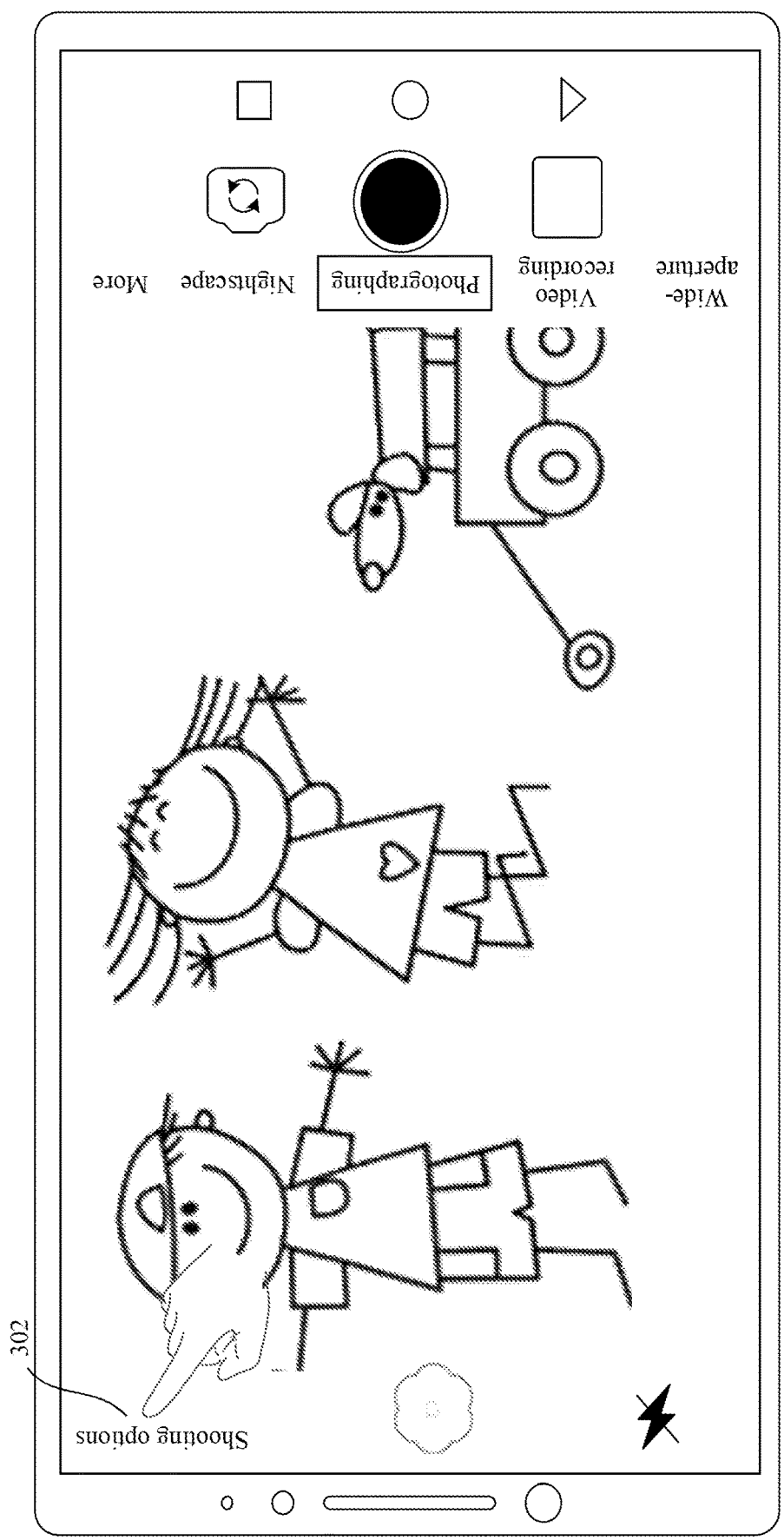
Figure 3C:
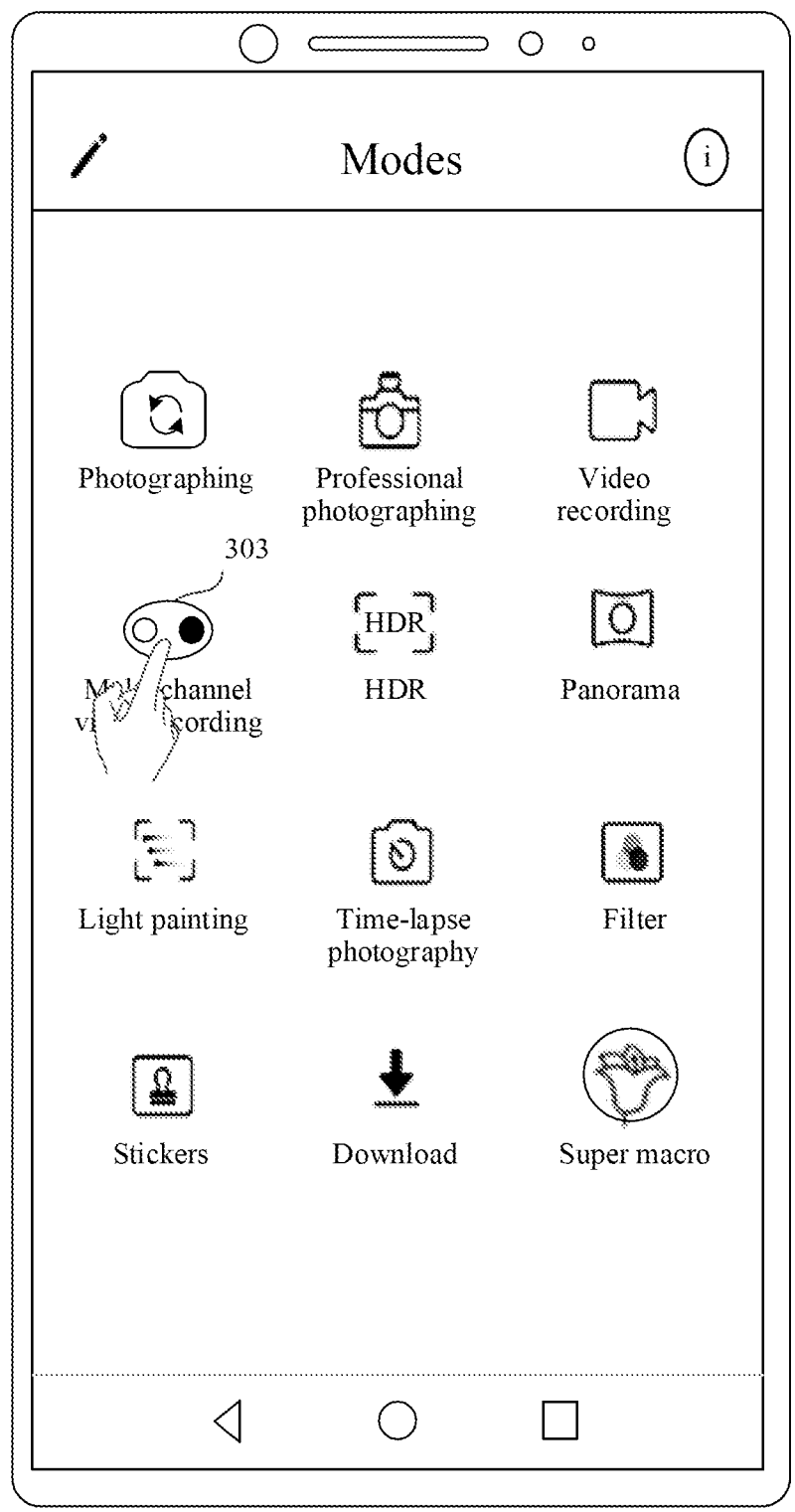

For another example, in a photographing preview interface shown in FIG. 3(a), if the mobile phone detects an operation of tapping a control 301 by the user, a setting interface shown in FIG. 3(c) may be displayed. Alternatively, in a photographing preview interface shown in FIG. 3(b), if the mobile phone detects an operation of tapping a control 302 by the user, a setting interface shown in FIG. 3(c) may be displayed. Then, if the mobile phone detects an operation of tapping a control 303 by the user, the mobile phone enters the multi-channel video recording mode.

Figure 4A:
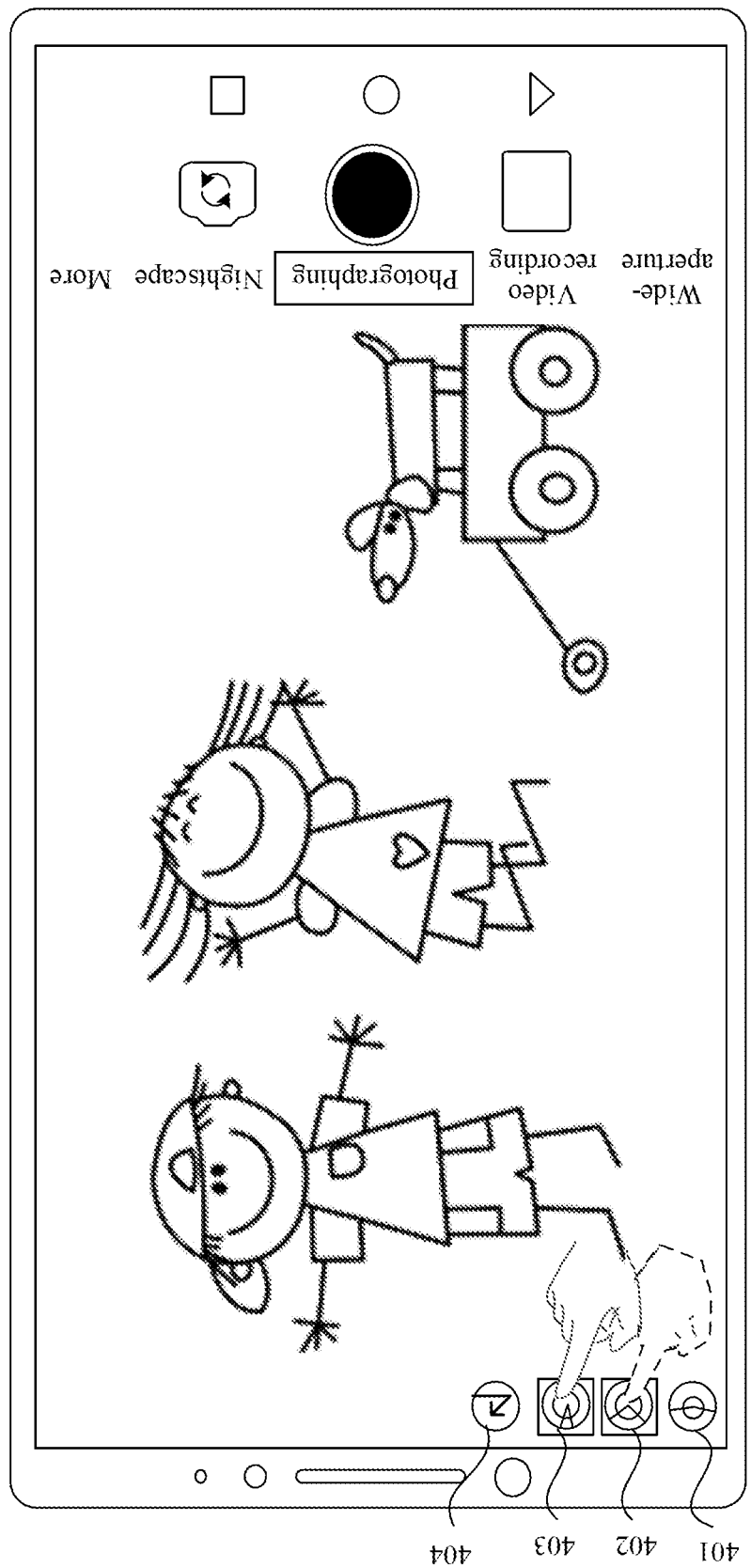
FIG. 4A is a schematic diagram of an interface according to an embodiment of this application.

For another example, in the photographing mode, the photographing preview interface displayed on the mobile phone may include a camera lens identifier. After detecting an operation of selecting a plurality of camera lens identifiers by the user, the mobile phone determines that the user wants to use a plurality of camera lenses for video recording, and therefore enters the multi-channel video recording mode. For example, referring to FIG. 4A, a photographing preview interface of the mobile phone includes an identifier 401 of a rear-facing ultra-wide-angle camera lens, an identifier 402 of a rear-facing wide-angle camera lens, an identifier 403 of a rear-facing long-focus camera lens, and an identifier 404 of a front-facing camera lens. After detecting an operation of tapping the identifier 402 and the identifier 403 by the user, the mobile phone enters the multi-channel video recording mode, and acquires images by using the rear-facing wide-angle camera lens and the rear-facing long-focus camera lens.

For another example, in the photographing mode, the photographing preview interface displayed on the mobile phone may include a numeric identifier. The numeric identifier is used to indicate a quantity of camera lenses that are simultaneously used during shooting (or used to indicate a quantity of channels of images that are simultaneously acquired). When detecting that a numeric value corresponding to a numeric identifier selected by the user is greater than 1, the mobile phone determines that the user wants to use a plurality of camera lenses for simultaneous video recording, and therefore enters the multi-channel video recording mode.

For another example, in the photographing mode or the video recording mode (the single-channel video recording mode), after detecting an operation of drawing a preset track 1 (for example, an "M" track) on the touchscreen by the user, the mobile phone enters the multi-channel video recording mode.

Figure 4B:
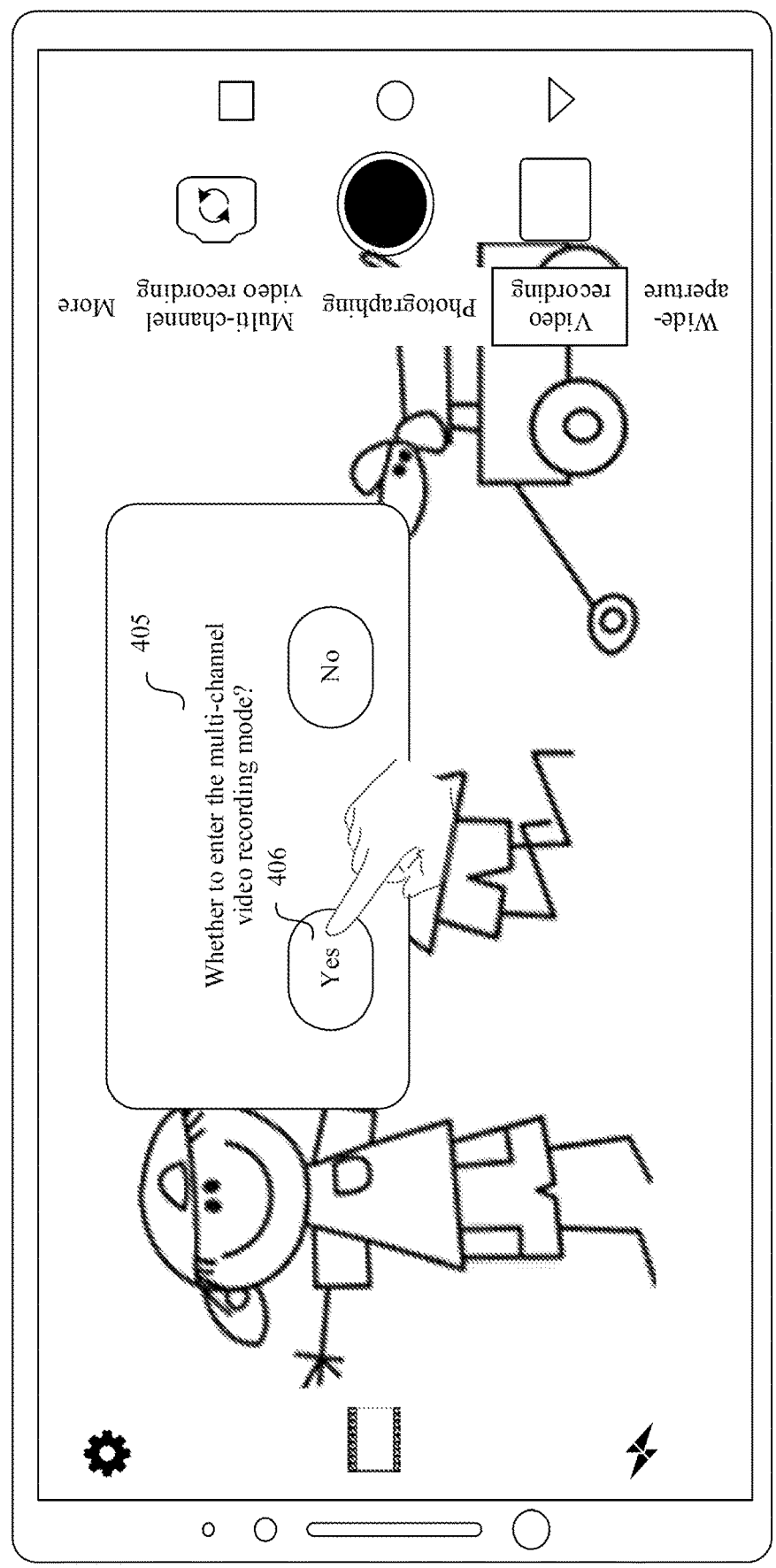
FIG. 4B is a schematic diagram of another interface according to an embodiment of this application.

For another example, in the video recording mode (the single-channel video recording mode), the mobile phone may prompt, in a video recording preview interface, the user whether to enter the multi-channel video recording mode. For example, referring to FIG. 4B, the mobile phone may display information 405 to prompt the user. After detecting an operation of tapping a control 406 by the user, the mobile phone enters the multi-channel video recording mode.

In some other embodiments, when the user wants to use the mobile phone to perform multi-channel video recording, the mobile phone may enable the camera function and directly enter the multi-channel video recording mode according to an instruction, such as a touch operation, a key operation, a mid-air gesture operation, or a voice operation, of the user.

Figure 4C:
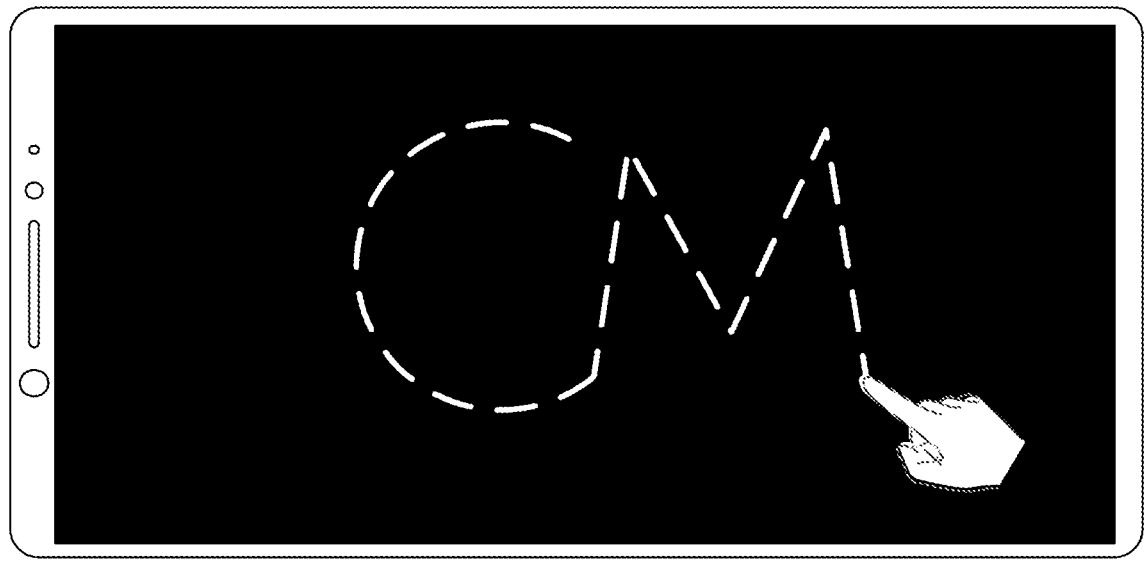
FIG. 4C is a schematic operation diagram according to an embodiment of this application.

For example, when the mobile phone displays a desktop or displays an interface of another application, if the mobile phone receives a voice instruction of the user for instructing to enter the multi-channel video recording mode, the mobile phone starts the camera and enters the multi-channel video recording mode. For another example, when the screen is turned on and displays a desktop, or when the screen is turned off, as shown in FIG. 4C, if the mobile phone detects an operation of drawing a preset track 2 (for example, a "CM" track) by the user on the touchscreen, the mobile phone starts the camera and enters the multi-channel video recording mode.

The above-described manners of entering the multi-channel video recording mode are merely examples for description. The mobile phone may alternatively enter the multi-channel video recording mode in another manner. The manner is not specifically limited in the embodiments of this application.

After entering the multi-channel video recording mode, the mobile phone may acquire and display a plurality of channels of images in a preview state by using N camera lenses.

In some embodiments, in the preview state of the multi-channel video recording mode, the mobile phone may acquire a plurality of channels of images based on N (N is an integer greater than 1) default camera lenses. Sizes, ranges, content, definitions, and the like of images acquired by different camera lenses may be different. As a plurality of camera lenses simultaneously acquire a plurality of channels of images, more abundant picture information that occurs at a same moment or in a same scene may be obtained. Frame rates of image acquisition of the N camera lenses may be equal. The mobile phone may acquire N frames of images at a same moment by using the N camera lenses. For example, N is 2, and the N camera lenses may be the rear-facing wide-angle camera lens and the rear-facing long-focus camera lens.

The N camera lenses may correspond to a same focal length range, or may correspond to different focal length ranges. The focal length ranges may include, but are not limited to, a first focal length range with a focal length less than a preset value 1 (for example, 20 mm), for example, the ultra-wide-angle camera lens may correspond to the first focal length range; a second focal length range with a focal length greater than or equal to the preset value 1 and less than or equal to a preset value 2 (for example, 50 mm), for example, the wide-angle camera lens may correspond to the second focal length range; and a third focal length range with a focal length greater than the preset value 2, for example, the long-focus camera lens may correspond to the third focal length range.

The N camera lenses may include a rear-facing camera lens and/or a front-facing camera lens. For example, the mobile phone may simultaneously use two rear-facing camera lenses to perform two-channel rear video recording. For another example, the mobile phone may use one front-facing camera lens and one rear-facing camera lens to perform two-channel front-rear video recording. For still another example, the mobile phone may use three rear-facing camera lenses to perform three-channel rear video recording. For still another example, the mobile phone may use two rear-facing camera lenses and one front-facing camera lens to perform three-channel video recording. For yet another example, the mobile phone may use two rear-facing camera lenses and two front-facing camera lenses to perform four-channel video recording. For still yet another example, the mobile phone may use two front-facing camera lenses to perform two-channel video recording.

A plurality of rear-facing camera lenses are usually corresponding to a plurality of focal length ranges. When the mobile phone simultaneously uses a plurality of rear-facing camera lenses to perform multi-channel video recording, picture information within different focal length ranges and different field of view ranges may be simultaneously acquired. For example, the mobile phone may include three rear-facing camera lenses and one front-facing camera lens. The three rear-facing camera lenses are an ultra-wide-angle camera lens, a wide-angle camera lens, and a long-focus camera lens. The front-facing camera lens may correspond to the second focal length range. The rear-facing ultra-wide-angle camera lens or wide-angle camera lens may acquire panoramic information within a larger field of view range. The rear-facing long-focus camera lens may acquire picture information within a smaller field of view range but with more clear and more abundant details.

For example, the N camera lenses may be the rear-facing ultra-wide-angle camera lens+the rear-facing wide-angle camera lens, the rear-facing ultra-wide-angle camera lens+ the rear-facing long-focus camera lens, the rear-facing wide-angle camera lens+the rear-facing long-focus camera lens, or the rear-facing ultra-wide-angle camera lens+the rear-facing wide-angle camera lens+the rear-facing long-focus camera lens.

When the mobile phone simultaneously uses a rear-facing camera lens and a front-facing camera lens to perform multi-channel video recording, pictures of a photographed object in front of the mobile phone and a photographer behind the mobile phone that occur simultaneously may be acquired, making it convenient for the user to save and watch. For example, the N camera lenses may be the front-facing camera lens and the rear-facing ultra-wide-angle camera lens, the front-facing camera lens+the rear-facing wide-angle camera lens, or the front-facing camera lens and the rear-facing long-focus camera lens.

In some other embodiments, in the preview state of the multi-channel video recording mode, the mobile phone may further display, based on a default display style, a plurality of channels of images simultaneously acquired by the N camera lenses. The display style includes a layout, sizes, and the like of images acquired by different camera lenses when they are displayed in an interface, that is, a layout and sizes of areas in which the images acquired by the different camera lenses are located in the interface.

For example, when N is 2, the display style may include a left-right spliced style, a top-bottom spliced style, a picture-in-picture style, or the like. In the spliced styles, different areas to be spliced may be equal or unequal, and there is almost no spacing between the different areas to be spliced, so that the touchscreen can be used to a maximum extent to display image information. The picture-in-picture style means that images acquired by different camera lenses are partially superimposed for display, or an image acquired by one camera lens may be displayed in a floating manner on an image acquired by another camera lens, and a size of the image displayed above in the floating manner is less than a size of the image below. For example, when N is 2, display styles may be shown in (a) to (e) in FIG. 5A. (a) to (c) are spliced formats, and (d) and (e) are picture-in-picture formats.

For another example, when N is 3, the display style may include a left-middle-right spliced style, a top-middle-bottom spliced style, a picture-in-picture style, or the like. For example, when N is 3, display styles may be shown in (a) to (f) in FIG. 5B. (a) to (d) are spliced formats, and (e) and (f) are picture-in-picture formats.

For still another example, when N is 4, the display style may include a horizontally parallel style, a vertically parallel style, a four-grid style, an upper/left lower/middle lower/right lower style, a picture-in-picture style, or the like. For example, when N is 4, display styles may be shown in (a) to (e) in FIG. 5C. (a) to (c) are spliced formats, and (d) and (e) are picture-in-picture formats.

The N default camera lenses and the default display style may be pre-configured in the mobile phone, or preset by the user (for example, set by the user in a system setting interface before the camera is started to perform shooting), or may be N camera lenses or a display style that is previously used by the user in the multi-channel video recording mode. For example, the N default camera lenses may be the rear-facing wide-angle camera lens and the rear-facing long-focus camera lens, the default display style may be (a) in FIG. 5A, and a multi-channel video recording preview interface may be shown in FIG. 2(c).

In some other embodiments, the mobile phone may further perform image stabilization processing on an image acquired by each of the N camera lenses, to obtain a clear image and then display the clear image. For example, the image stabilization processing may include motion estimation and motion compensation. The motion estimation is to find an optimal motion vector. The motion compensation is to compensate a current frame based on the motion vector to eliminate jitter. For example, an image stabilization processing method may include a grayscale projection method, a block matching method, a bit plane matching method, an edge matching method, a feature point matching method, and the like.

For example, when image stabilization processing is performed by using the block matching method, a frame of image may be divided into a plurality of (for example, 32*32) sub-blocks that do not overlap each other, and it is assumed that motion vectors of all pixels in the sub-block are the same. Then, in a specified search range, a current block is compared with a corresponding block in a previous frame, and a best match is found based on a matching criterion to obtain an alternative location of the current block or a corresponding motion vector, to compensate the current frame.

In a technical solution, two adjacent frames of images suffering from jitter are usually blurred due to content dislocation. The mobile phone may perform registration on the two adjacent frames of images, and then cut an edge part, to obtain a clear image. A dislocation in an image acquired by the long-focus camera lens with jitter is greater than that of the wide-angle camera lens or the ultra-wide-angle camera lens. Therefore, a larger part needs to be cut during image stabilization processing.

In some other embodiments, in the preview state of the multi-channel video recording mode, the mobile phone may further acquire and display a plurality of channels of images based on a default recording mode. The recording mode includes a correspondence between a display style and camera lenses. The mobile phone may acquire images by using N camera lenses corresponding to the default recording mode, and display the images by using a display style corresponding to the default recording mode.

For example, the recording mode may include a close-up mode, a front-rear mode, and the like, and the default recording mode may be the close-up mode. For example, camera lenses corresponding to the close-up mode are the rear-facing wide-angle camera lens and the rear-facing long-focus camera lens, and a corresponding display style is the style shown in (a) in FIG. 5A. For another example, camera lenses corresponding to the close-up mode are the rear-facing ultra-wide-angle camera lens and the rear-facing long-focus camera lens, and a corresponding display style is the style shown in (d) in FIG. 5A. For another example, camera lenses corresponding to the front-rear modes are the rear-facing wide-angle camera lens and the front-facing camera lens, and a corresponding display style is the style shown in (e) in FIG. 5A.

In the close-up mode, the mobile phone may simultaneously record a panoramic picture behind the mobile phone and a close-up picture of a close-up object, and respectively display a picture of a rear panoramic image and a picture of a rear close-up image in two areas, so that when the panoramic image corresponding to a large range is displayed, beauty of details of the close-up object can also be shown to the user.

In some embodiments, the mobile phone may obtain an image output ratio of a photosensitive element in a camera lens that acquires the panoramic image, and make an aspect ratio of an area in which the displayed panoramic image is located consistent with the image output ratio of the photosensitive element, so that it can be ensured that the panoramic image has a maximum field of view. The image output ratio of the photosensitive element is a ratio of a width to a height of an image formed by the photosensitive element. The mobile phone may further obtain an aspect ratio and a size of a display area of the touchscreen, and determine an aspect ratio of the close-up image based on the aspect ratio of the display area and the aspect ratio of the panoramic image, so that the panoramic image and the close-up image that are spliced in the multi-channel video recording preview interface fully occupy the display area of the entire touchscreen. In other words, there is almost no spacing between an area in which the panoramic image is located and an area in which the close-up image is located, and an entire area formed after the area in which the panoramic image is located and the area in which the close-up image is located are spliced has a size and an aspect ratio equal to those of the display area of the touchscreen, so that the touchscreen can be used to a maximum extent to present the images to the user.

Figure 5A:
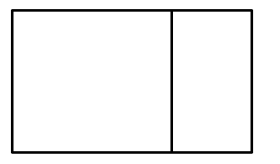
FIG. 5A is a schematic diagram of a group of display styles according to an embodiment of this application.
Figure 5A:
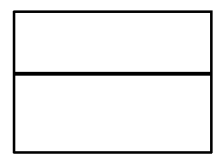
Figure 5A:
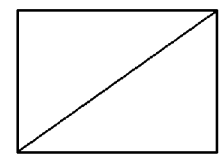
Figure 5A:
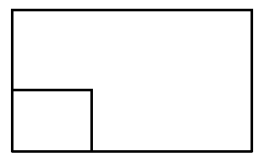
Figure 5A:
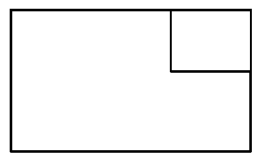
Figure 6A:
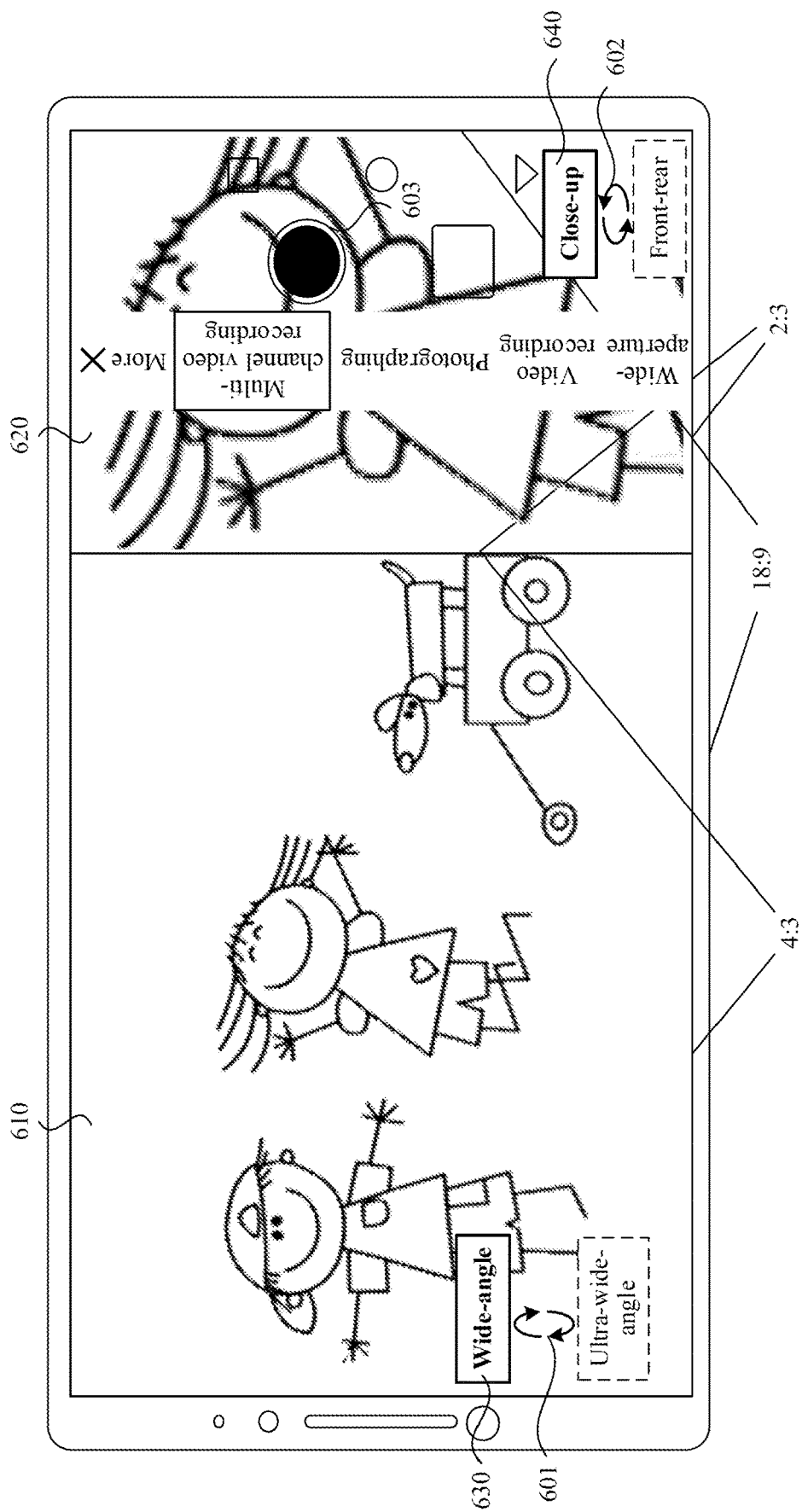
FIG. 6A is a schematic diagram of another interface according to an embodiment of this application.

For example, referring to FIG. 6A, a panoramic image is in an area 610, and a close-up image is in an area 620. When an image output ratio of a photosensitive element in a camera lens that acquires the panoramic image is 4:3, and an aspect ratio of the display area of the touchscreen is 18:9, an aspect ratio of the panoramic image (that is, an aspect ratio of the area 610) may also be 4:3, an aspect ratio of the close-up image (that is, an aspect ratio of the area 620) may be 2:3, a size of the image formed after the panoramic image and the close-up image are spliced is 18:9, the spliced image fully occupies the display area of the entire touchscreen, and a display style is the style shown in (a) in FIG. 5A. In some embodiments, the multi-channel video recording preview interface may further include a control 640 marked with "close-up" in a solid-line box shown in FIG. 6A, to prompt the user that a current mode is the close-up mode.

Figure 6B:
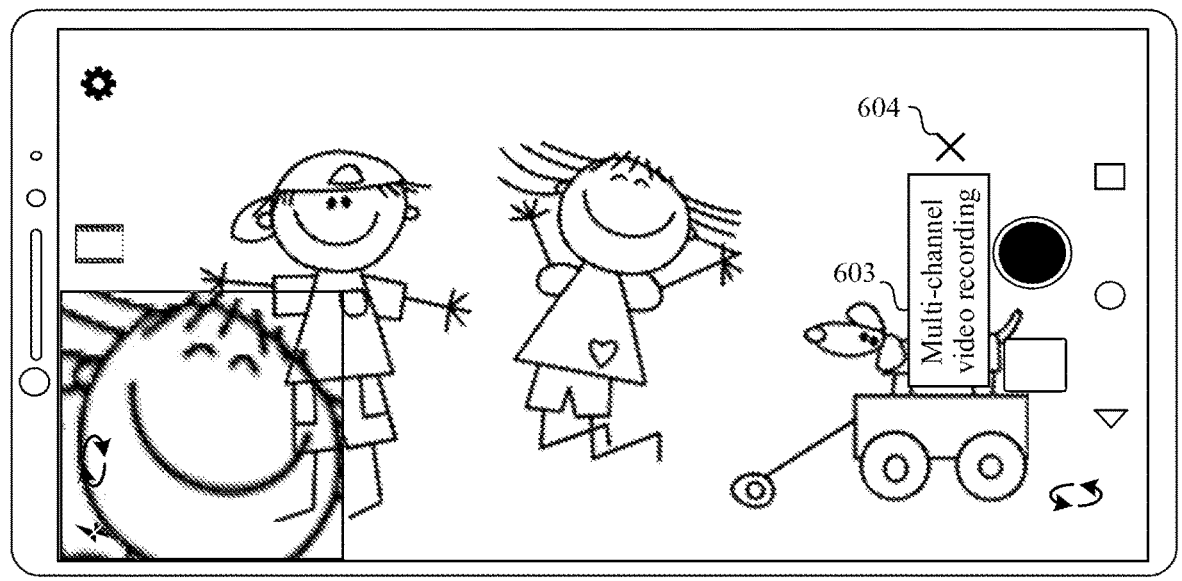
FIG. 6B is a schematic diagram of another interface according to an embodiment of this application.

For another example, when the picture-in-picture display style shown in (d) in FIG. 5A is used, for a preview effect in the close-up mode, refer to FIG. 6B. In some embodiments, after the multi-channel video recording mode is entered, as shown in FIG. 6B, the multi-channel video recording preview interface may display only a control 603 indicating that a current mode is the multi-channel video recording mode, and not display a "photographing" control, a "wide-aperture" control, or the like. As shown in FIG. 6B, the multi-channel video recording preview interface may further include a control 604. After detecting an operation of tapping the control 604 by the user, the mobile phone hides the control 603. In this way, it can be avoided as much as possible that a displayed image is blocked by the control, thereby improving visual experience of the user.

In the front-rear mode, the mobile phone may simultaneously record a picture behind the mobile phone and a picture in front of the mobile phone, for example, simultaneously record a picture of a photographed object behind and a picture of a photographer in front, and respectively display a rear image and a front image in two areas.

In some embodiments, an aspect ratio of an area in which the rear image is located is consistent with an image output ratio of a photosensitive element, so that it can be ensured that the rear image has a maximum field of view. In addition, a panoramic image and a close-up image after spliced may fully occupy the display area of the entire touchscreen, so that the touchscreen can be used to a maximum extent to present the images to the user.

Figure 6C:
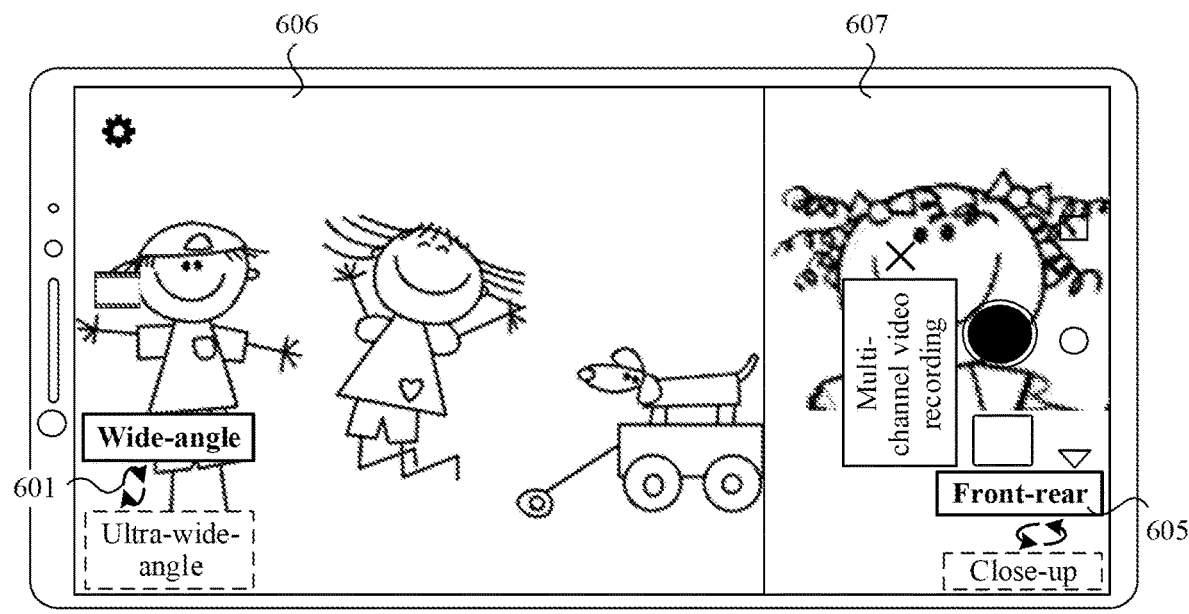
FIG. 6C is a schematic diagram of another interface according to an embodiment of this application.
Figure 6D:
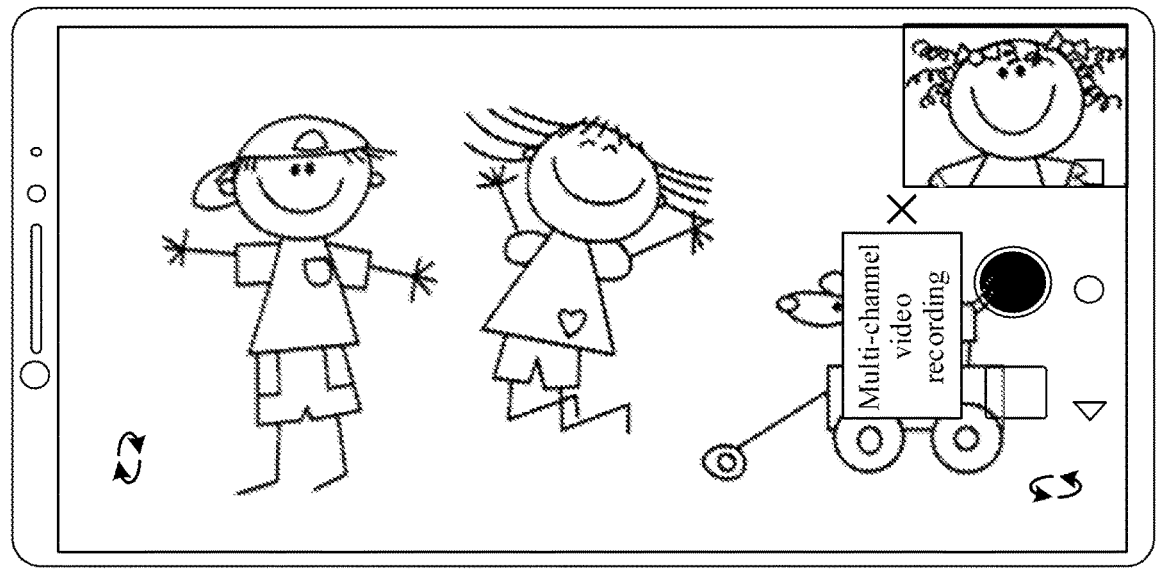
FIG. 6D is a schematic diagram of another interface according to an embodiment of this application.

For example, in the front-rear mode, when the display style shown in (a) in FIG. 5A is used, for a preview effect in the front-rear mode, refer to FIG. 6C. As shown in FIG. 6C, a control 605 marked with "front-rear" in a solid-line box indicates that a current mode is the front-rear mode, a rear image is in an area 606, and a front image is in an area 607. When the picture-in-picture display style shown in (e) in FIG. 5A is used, for a preview effect in the front-rear mode, refer to FIG. 6D.

In some other embodiments, in the preview state of the multi-channel video recording mode, the mobile phone may acquire a plurality of channels of images based on N camera lenses specified by the user. For example, similar to the camera lens identifiers shown in FIG. 4A, after the multi-channel video recording mode is entered, the multi-channel video recording preview interface may include camera lens identifiers. After detecting an operation of selecting a plurality of camera lenses by the user, the mobile phone simultaneously acquires images by using the plurality of camera lenses selected by the user.

Figure 7A:
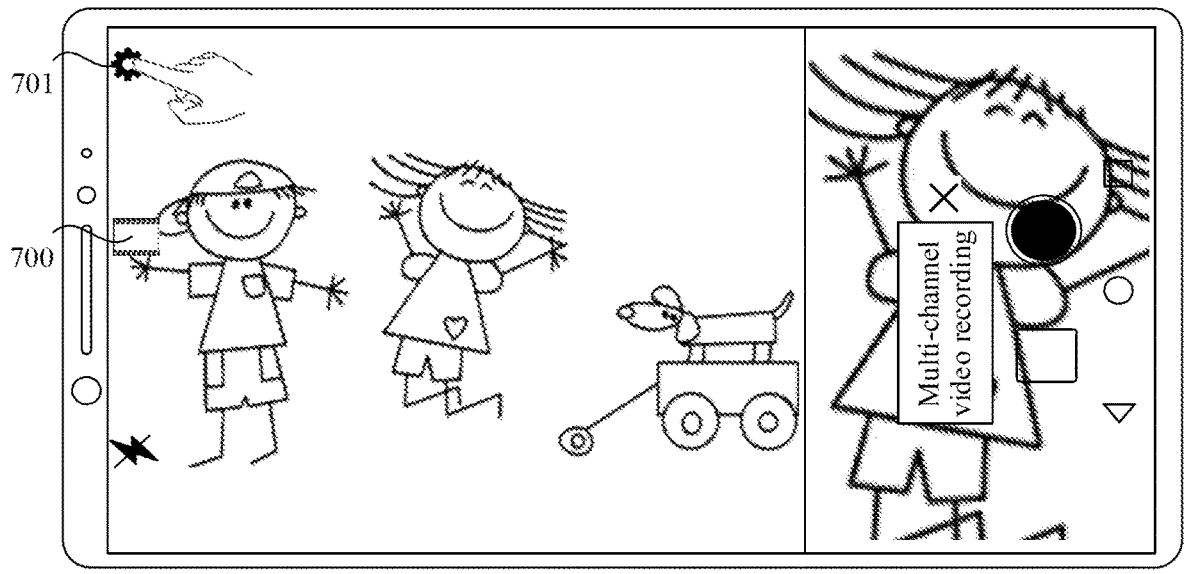
FIG. 7(a) and FIG. 7(b) are schematic diagrams of another group of interfaces according to an embodiment of this application.
Figure 7B:
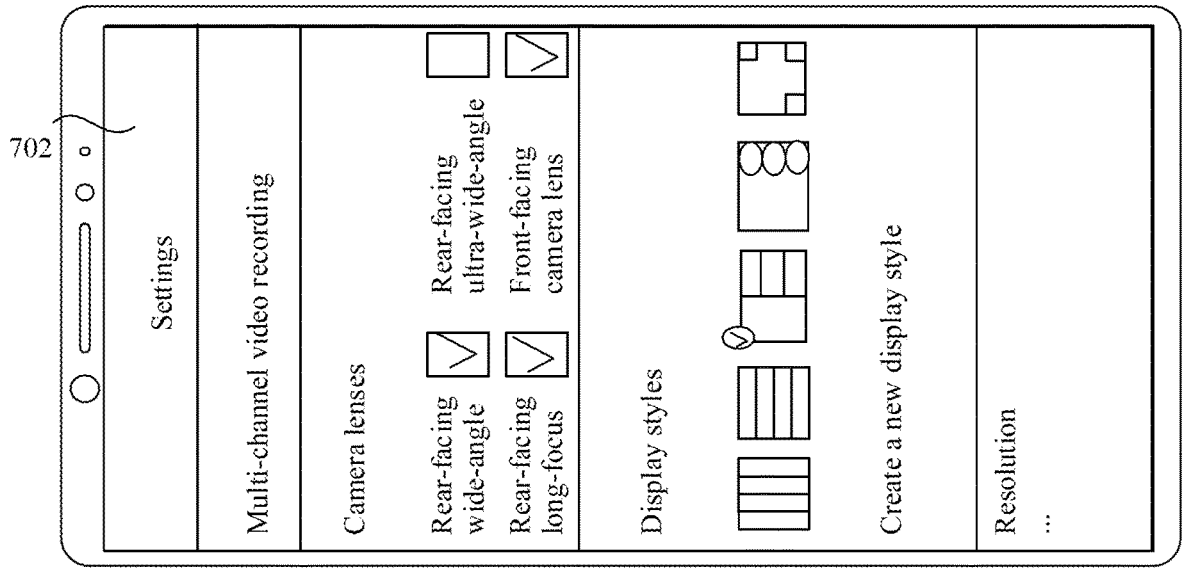

For another example, as shown in FIG. 7(*a*), a setting control 701 is displayed in the preview interface in the multi-channel video recording mode. After detecting an operation of tapping the control 701 by the user, the mobile phone may display a setting interface shown in FIG. 7(*b*). The user may set or change to, in the setting interface, N camera lenses used by the mobile phone during multi-channel video recording.

For another example, after entering the multi-channel video recording mode, the mobile phone may automatically pop up the setting interface shown in FIG. 7(*b*), so that the user sets or changes to a camera lens that the user wants to use.

Figure 8A:
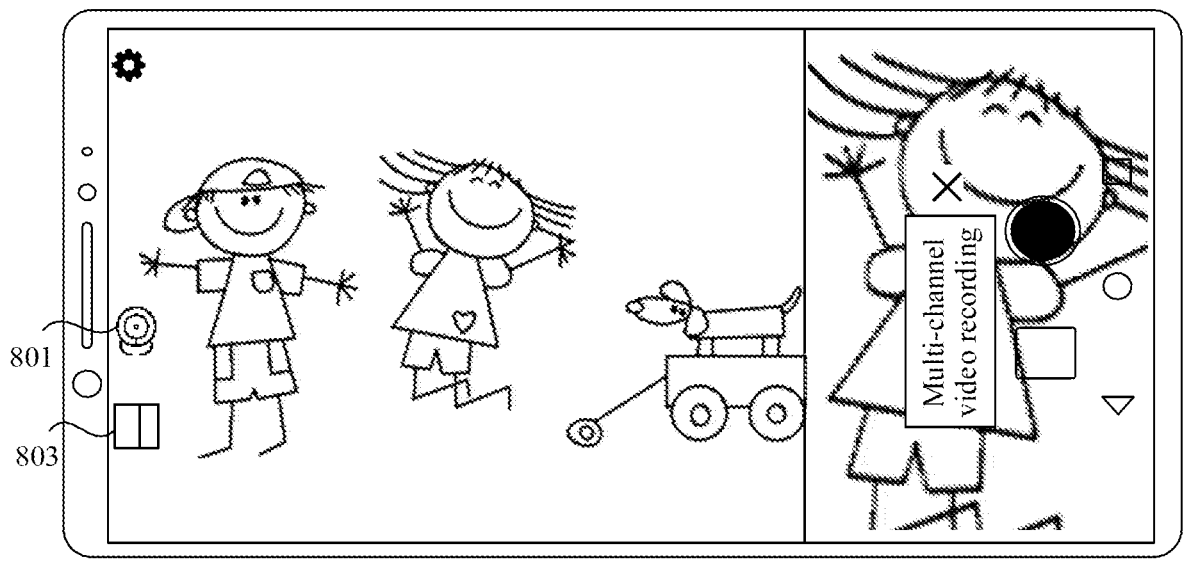
FIG. 8(a), FIG. 8(b), and FIG. 8(c) are schematic diagrams of another group of interfaces according to an embodiment of this application.
Figure 8B:
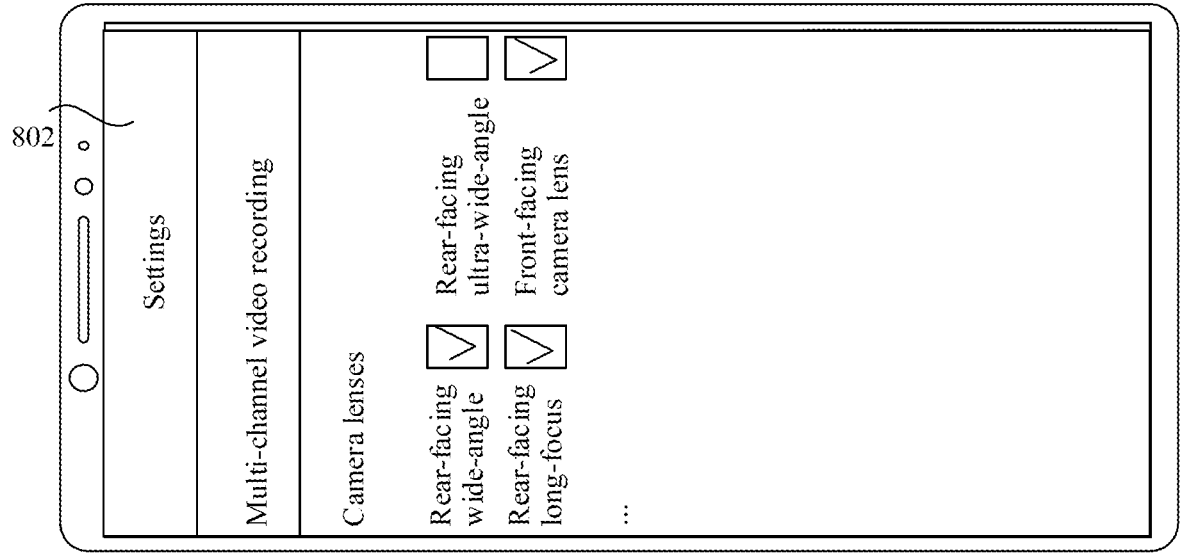

For another example, after the multi-channel video recording mode is entered, as shown in FIG. 8(*a*), the multi-channel video recording preview interface may include a camera lens setting control 801. After detecting an operation of tapping the control 801 by the user, the mobile phone may display a camera lens setting interface 802 shown in FIG. 8(*b*). The user may set or change to, in the camera lens setting interface 802, a camera lens that the user wants to use during multi-channel video recording.

In some other embodiments, in the preview state of the multi-channel video recording mode, the mobile phone may display, in the multi-channel video recording preview interface and based on a display style specified by the user, a plurality of channels of images simultaneously acquired by N camera lenses. For example, the user may select a display style or create a new display style by using the setting interface 702 shown in FIG. 7(*b*).

For another example, after the multi-channel video recording mode is entered, as shown in FIG. 8(*a*), the multi-channel video recording preview interface may include a display style setting control 803. After detecting an operation of tapping the control 803 by the user, the mobile phone may display a display style setting interface 804 shown in FIG. 8(*c*). The user may set, in the display style setting interface 804, a display style that the user wants to use during multi-channel video recording.

Figure 5B:
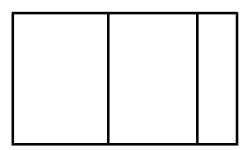
FIG. 5B is a schematic diagram of another group of display styles according to an embodiment of this application.
Figure 5B:
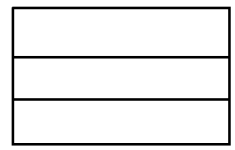
Figure 5B:
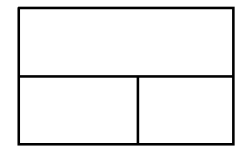
Figure 5B:
Figure 5B:
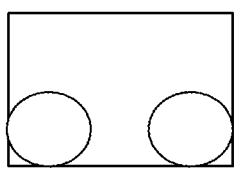
Figure 5B:
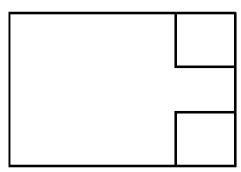
Figure 5C:
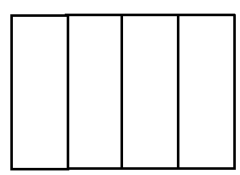
FIG. 5C is a schematic diagram of another group of display styles according to an embodiment of this application.
Figure 5C:
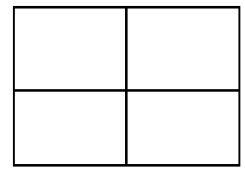
Figure 5C:
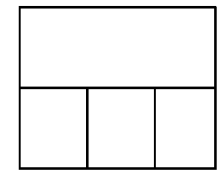
Figure 5C:
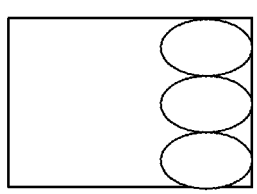
Figure 5C:
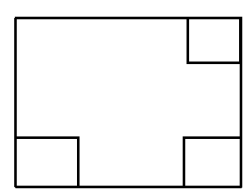
Figures 8C, 9A:
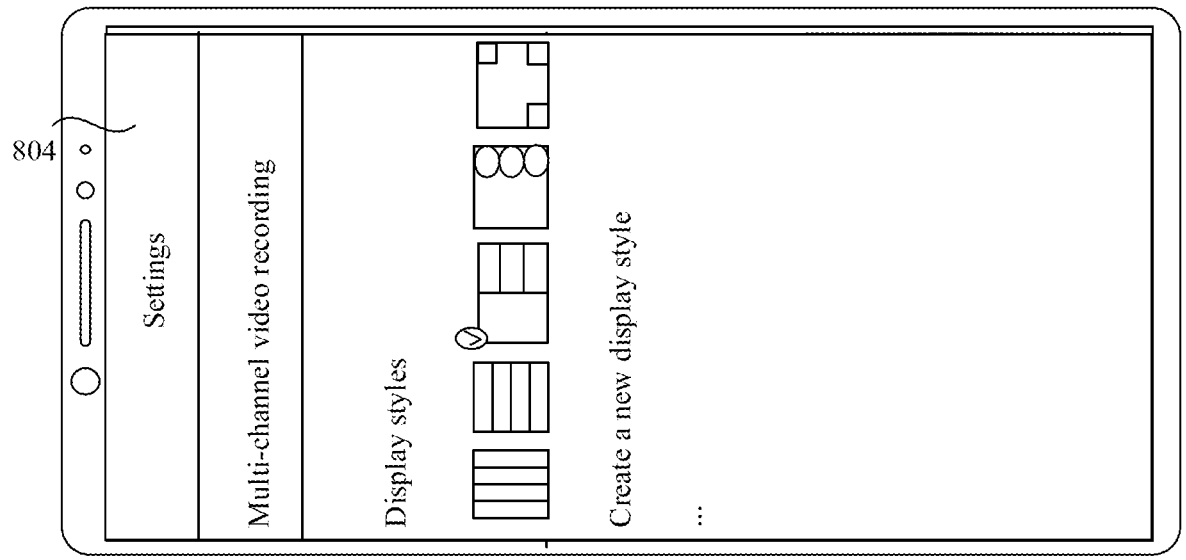
FIG. 9A is a schematic diagram of another interface according to an embodiment of this application.
Figure 9B:
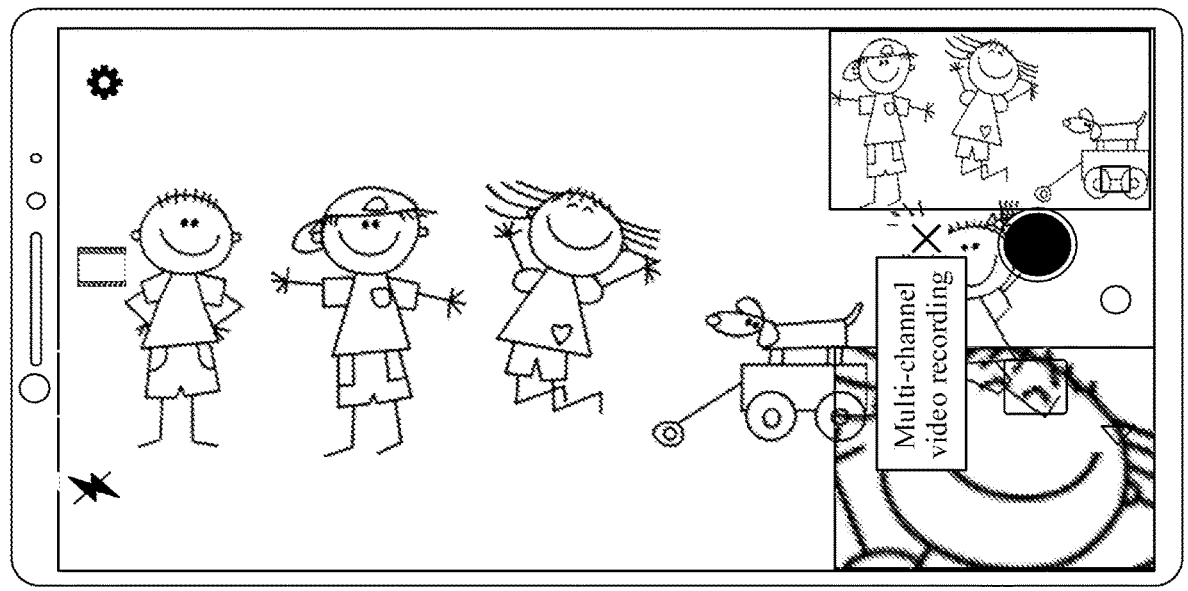
FIG. 9B is a schematic diagram of another interface according to an embodiment of this application.

For example, when camera lenses specified by the user are the ultra-wide-angle camera lens, the wide-angle camera lens, and the long-focus camera lens, and a display style specified by the user is the spliced format shown in (d) in FIG. 5B, the multi-channel video recording preview interface may be shown in FIG. 9A. When camera lenses specified by the user are the ultra-wide-angle camera lens, the long-focus camera lens, and the front-facing camera lens, and a display style specified by the user is the picture-in-picture format shown in (0 in FIG. 5B, the multi-channel video recording preview interface may be shown in FIG. 9B.

Figure 10A:
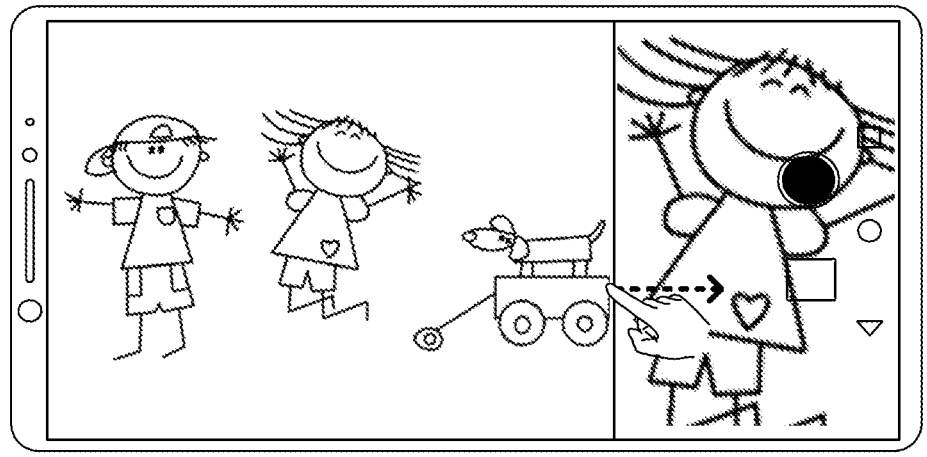
FIG. 10(a), FIG. 10(b), and FIG. 10(c) are schematic diagrams of another group of interfaces according to an embodiment of this application.
Figure 10B:
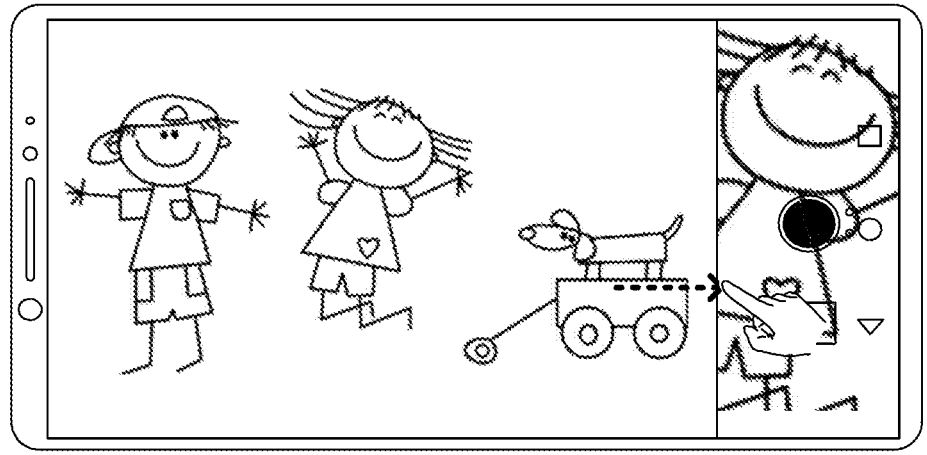
Figure 10C:
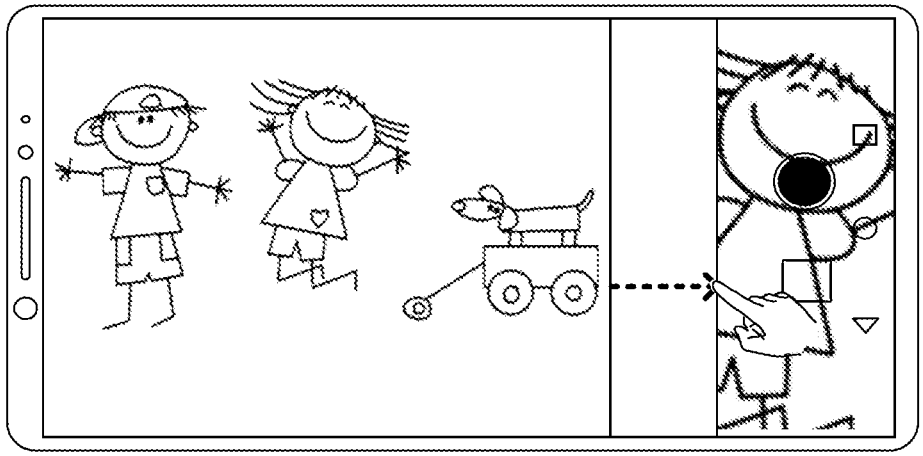

In some other embodiments, in the preview state of the multi-channel video recording mode, the user may further drag locations of different areas on a shooting screen to change arrangement locations of the different areas, or drag a boundary line between different areas to change sizes of the different areas to achieve a layout effect that the user wants. Then, the mobile phone may simultaneously display, based on a layout and sizes of the areas after the changing, a plurality of channels of images acquired by a plurality of camera lenses. For example, for a schematic diagram of a modification effect of a display style, refer to FIG. 10(*a*) and FIG. 10(*b*), or refer to FIG. 10(*a*) and FIG. 10(*c*).

In some other embodiments, in the preview state of the multi-channel video recording mode, the user may further change a recording mode. For example, the mobile phone is currently in the close-up mode shown in FIG. 6A. After detecting an operation of tapping a switching control 602 by the user, the mobile phone may switch to the front-rear mode shown in FIG. 6C. If a current recording mode is the front-rear mode shown by the control 605 in FIG. 6C, after detecting an operation of tapping the switching control 602 by the user, the mobile phone may switch to the close-up mode shown in FIG. 6A.

Figure 6E:
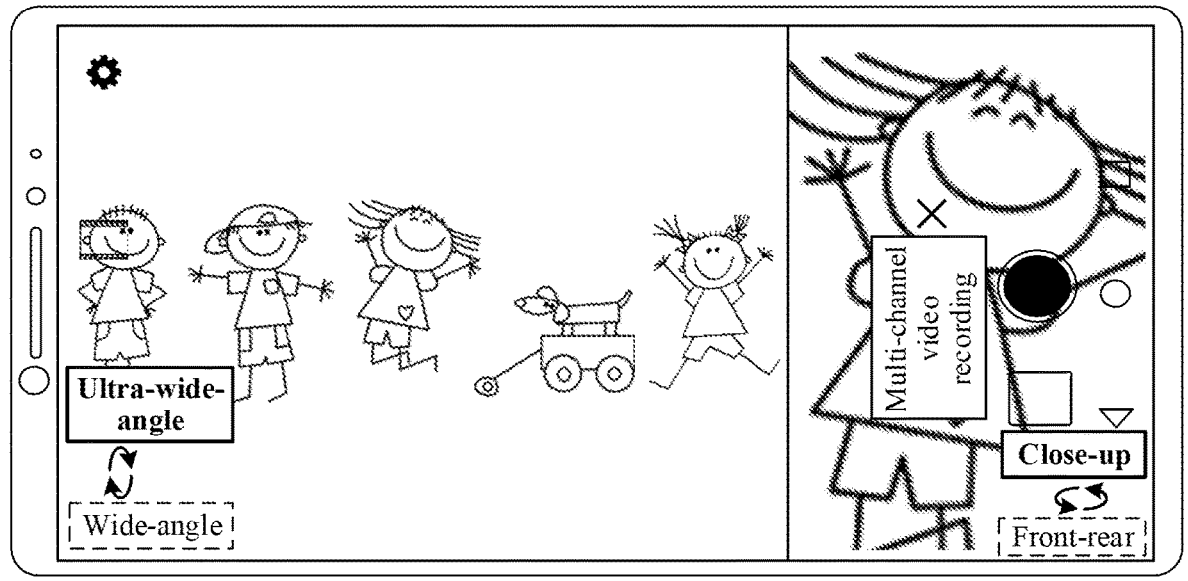
FIG. 6E is a schematic diagram of another interface according to an embodiment of this application.

In some other embodiments, in a preview state of the close-up mode, the mobile phone may perform, according to an instruction of the user, switching between camera lenses used to acquire a panoramic image. For example, after the mobile phone detects an operation of tapping, by the user, a switching control 601 shown in FIG. 6A, if a camera lens that currently acquires a panoramic image is the rear-facing wide-angle camera lens, the mobile phone switches to using the rear-facing ultra-wide-angle camera lens to acquire a panoramic image. For a corresponding preview interface after the camera lens switching, refer to FIG. 6E. If a camera lens that currently acquires a panoramic image is the rear-facing ultra-wide-angle camera lens, after detecting an operation of tapping the switching control 601 by the user, the mobile phone may switch to using the rear-facing wide-angle camera lens to acquire a panoramic image. In some other embodiments, the multi-channel video recording preview interface may further include a control 630 marked with "wide-angle" in a solid-line box shown in FIG. 6A, to indicate that the wide-angle camera lens is currently used to acquire a panoramic image; and include a control marked with "ultra-wide-angle" in a dashed-line box shown in FIG. 6A, to indicate that the ultra-wide-angle camera lens may be switched to being used to acquire a panoramic image.

For another example, in the front-rear mode, the mobile phone may switch, according to an instruction of the user, a camera lens used to acquire a rear image to the rear-facing wide-angle camera lens or the rear-facing ultra-wide-angle camera lens. For example, referring to FIG. 6C, after the mobile phone detects an operation of tapping the switching control 601 by the user, if a camera lens that currently acquires a rear image is the wide-angle camera lens, the mobile phone switches to using the ultra-wide-angle camera lens to acquire a rear image. If a camera lens that currently acquires a rear image is the ultra-wide-angle camera lens, the mobile phone switches to using the wide-angle camera lens to acquire a rear image.

In some embodiments, in the close-up mode, a panoramic image may be an image acquired by the ultra-wide-angle camera lens or the wide-angle camera lens, and a close-up image may be a zoomed-in image of a part of an image acquired by the ultra-wide-angle camera lens/wide-angle camera lens, or may be a full image acquired by the long-focus camera lens, a partial area of an image acquired by the long-focus camera lens, or a zoomed-in image of a part of an image acquired by the long-focus camera lens. The close-up image can display detail information of a close-up object in a zoomed-in manner.

In other words, the panoramic image is an image acquired by a first camera lens, that is, the panoramic image is from the first camera lens, and the first camera lens may be the ultra-wide-angle camera lens or the wide-angle camera lens. The close-up image may be from a second camera lens, and the second camera lens may be the ultra-wide-angle camera lens, the wide-angle camera lens, or the long-focus camera lens. The second camera lens may be the same as or different from the first camera lens.

It should be noted that, for an image acquired by the first camera lens, the mobile phone may perform processing such as image stabilization by cutting a small edge area, to obtain a panoramic image of higher quality.

In the preview state of the close-up mode, the user may further adjust a zoom ratio corresponding to a close-up image. As the zoom ratio increases, a zoom-in multiple of the close-up image also increases accordingly. As the zoom ratio decreases, the zoom-in multiple of the close-up image also decreases accordingly.

Figure 11A:
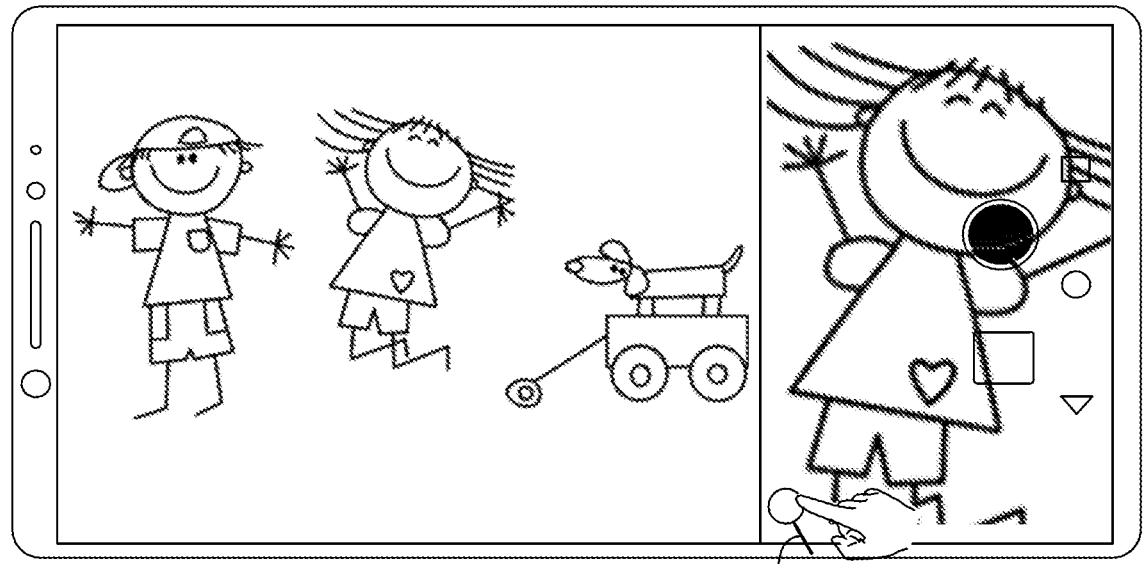
FIG. 11(a) and FIG. 11(b) are schematic diagrams of another group of interfaces according to an embodiment of this application.
Figure 11B:
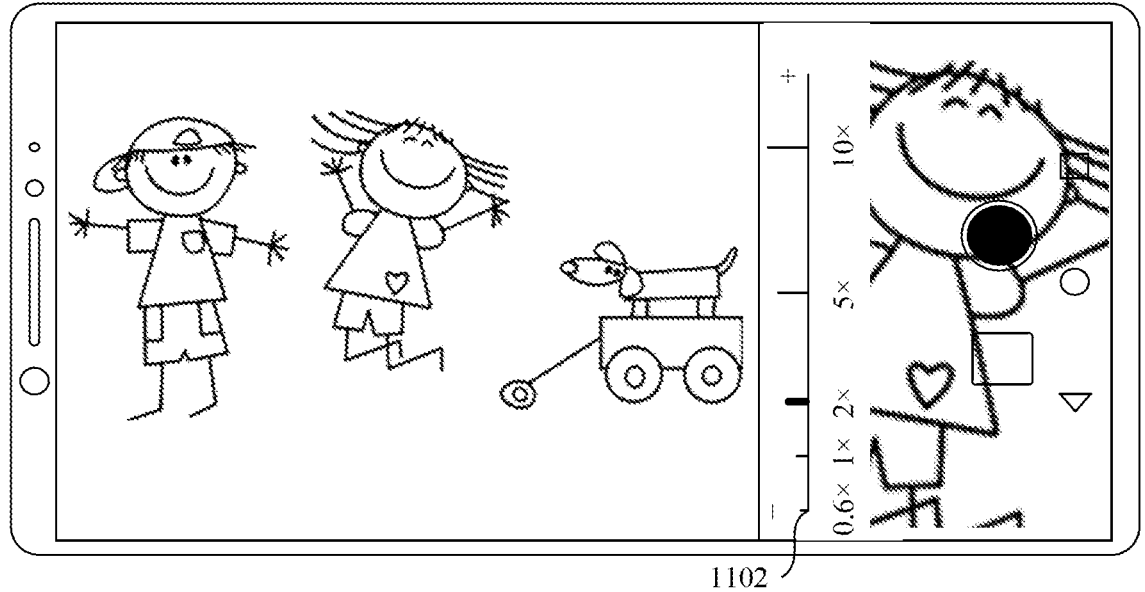

For example, referring to FIG. 11(a), when detecting that the user taps a control 1101, the mobile phone may display a zoom ruler 1102 shown in FIG. 11(b). When the mobile phone detects an upward/downward drag operation performed by the user on the zoom ruler 1102, the mobile phone increases/decreases a zoom ratio of a close-up image.

Figure 12A:
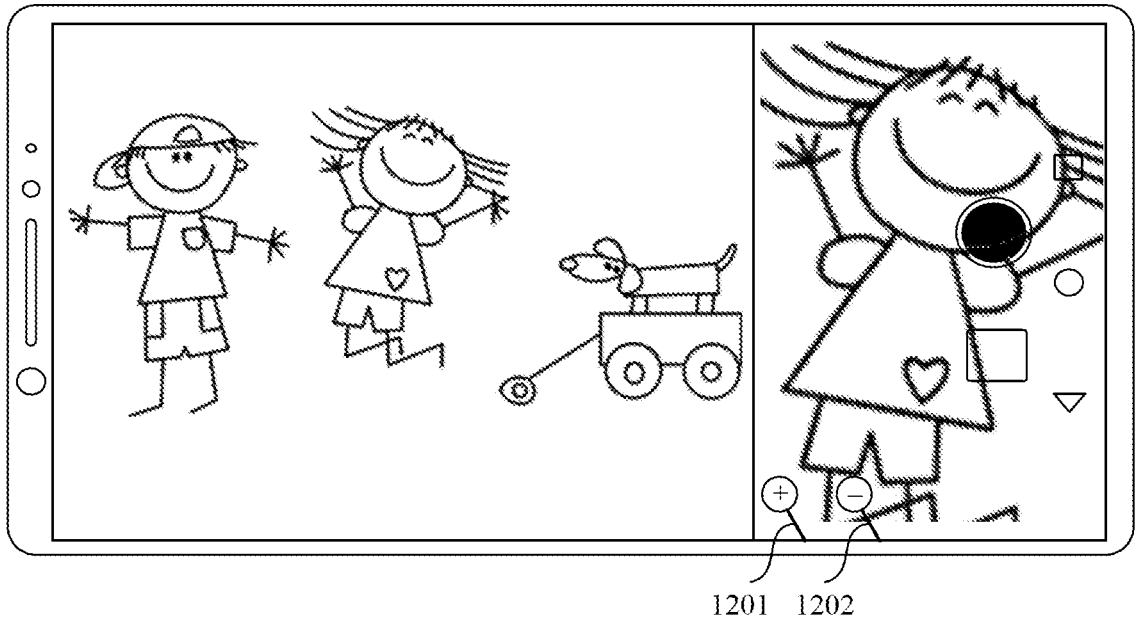
FIG. 12A is a schematic diagram of another interface according to an embodiment of this application.

For another example, referring to FIG. 12A, when detecting that the user taps a control 1201, the mobile phone may increase a zoom ratio of a close-up image based on a preset step. When detecting that the user taps a control 1202, the mobile phone may decrease the zoom ratio of the close-up image based on the preset step.

Figure 12B:
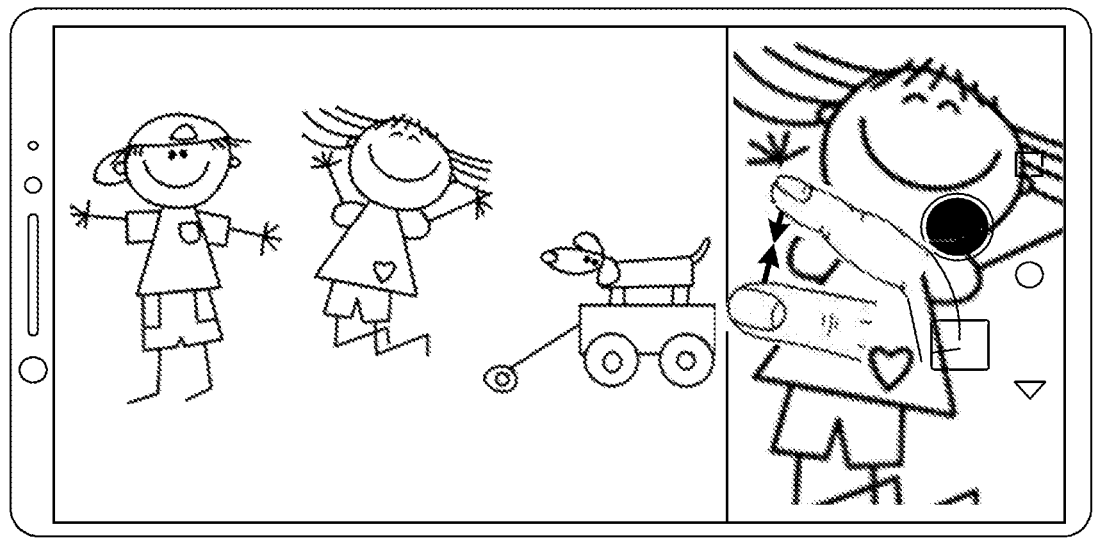
FIG. 12B is a schematic diagram of another interface according to an embodiment of this application.

For another example, referring to FIG. 12B, when detecting a pinch gesture of the user, the mobile phone may decrease a zoom ratio of a close-up image. When the mobile phone detects a spread gesture, the mobile phone may increase the zoom ratio of the close-up image.

With the change of the zoom ratio of the close-up image, the second camera lens may also be switched between different rear-facing camera lenses. For example, if the close-up image is an image acquired by the ultra-wide-angle camera lens or a zoomed-in image of a part, as the zoom ratio increases, the close-up image may be switched to an image acquired by the wide-angle camera lens or the long-focus camera lens or a zoomed-in image of a part. If the close-up image is an image acquired by the long-focus camera lens or a zoomed-in image of a part, as the zoom ratio decreases, the close-up image may be switched to an image acquired by the wide-angle camera lens or the ultra-wide-angle camera lens or a zoomed-in image of a part.

In some embodiments, the close-up image is a central area of an image acquired by the second camera lens (that is, a central area of a field of view of the second camera lens), or the close-up image is a zoomed-in image of the central area of the image acquired by the second camera lens. It may be understood that rear-facing camera lenses such as the ultra-wide-angle camera lens, the wide-angle camera lens, and the long-focus camera lens that are disposed on the mobile phone are very close to each other, and therefore, central areas of fields of view of these rear-facing camera lenses are generally consistent. To be specific, photographed objects in central areas of images acquired by the first camera lens and the second camera lens are generally consistent, and the close-up image may correspond to a central area of the panoramic image.

Usually, the user sets a focus object or a key object that the user is concerned about in a central area of a field of view, and an image of the focus object or the key object is usually presented in a central area of an image acquired by the second camera lens. When the close-up image is the central area of the image acquired by the second camera lens, a close-up picture of the focus object or the key object may be presented to the user, to provide the user with detail information of the focus object or the key object.

When the rear-facing camera lens of the mobile phone includes the ultra-wide-angle camera lens, the wide-angle camera lens, and the long-focus camera lens, the wide-angle camera lens with an intermediate field of view range may be used as a primary camera lens. A zoom ratio corresponding to an image acquired by the primary camera lens may be 1. The panoramic image may be an image acquired by the wide-angle camera lens or the ultra-wide-angle camera lens.

Figure 13A:
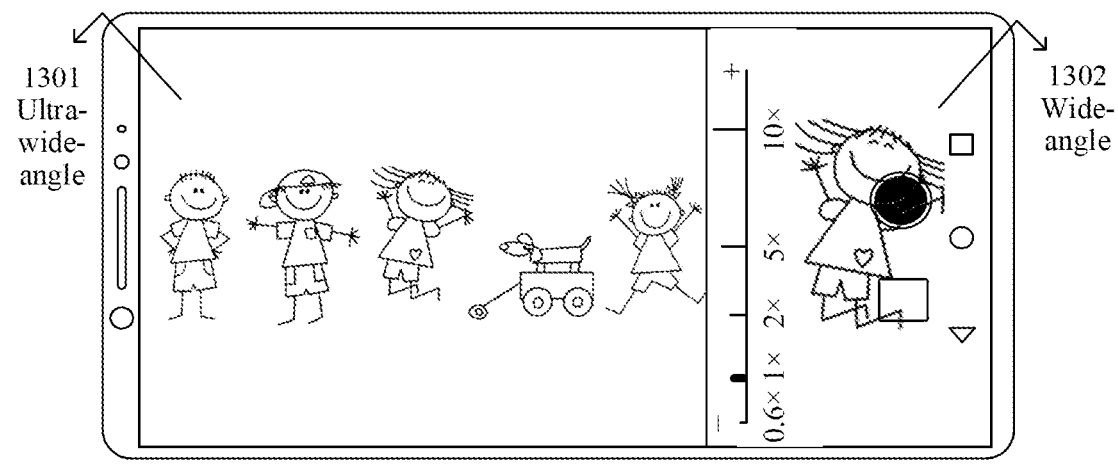
FIG. 13(a), FIG. 13(b), FIG. 13(c), and FIG. 13(d) are schematic diagrams of another group of interfaces according to an embodiment of this application.
Figure 13B:
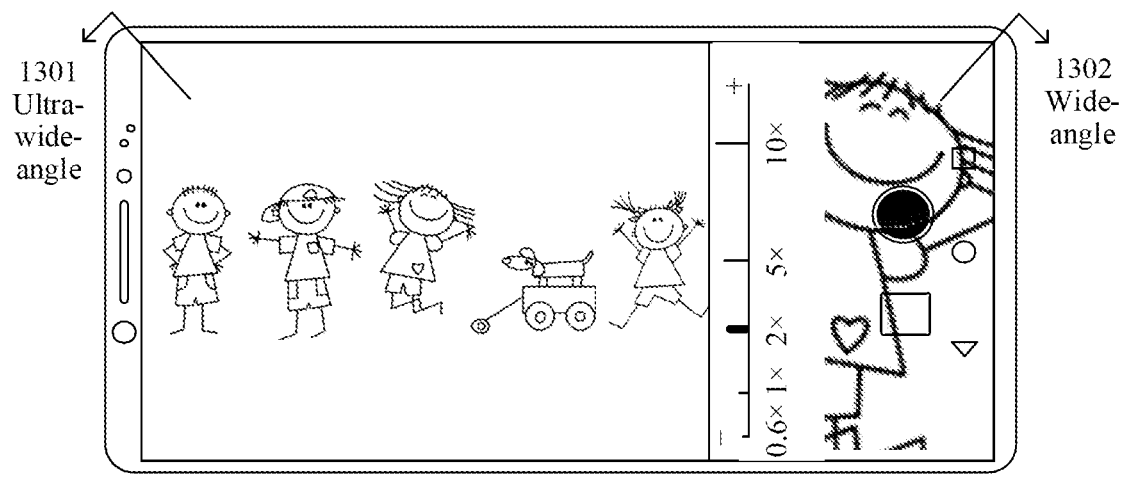
Figure 13C:
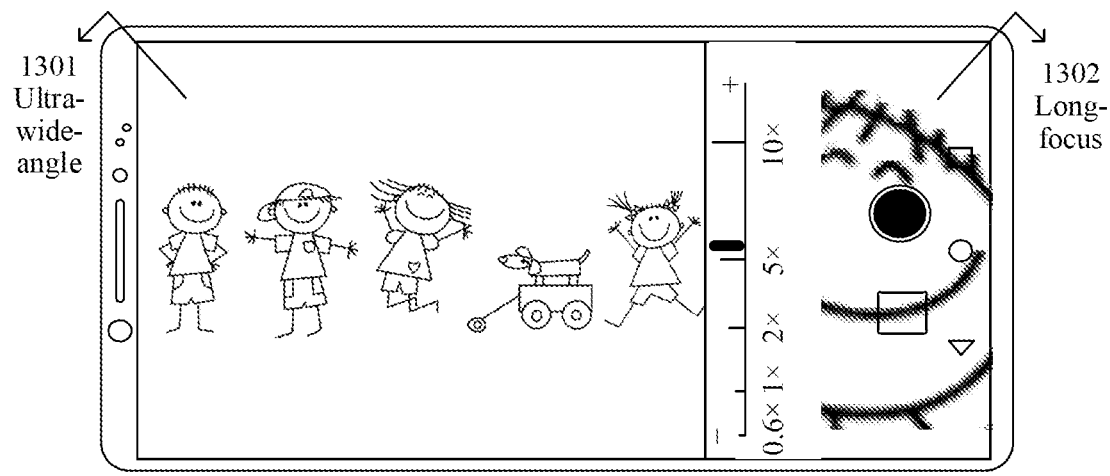
Figure 13D:
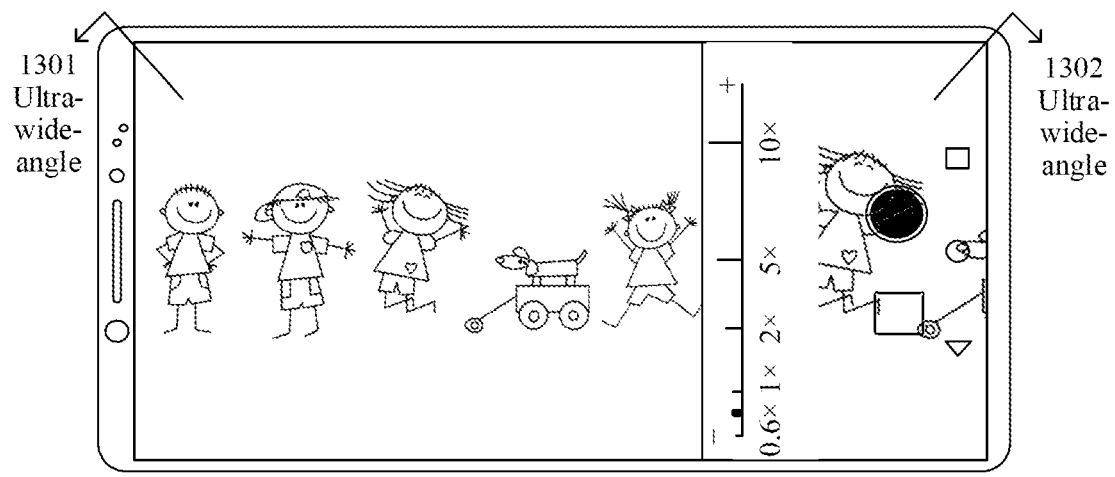

For example, as shown in FIG. 13(a), the first camera lens is the ultra-wide-angle camera lens, and the second camera lens is the wide-angle camera lens. A panoramic image in a first area 1301 is an image acquired by the ultra-wide-angle camera lens. A close-up image in a second area 1302 is a cut part in a central area of an image acquired by the wide-angle camera lens, and a zoom ratio currently corresponding to the close-up image is 1.

In a case shown in FIG. 13(a), if the mobile phone detects that the user instructs, in the manner shown in FIG. 11(a) and FIG. 11(b), FIG. 12A, or FIG. 12B, to increase the zoom ratio, and an increased zoom ratio is greater than 1 and less than a first preset value (for example, 5), the mobile phone cuts, based on the increased zoom ratio (for example, 2) and a size of the second area 1302, a part in a middle area of a picture acquired by the wide-angle camera lens, zooms in the part, and then displays the part in the second area 1302, as shown in FIG. 13(*b*).

In a case shown in FIG. 13(*b*), if the mobile phone detects that the user instructs, in the manner shown in FIG. 11(*a*) and FIG. 11(*b*), FIG. 12A, or FIG. 12B, to increase the zoom ratio, and an increased zoom ratio is greater than or equal to the first preset value, the mobile phone switches the second camera lens from the wide-angle camera lens to the long-focus camera lens, cuts, based on the increased zoom ratio (for example, 6) and the size of the second area 1302, a part in a middle area of a picture acquired by the wide-angle camera lens, zooms in the part, and then display the part in the second area 1302, as shown in FIG. 13(*c*).

In the case shown in FIG. 13(*a*), if the mobile phone detects that the user instructs, in the manner shown in FIG. 11(*a*) and FIG. 11(*b*), FIG. 12A, or FIG. 12B, to decrease the zoom ratio, and a decreased zoom ratio is less than 1 and is greater than or equal to a second preset value (for example, 0.6), the mobile phone switches the second camera lens from the wide-angle camera lens to the ultra-wide-angle camera lens, cuts, based on the decreased zoom ratio (for example, 0.8) and the size of the second area 1302, a part in a middle area part of a picture acquired by the wide-angle camera lens, zooms in the part, and then display the part in the second area 1302, as shown in FIG. 13(*d*). In this case, both the panoramic image and the close-up image are from the ultra-wide-angle camera lens.

In other words, when the zoom ratio of the close-up image is within a range of [the second preset value, 1), the second camera lens may be the ultra-wide-angle camera lens. When the zoom ratio of the close-up image is within a range of [1, the first preset value), the second camera lens may be the wide-angle camera lens. When the zoom ratio of the close-up image is greater than or equal to the first preset value, the second camera lens may be the long-focus camera lens.

Figure 14:
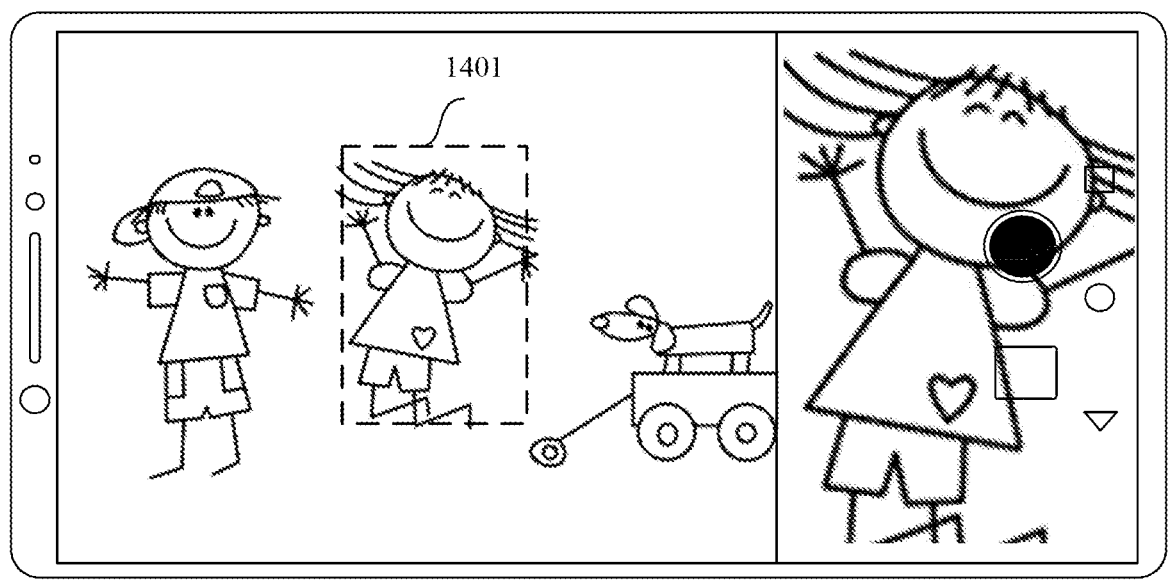
FIG. 14 is a schematic diagram of another interface according to an embodiment of this application.

When the user moves the mobile phone, the close-up image changes with a change of a photographed object in the central area of the field of view of the second camera lens. In a technical solution, referring to FIG. 14, the mobile phone may display, on a panoramic image, a control 1401 used to mark a central area of a field of view of a rear-facing camera lens. When the user wants to switch to a close-up object, the user may move the mobile phone, so that a whole or a major part of the close-up object is in the area framed by the control 1401 on the panoramic image, so that the close-up object is in the central area of the field of view of the camera lens, and the close-up image can display detail information of the close-up object in a zoomed-in manner.

In some other embodiments, the mobile phone may display a picture of a default close-up object. For example, the default close-up object may be an object in a central area of a panoramic image. For another example, the default close-up object may be a person close to the central area. After the user specifies a close-up object, the mobile phone may display a close-up image corresponding to the switched-to close-up object.

In some other embodiments, in the preview state of the multi-channel video recording mode, the mobile phone may not display a close-up image at first, but display a close-up image after the user specifies a close-up object.

Figure 15A:
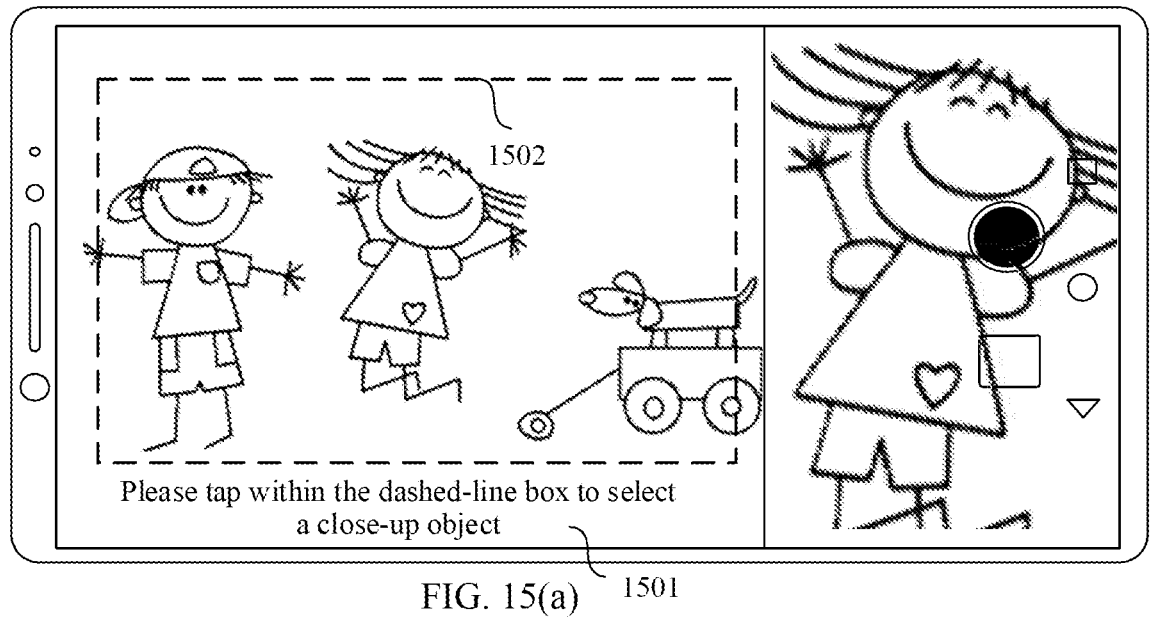
FIG. 15(a) and FIG. 15(b) are schematic diagrams of another group of interfaces according to an embodiment of this application.
Figure 15B:
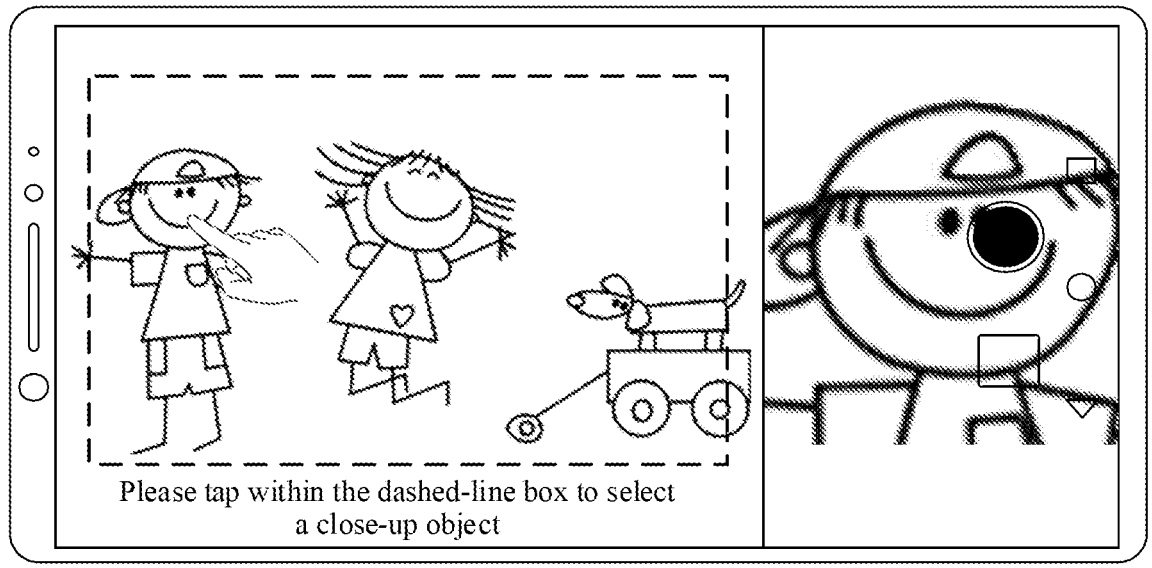

In some other embodiments, in the preview state of the multi-channel video recording mode, regardless of whether the mobile phone is displaying a close-up image, the user may specify a close-up object, and the mobile phone displays a corresponding close-up image based on the close-up object specified by the user. For example, referring to FIG. 15(*a*), the mobile phone may prompt, by using information 1501, the user to tap a location in a dashed-line box 1502 to select a close-up object. After the mobile phone detects an operation of tapping a location on a panoramic image by the user, a photographed object corresponding to the location is a close-up object. Referring to FIG. 15(*b*), a close-up image is a zoomed-in image picture of the location.

In a technical solution, a close-up image may be a zoomed-in image of a part of a panoramic image, and the close-up image may be a zoomed-out/in picture of a close-up object. To avoid a problem in zooming in a close-up image caused because a close-up object is at an edge location of a panoramic image, the user may select a close-up object in the dashed-line box 1502 away from an edge area of the panoramic image.

In another technical solution, a close-up image may be a zoomed-in image of a part of an image acquired by the second camera lens, an image in the dashed-line box 1502 is an image corresponding to the field of view of the second camera lens, and the user may select a close-up object in the dashed-line box 1502, that is, select a close-up object within the field of view range of the second camera lens.

For another example, the mobile phone may prompt the user to tap a target subject (for example, a person, an animal, a plant, or a substance) in a dashed-line box to select a close-up object. When the mobile phone detects an operation of tapping a location of a person on a panoramic image by the user, the person is a close-up object.

Figure 16A:
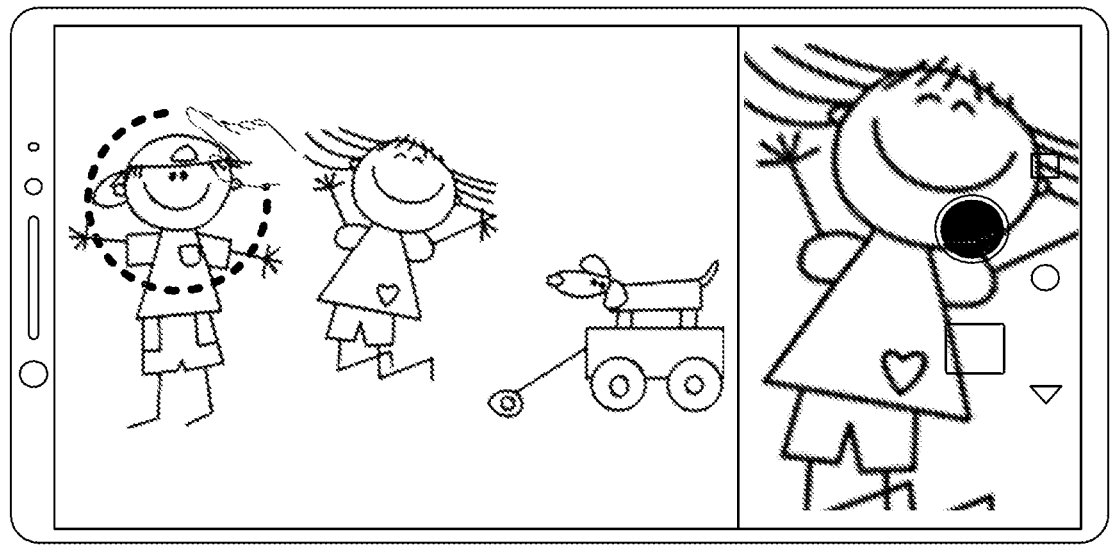
FIG. 16A(a) and FIG. 16A(b) are schematic diagrams of another group of interfaces according to an embodiment of this application.
Figure 16A:
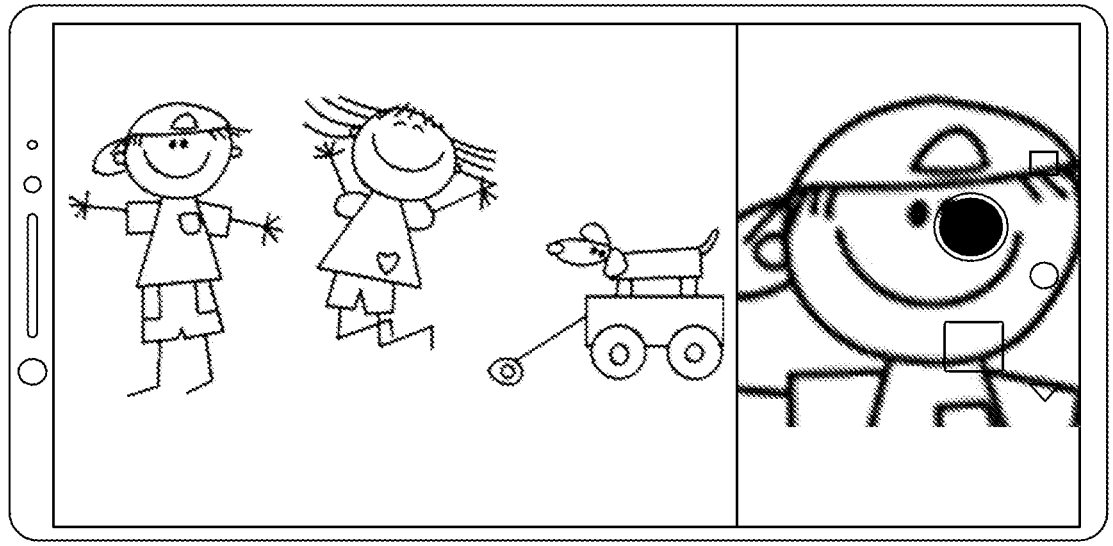

For another example, referring to FIG. 16A(a), when the mobile phone detects an operation of selecting an area on a panoramic image by the user, an object in the area is a close-up object. As shown in FIG. 16A(b), a close-up image is a zoomed-in image of the close-up object.

For another example, when the mobile phone detects an operation of selecting an area on a panoramic image by the user, the mobile phone identifies a primary shooting target in the area. The primary shooting target is a close-up object, and a close-up image is a zoomed-in image of the close-up object.

Figure 16B:
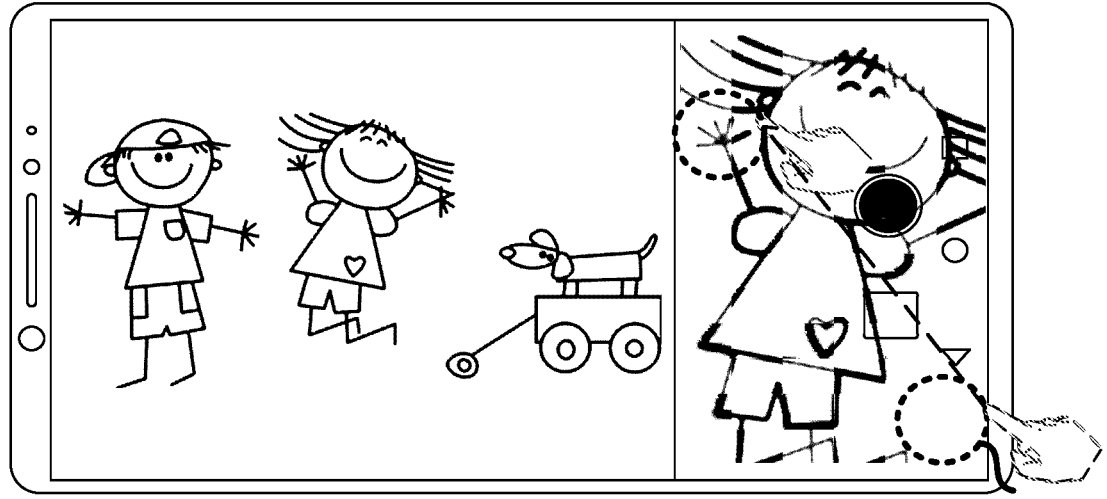
FIG. 16B(a) and FIG. 16b(b) are schematic diagrams of another group of interfaces according to an embodiment of this application.
Figure 16B:
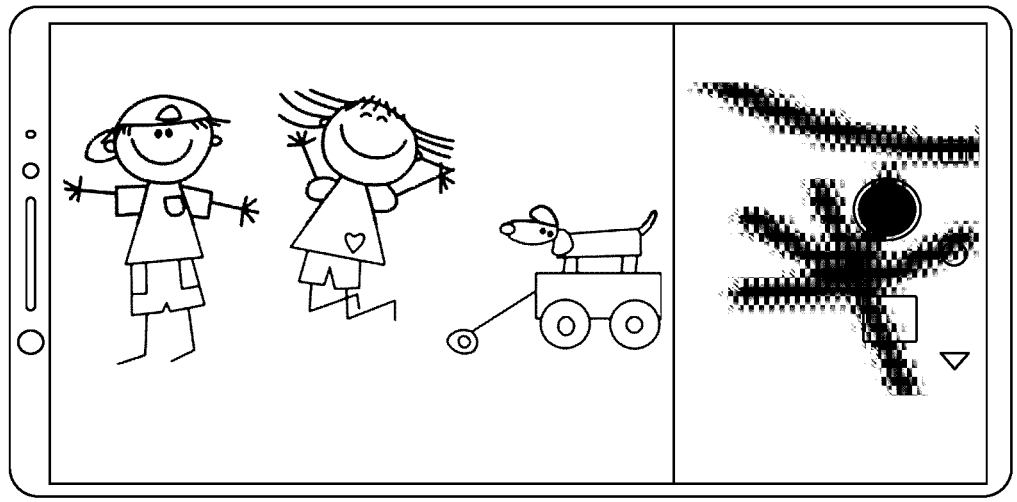
Figure 17A:
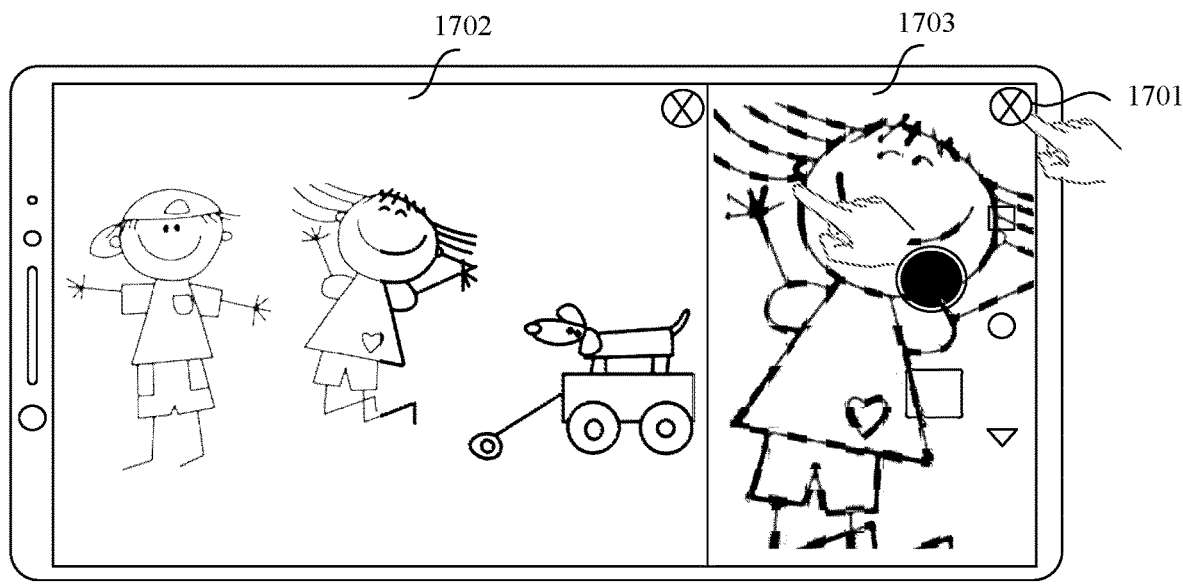
FIG. 17(a), FIG. 17(b), FIG. 17(c), and FIG. 17(d) are schematic diagrams of another group of interfaces according to an embodiment of this application.
Figure 17B:
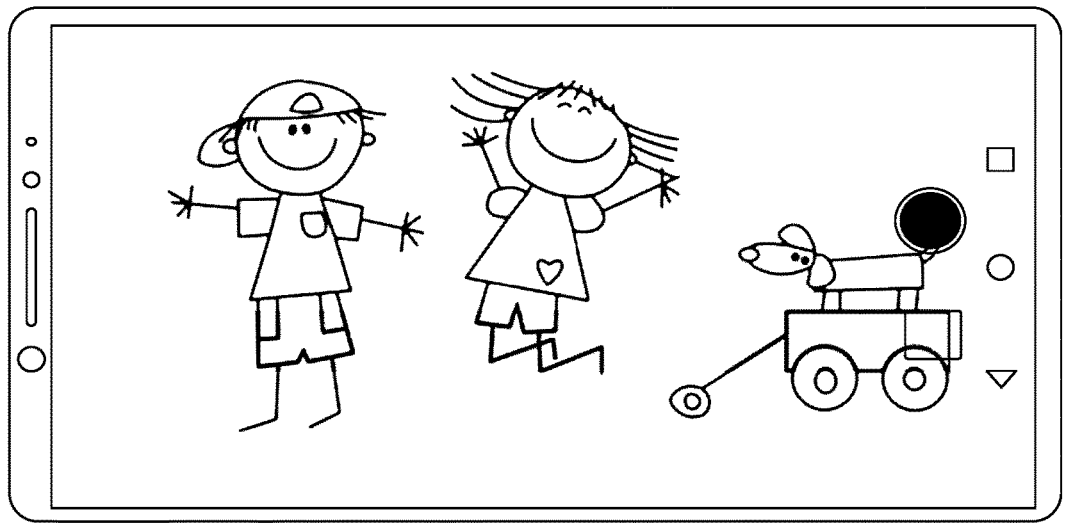
Figure 17C:
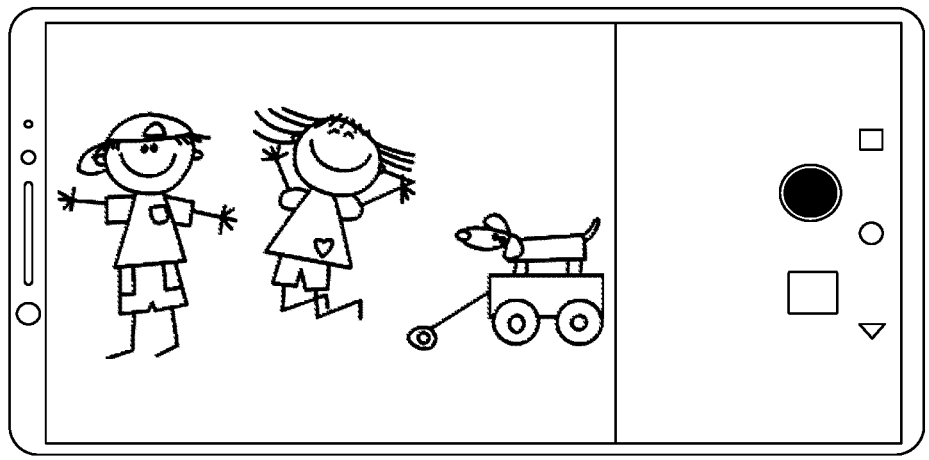
Figure 17D:
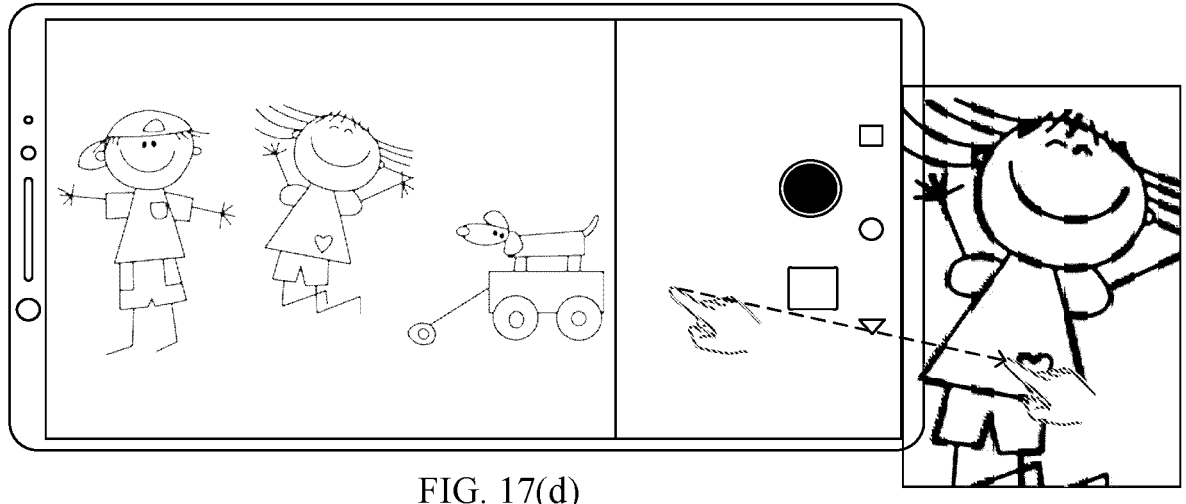

In addition, similar to specifying a close-up object on a panoramic image, the user may further specify a close-up object on a close-up image. Details are not described herein again. For example, referring to FIG. 16B(a), when the mobile phone detects an operation of dragging a control 1601 to a location on a close-up image and releasing the control by the user, a photographed object corresponding to the location is a close-up object. As shown in FIG. 16B(b), a close-up image is a zoomed-in image of the close-up object.

In some other embodiments, in the preview state of the multi-channel video recording mode, when N camera lenses are simultaneously used to acquire images, the mobile phone may further stop, according to an instruction of the user, displaying an image in at least one area, or display only images in M (M is a positive integer less than N) areas, to dynamically display one or more channels of images that the user wants to focus on. The images in the M areas may adaptively fully occupy the entire display interface. Alternatively, the M areas are still retained in an original layout, and an area that is instructed to stop displaying an image is a blank area, or displays a preset background image, a desktop background, or the like.

For example, referring to FIG. 17(*a*), a "×" control is disposed in an area in which each channel of image is located. When the mobile phone detects that the user taps a "×" control 1701, the mobile phone may display only an image in an area 1702, and stop displaying an image in an area 1703. In addition, as shown in FIG. 17(*b*), the image in the area 1701 adaptively fully occupies the entire touchscreen (that is, fully occupies the display area of the entire touchscreen). Alternatively, as shown in FIG. 17(*c*), a size of the area 1702 remains unchanged. Specifically, in one case, the mobile phone stops displaying the image in the area, but a camera lens corresponding to the area continues to acquire an image. In another case, the mobile phone stops displaying the image in the area, and the camera lens corresponding to the area stops acquiring an image.

For another example, referring to FIG. 17(*d*), if the mobile phone detects an operation of dragging, by the user, the image in the area 1703 to a boundary and keeping dragging, the phone stops displaying the image in the area 1703, as shown in FIG. 17(*b*) or FIG. 17(*c*).

In another embodiment, the mobile phone may further hide some controls in the preview interface in the multi-channel video recording mode, to avoid as much as possible that a preview image is blocked by the controls, thereby improving visual experience of the user. For example, when the user taps a control 207 shown in FIG. 2(*c*), the mobile phone may stop displaying a row of controls such as "wide-aperture", "video recording", "photographing", "multi-channel video recording", and "more". After an operation of tapping the touchscreen by the user is detected, the hidden controls may be resumed to be displayed. For another example, if a control in the interface is not tapped by the user for preset duration, the mobile phone may hide the control in the interface, to avoid as much as possible that a preview image is blocked by the control. After an operation of tapping the touchscreen by the user is detected, the hidden control may be resumed to be displayed.

In some other embodiments, in the preview state of the multi-channel video recording mode, the user may further adjust parameters such as a video resolution, a filter effect, and whether to use a flash. For example, the video resolution is resolution of an entire image displayed on the touchscreen, and the resolution corresponds to an aspect ratio of N areas after splicing. When an image obtained after the N areas are spliced fully occupies the display area of the touchscreen, the resolution corresponds to an aspect ratio of the display area of the touchscreen. For example, when the resolution is 5210×3840, 3968×2976, or 3264×2448, the aspect ratio of the display area of the touchscreen is 4:3. When the resolution is 3968×1984 or 3264×1632, the aspect ratio of the display area in the touchscreen is 18:9. When the resolution is 2560×1080 or 1680×720, the aspect ratio of the display area in the touchscreen is 21:9. When the resolution is 2976×2976, the aspect ratio of the display area of the touchscreen is 1:1. For another example, the user may set a resolution corresponding to an image acquired by each different camera lens, and the resolution corresponds to an aspect ratio of an area in which the image acquired by the camera lenses is displayed in the interface.

For example, as shown in FIG. 7(*a*), the multi-channel video recording preview interface may include a control 702, and the user may set different filter effects by using the control 702. For example, the filter effects may include a black-and-white effect, a whiteboard effect, a posterization effect, a negative effect, and the like.

In the preview state of the multi-channel video recording mode, after detecting a shooting instruction operation of the user, the mobile phone starts to record a plurality of channels of videos, displays a shooting screen, and saves acquired video images. The shooting screen may include N channels of images simultaneously acquired by N camera lenses.

Figure 18A:
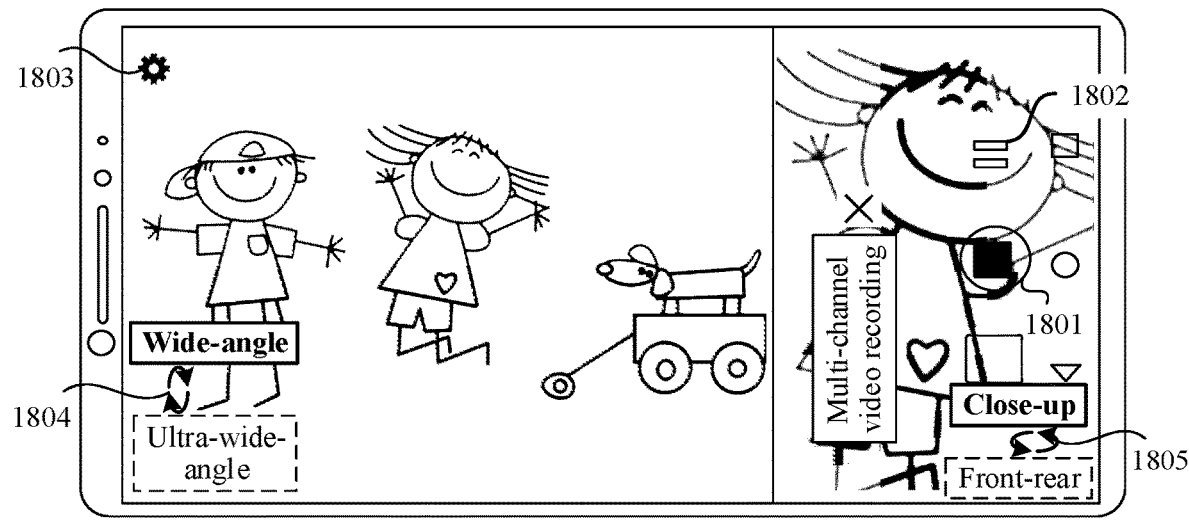
FIG. 18A(a) and FIG. 18A(b) are schematic diagramS of another group of interfaces according to an embodiment of this application.
Figure 18A:
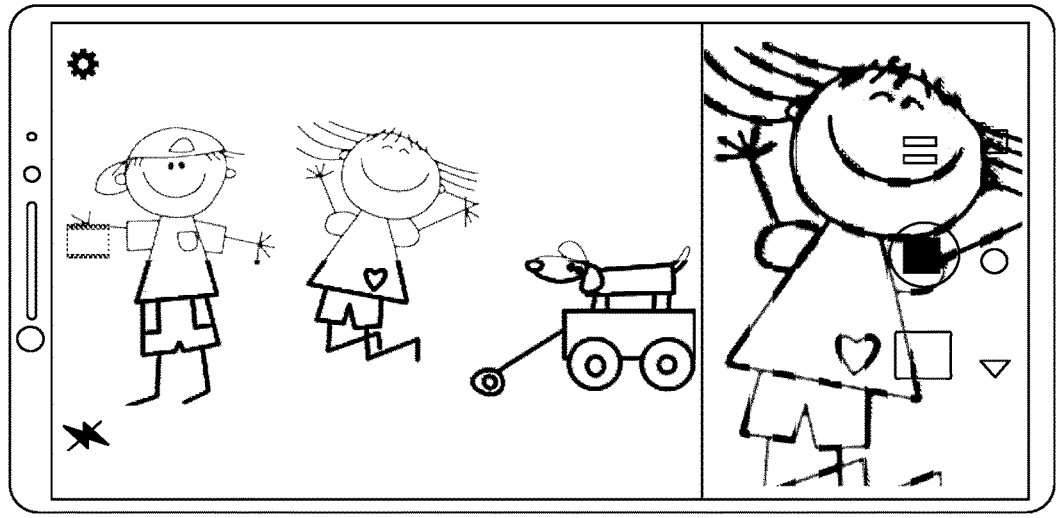

For example, in the close-up mode, when detecting that the user taps a shooting control 603 shown in FIG. 6A, the mobile phone may display a shooting screen shown in FIG. 18A(a) or FIG. 18A(b). The shooting screen includes a panoramic image and a close-up image, a control 1801 for controlling video recording to end, and a control 1802 for controlling video recording to pause.

Specifically, in a multi-channel video recording process, the mobile phone may continue to use the N camera lenses used in the preview state to acquire images, and display, on the shooting screen by using a display style used in the preview state, images simultaneously acquired by the N camera lenses in the video recording process.

In some embodiments, similar to a manner in which the user sets, in the multi-channel video recording preview state, a camera lens, a display style, or a recording mode used for multi-channel video recording, in a multi-channel video recording process, the user may further change at least one of the camera lens, the display style, or the recording mode used for multi-channel video recording. In one case, in the current video recording process, the mobile phone may dynamically switch to using at least one of a changed-to camera lens, display style, or recording mode to continue the multi-channel video recording. In other words, in a process in which the user changes the camera lens, the display style, or the recording mode, the mobile phone continuously performs the video recording. In another case, the mobile phone may pause the video recording in a process in which the user changes at least one of the camera lens, the display style, or the recording mode used for the multi-channel video recording, and continue the current video recording after the changing is completed. The current video recording process includes a plurality of channels of videos recorded based on the camera lens, the display style, or the recording mode before the changing, and a plurality of channels of videos recorded based on a changed-to camera lens, display style, or recording mode.

For example, similar to the multi-channel video recording preview interface, as shown in FIG. 18A(a) and FIG. 18A(b), a setting control 1803 may be displayed on the shooting screen. After detecting an operation of tapping the setting control 1803 by the user, the mobile phone may display the setting interface shown in FIG. 7(*a*) and FIG. 7(*b*), so that the user conveniently changes a camera lens or a display style. For another example, similar to the multi-channel video recording preview interface, a camera lens setting control, a display style setting control, or the like may be displayed on the shooting screen, so that the user may change a camera lens or a display style.

In some other embodiments, similar to the multi-channel video recording preview interface, a switching control 1804 and a switching control 1805 may be further displayed on the shooting screen. After detecting an operation of tapping the switching control 1804 by the user, the mobile phone switches a camera lens used to acquire a panoramic image to the ultra-wide-angle camera lens or the wide-angle camera lens. After detecting an operation of tapping the switching control 1805 by the user, the mobile phone performs switching between the close-up mode and the front-rear mode.

In some other embodiments, similar to the multi-channel video recording preview state, in a multi-channel video recording process in the close-up mode, the mobile phone may further dynamically change a close-up object according to an instruction of the user, and continue current video recording based on a changed-to close-up object. For example, when a close-up image is a central area, the close-up object may be changed by moving the mobile phone. In this way, a same generated multi-channel video may include an image of the changed-from close-up object and an image of a changed-to close-up object.

In some other embodiments, similar to the multi-channel video recording preview state, in a multi-channel video recording process in the close-up mode, the mobile phone may further change a zoom ratio of a close-up image according to an instruction of the user, and continue current video recording based on a changed-to zoom ratio. In this way, a same multi-channel video generated by the mobile phone may include close-up images at different zoom ratios.

Specifically, similar to the multi-channel video recording preview state, when zoom ratios of close-up images are different, second camera lenses used to provide the close-up images are also different. For example, similar to the cases shown in FIG. 13(a), FIG. 13(b), FIG. 13(c), and FIG. 13(d), when a zoom ratio of a close-up image is within the range of [the second preset value, 1), the second camera lens may be the ultra-wide-angle camera lens. When a zoom ratio of a close-up image is within the range of [1, the first preset value), the second camera lens may be the wide-angle camera lens. When a zoom ratio of a close-up image is greater than or equal to the first preset value, the second camera lens may be the long-focus camera lens.

Similar to the multi-channel video recording preview state, a close-up image may be a central area of an image acquired by the second camera lens, or a zoomed-in image of the central area.

Figure 18B:
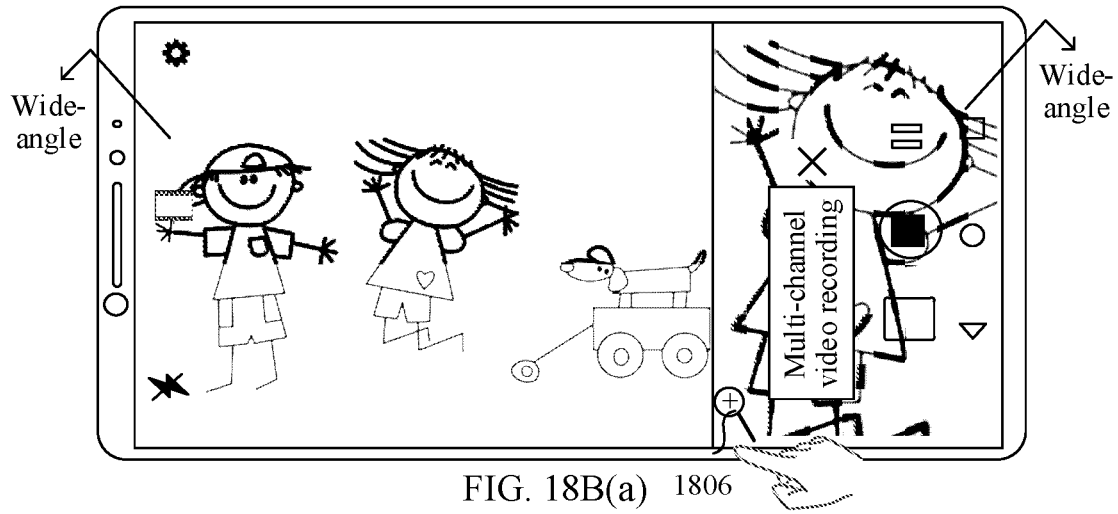
FIG. 18B(a), FIG. 18B(b), and FIG. 18B(c) is a schematic diagram of another group of interfaces according to an embodiment of this application.
Figure 18B:
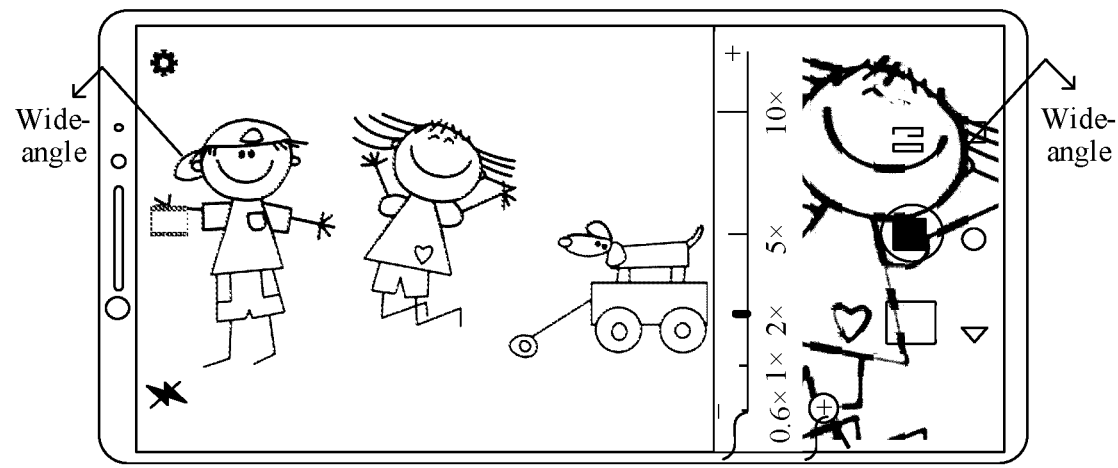
Figure 18B:
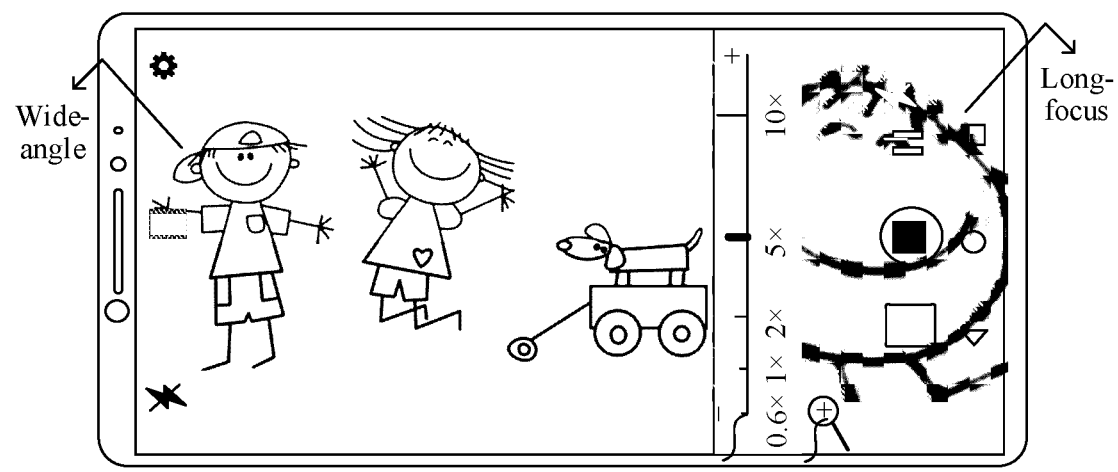

For example, in a multi-channel video recording process shown in FIG. 18B(a), a panoramic image is from the wide-angle camera lens, a zoom ratio of a close-up image is 2, and the close-up image is a zoomed-in image of a central area of an image acquired by the wide-angle camera lens. If the mobile phone detects an operation of tapping a control 1806 by the user, the mobile phone increases a zoom ratio of the close-up image, that is, zooms in the close-up image. As shown in FIG. 18B(b) and FIG. 18B(c), the zoom ratio changes from 2 to 5 on a zoom scale 1807. The mobile phone switches to the long-focus camera lens to acquire a close-up image, and the close-up image is a central area of an image acquired by the long-focus camera lens. For a zoomed-in close-up image, refer to FIG. 18B(c).

In some other embodiments, similar to the multi-channel video recording preview state, in a multi-channel video recording process, the mobile phone may further stop displaying an image in at least one area according to an instruction of the user, or display only images in M (M is an integer less than N) areas, to dynamically display one or more channels of images that the user wants to focus on.

In another embodiment, similar to the multi-channel video recording preview state, in a multi-channel video recording process, the mobile phone may further hide some controls (for example, the setting control 1801 and the wide-aperture control) on the shooting screen, to avoid as much as possible that a preview image is blocked by the controls, thereby improving visual experience of the user. After an operation of tapping the touchscreen or the like by the user to instruct to display the controls is detected, the hidden controls are displayed again.

In some other embodiments, in a multi-channel video recording process, the mobile phone may further generate, according to an instruction operation of the user, a photo by using images currently acquired by N camera lenses, so that the user can save and extract a wonderful picture in time.

Figure 18C:
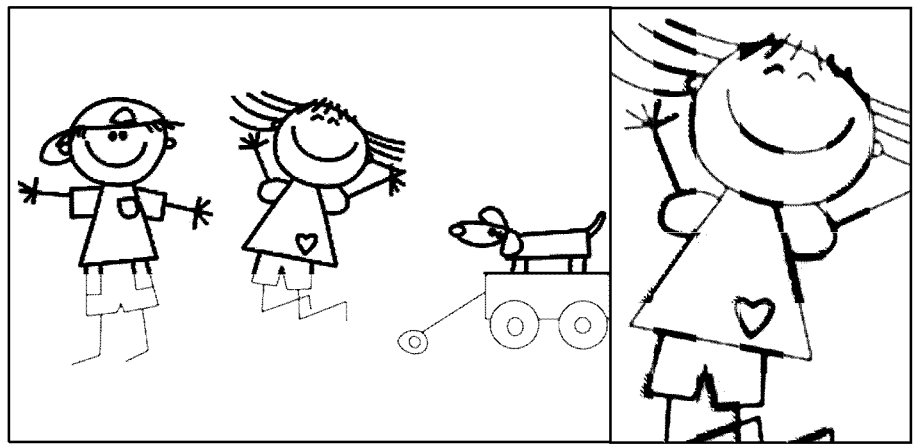
FIG. 18C is a schematic diagram of a photo generated in a multi-channel video recording process according to an embodiment of this application.
Figure 18D:
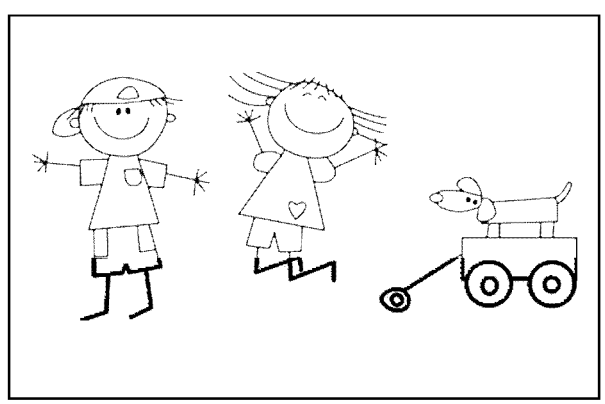
FIG. 18D is a schematic diagram of a group of photos generated in a multi-channel video recording process according to an embodiment of this application.
Figure 18D:
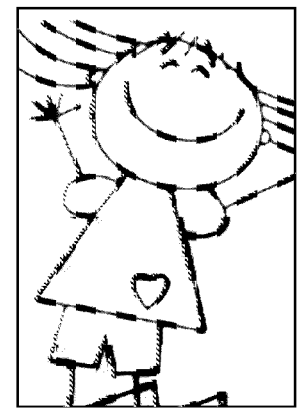

For example, in a case shown in FIG. 18B(a), if the mobile phone detects a double-tap operation performed by the user on the touchscreen, currently acquired images are saved in a photo form. In one case, the mobile phone saves one photo shown in FIG. 18C. In another case, the mobile phone saves two photos shown in (a) and (b) in FIG. 18D.

For another example, in a case shown in FIG. 18B(a), if the mobile phone detects a double-tap operation performed by the user on the panoramic image, the current panoramic image is saved in a photo form. If the mobile phone detects a double-tap operation performed by the user on the close-up image, the current close-up image is saved in a photo form.

Figure 19:
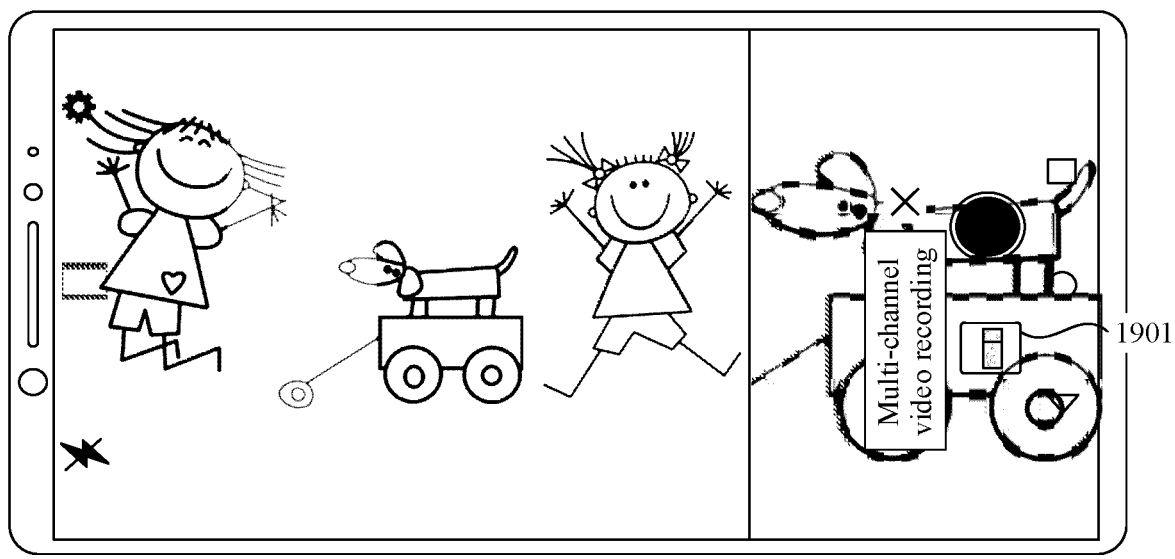
FIG. 19 is a schematic diagram of another interface according to an embodiment of this application.

After detecting an end instruction operation of the user, the mobile phone ends current video recording, and generates a multi-channel video file. For example, after detecting that the user taps an end control 1801 shown in FIG. 18A(a), the mobile phone stops a current video recording process. As shown in FIG. 19, a thumbnail of the generated video file may be displayed in an area shown by a control 1901. In addition, the mobile phone enters the multi-channel video recording preview state again.

After starting to record a plurality of channels of images, the mobile phone may save images acquired during video recording and a multi-channel video file that is generated after the video recording ends.

In some embodiments, the mobile phone may composite a plurality of frames of images acquired by N camera lenses at a same moment into one frame of video image, and then save the composited video image, to save a plurality of channels of videos recorded by the N camera lenses as one video file.

In some other embodiments, the mobile phone may associate a plurality of frames of images acquired by N camera lenses at a same moment, and save, as a video file, a respective image acquired by each camera lens.

In some other embodiments, frame rates of image acquisition of the N camera lenses are the same. The mobile phone may save, as a video file, a respective image acquired by each of the N camera lenses. Quantities of image frames in all video files are the same, and N video files corresponding to the N camera lenses are associated.

Specifically, for an image acquired by a camera lens, the mobile phone may further perform processing such as ISP processing, video post-processing, and video encoding before generating a video file.

Figure 20A:
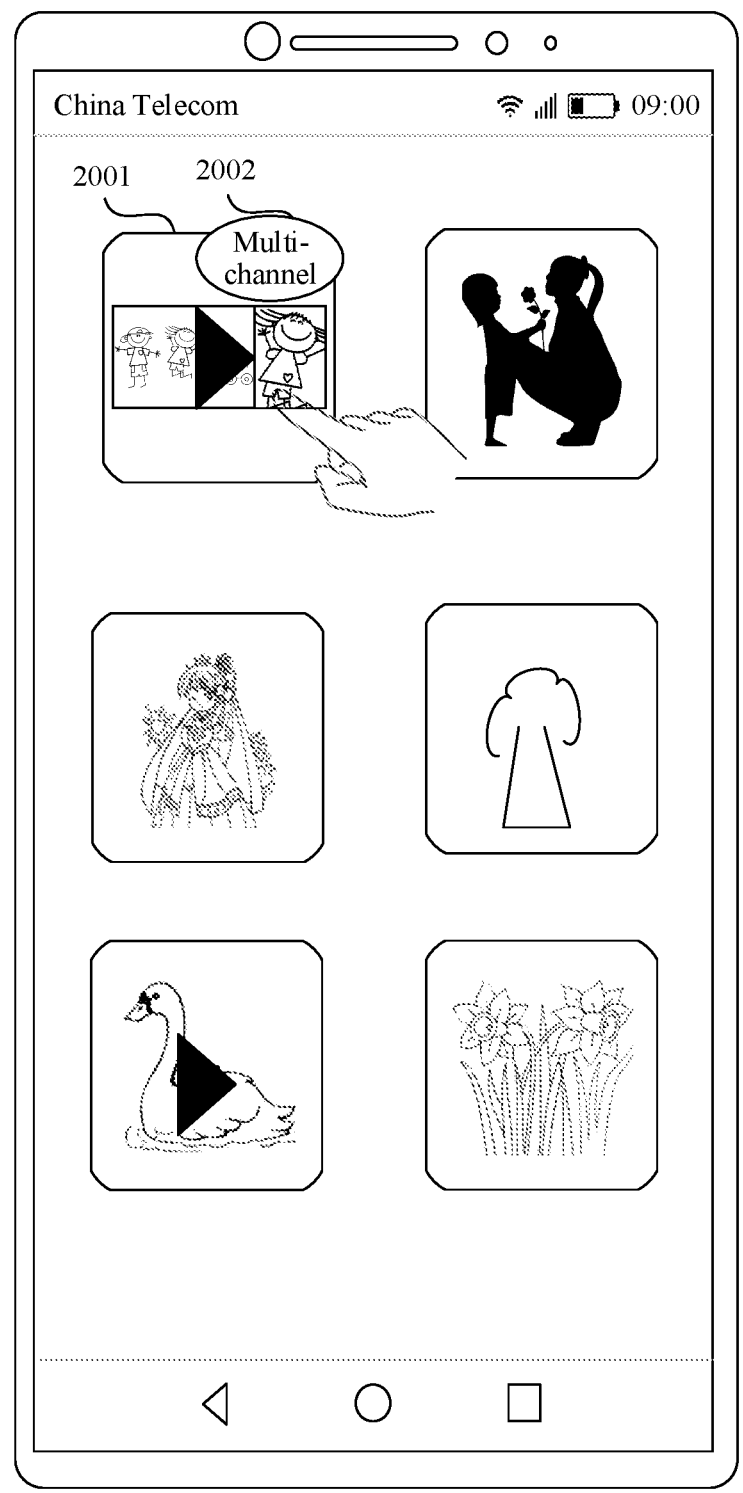
FIG. 20(a), FIG. 20(b), and FIG. 20(c) are schematic diagrams of another group of interfaces according to an embodiment of this application.
Figure 20B:
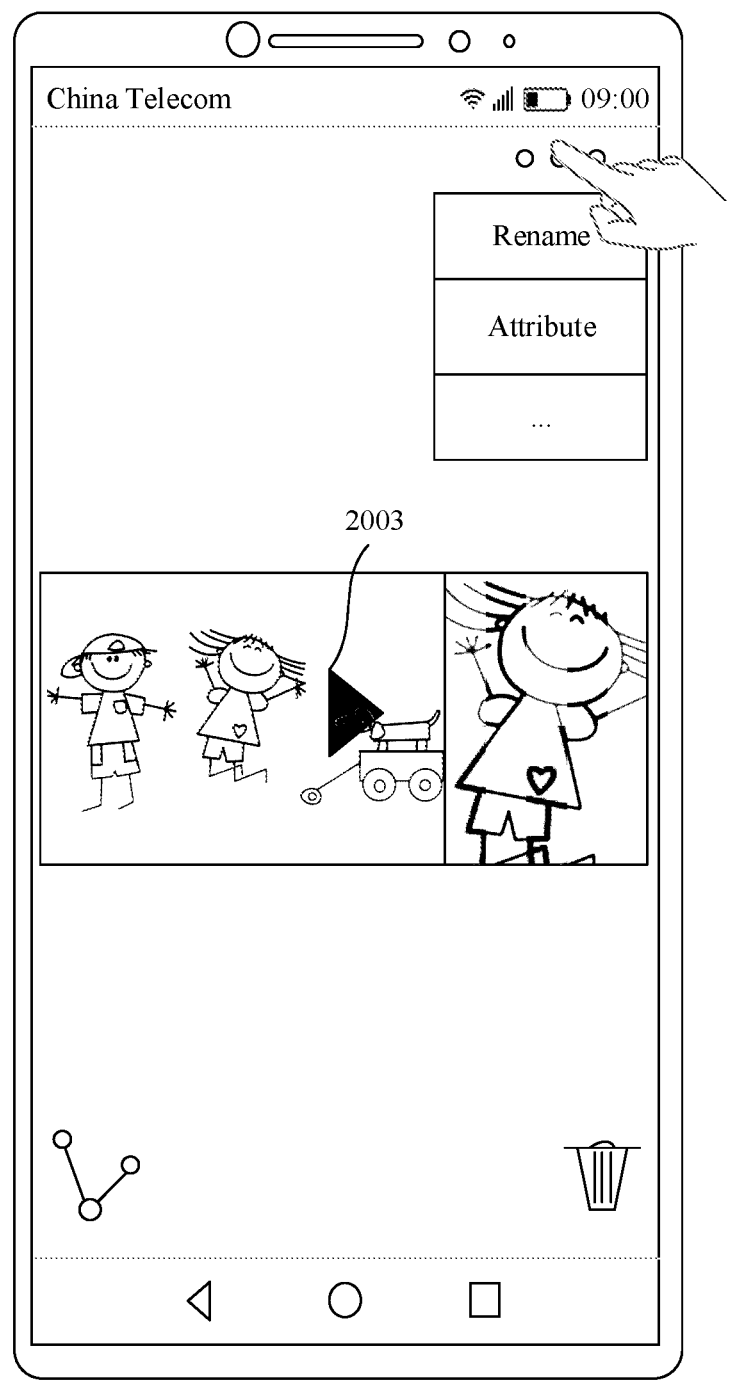
Figure 20C:
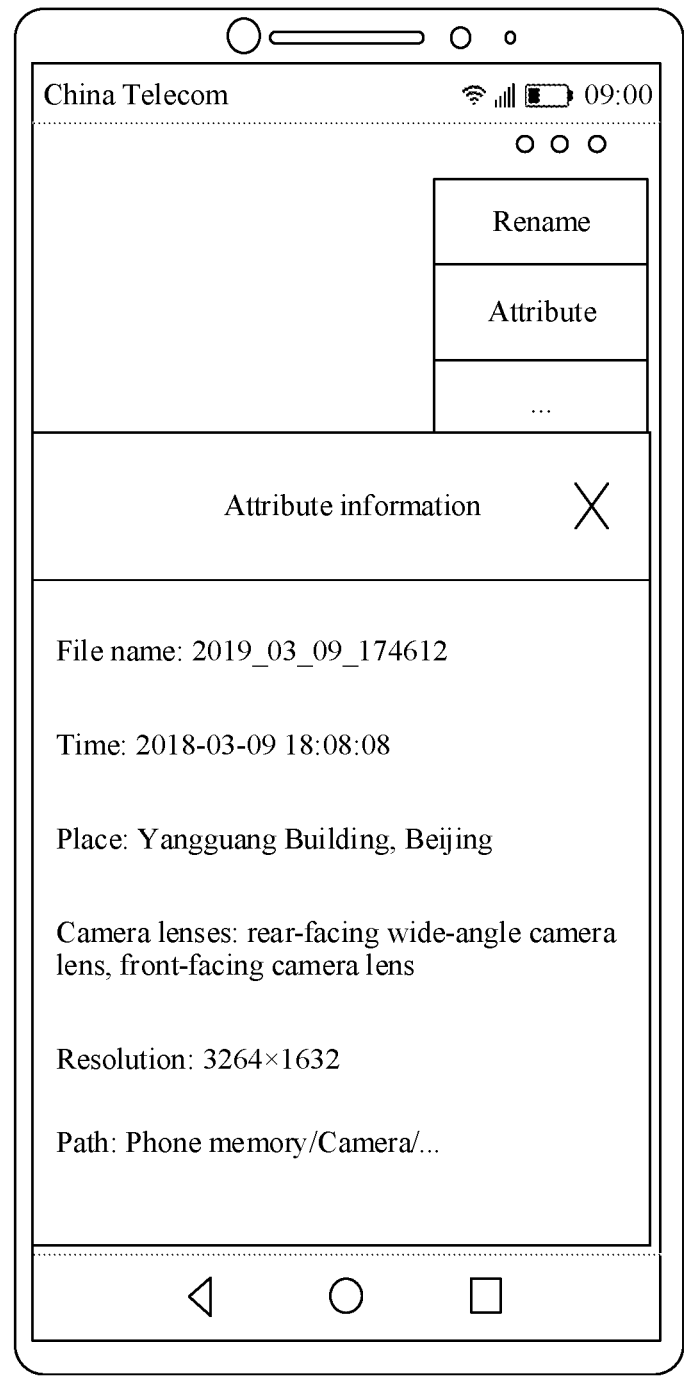

In some embodiments, for the generated multi-channel video file, the thumbnail of the multi-channel video file may be displayed in a display style used when the video recording starts. In some other embodiments, the mobile phone may mark the saved multi-channel video file, so that the user conveniently learns that a plurality of channels of videos are recorded in the video file. For example, referring to FIG. 20(a), a tag 2002 is displayed on a thumbnail 2001 of a multi-channel video file. In some other embodiments, the mobile phone may separately store a generated multi-channel video file in a particular folder, so that the user conveniently manages and searches for the multi-channel video file. In addition, as shown in FIG. 20(b) and FIG. 20(c), when detecting that the user views an attribute of a multi-channel video file, the mobile phone may display parameter information of a plurality of channels of videos, for example, camera lenses and a display style that are used when the plurality of channels of videos are recorded, or another video file associated with the current video file. If the user changes a camera lens in a video recording process, the parameter information may further include a correspondence between a recording time and changed-from and changed-to camera lenses. If the user changes a display style in the video recording process, the parameter information may further include a correspondence between a recording time and changed-from and changed-to display styles.

After a multi-channel video file is obtained through shooting, the mobile phone may play a plurality of channels of shot videos.

The mobile phone may play the plurality of channels of videos depending on a specific situation of the generated video file. For example, corresponding to the foregoing saving of the multi-channel video file, if a video file is a video file generated by using image frames into which a plurality of channels of images are composited, that is, each frame of image in the video file includes N sub-images, and the N sub-images are respectively from the N camera lenses, the mobile phone may directly play the composited image frames. If a video file includes a plurality of frames of associated images simultaneously acquired by different camera lenses, when playing a plurality of channels of videos, the mobile phone displays the plurality of frames of associated images in a same interface based on a display style. If a plurality of video files are associated, the mobile phone plays a plurality of channels of videos based on the plurality of associated video files.

Figure 21:
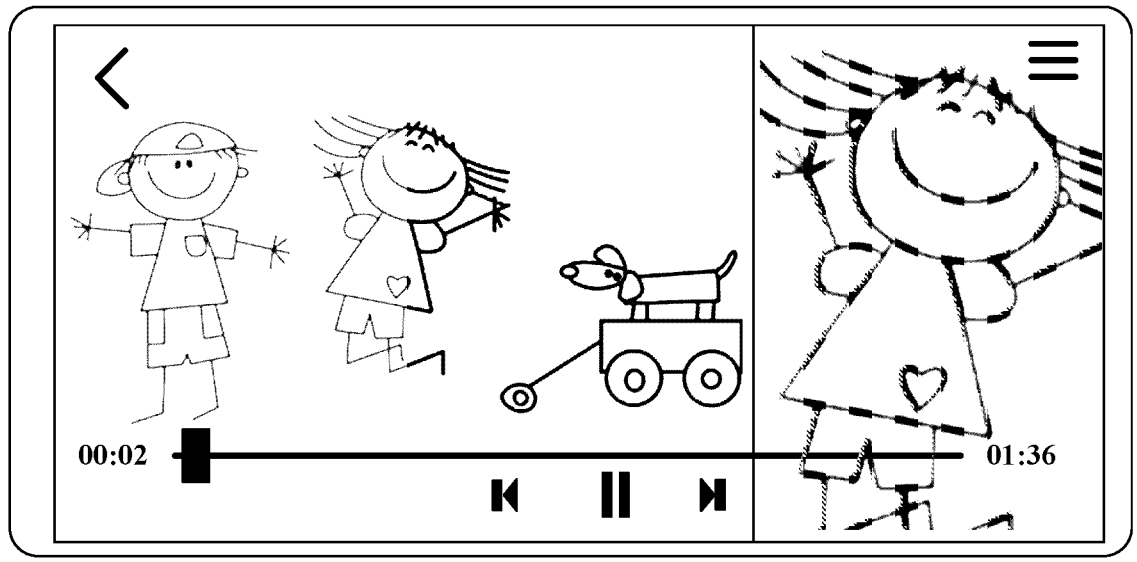
FIG. 21 is a schematic diagram of another interface according to an embodiment of this application.

In some embodiments, when playing a plurality of channels of videos, the mobile phone may play video images by using a display style that is the same as that used in a video recording process. For example, after detecting an operation of tapping, by the user, a player control 2003 displayed in FIG. 20(b), the mobile phone may play a plurality of channels of videos, and display a playing interface shown in FIG. 21.

In some other embodiments, when playing a plurality of channels of videos, the mobile phone may alternatively play video images based on a display style that is specified by the user and that is different from that in a video recording process. For example, the user may set a display style by using the interface shown in FIG. 7(a) and FIG. 7(b). If a quantity n1 (a positive integer) of areas included in the display style specified by the user is less than a quantity n2 (a positive integer) of areas included in the display style used during recording, the mobile phone plays and displays only n1 channels of images. If the quantity n1 of areas included in the display style specified by the user is greater than the quantity n2 of areas included in the display style used during recording, the mobile phone plays and displays only n2 channels of images. The remaining n1−n2 areas are blank, or display a desktop background, or repeatedly display (n1−n2) channels of images in the n2 areas.

In some other embodiments, when playing a plurality of channels of videos, the mobile phone may further stop, according to an instruction of the user, displaying an image in one or more areas, or display only an image in one or more areas.

In some other embodiments, when playing a plurality of channels of videos, the mobile phone may further save, in a photo form according to an instruction of the user, an image that is being displayed in a current playing process, so that the user conveniently extracts and shares a wonderful moment.

In addition, in some other embodiments, in a multi-channel video recording process, the mobile phone may acquire images by using N camera lenses, and display only one channel of image by default, but generate a video file of a plurality of channels of videos corresponding to the N camera lenses. Then, the mobile phone may play the plurality of channels of videos based on a preset display style or a display style specified by the user. For example, in the front-rear mode, the mobile phone displays only a rear image on the entire touchscreen by default, so that the user can more clearly see a recording status behind the mobile phone. However, a generated video includes the rear image and a front image.

In some other embodiments, when a single channel of video is recorded in the video recording mode (the single-channel video recording mode), if the mobile phone detects an operation of tapping the "multi-channel video recording" control by the user, the mobile phone enters the multi-channel video recording mode and continues a current video recording process. Similarly, when a plurality of channels of videos are recorded in the multi-channel video recording mode (for example, in a case shown in FIG. 18A(a) and FIG. 18(b)), if the mobile phone detects an operation of tapping the "video recording" control by the user, the mobile phone enters the multi-channel video recording mode and continues a current recording process. In other words, after the video recording ends, a video obtained by the mobile phone may include two parts: a single-channel video and a multi-channel video.

In some embodiments, in a preview process or a video recording process of multi-channel video recording, N images that are acquired by N camera lenses and are simultaneously displayed in the interface of the mobile phone may be images acquired by the N camera lenses at a same moment. In some other embodiments, N images that are acquired by N camera lenses and are simultaneously displayed in the interface of the mobile phone may alternatively be images acquired by the N camera lenses in a same period T. For example, the N camera lenses are the wide-angle camera lens and the long-focus camera lens, and the wide-angle camera lens and the long-focus camera lens acquire images based on a preset period T. In the same period T, the wide-angle camera lens first acquires an image 1, and then the long-focus camera lens acquires an image 2. Images displayed in the interface of the mobile phone include the image 1 and the image 2. When the acquired images are saved, the images acquired by the N camera lenses in the same period are associated, and may be composited into one frame of video image for storage.

The foregoing embodiments are described by using an example in which the mobile phone performs multi-channel video recording by using N camera lenses. In another embodiment, the mobile phone may further perform multi-channel photographing by using N camera lenses, to record images corresponding to different ranges or different definitions at a same moment or in a same scene, or record images of a photographer and a photographed object at a same moment or in a same scene. Similar to multi-channel video recording, the mobile phone may simultaneously display, in the interface and based on a display style, a plurality of channels of images acquired by the N camera lenses and save the plurality of channels of images. Details are not described herein again. For example, for a photographing preview interface in a multi-channel photographing mode, refer to FIG. 22.

Figure 23A:
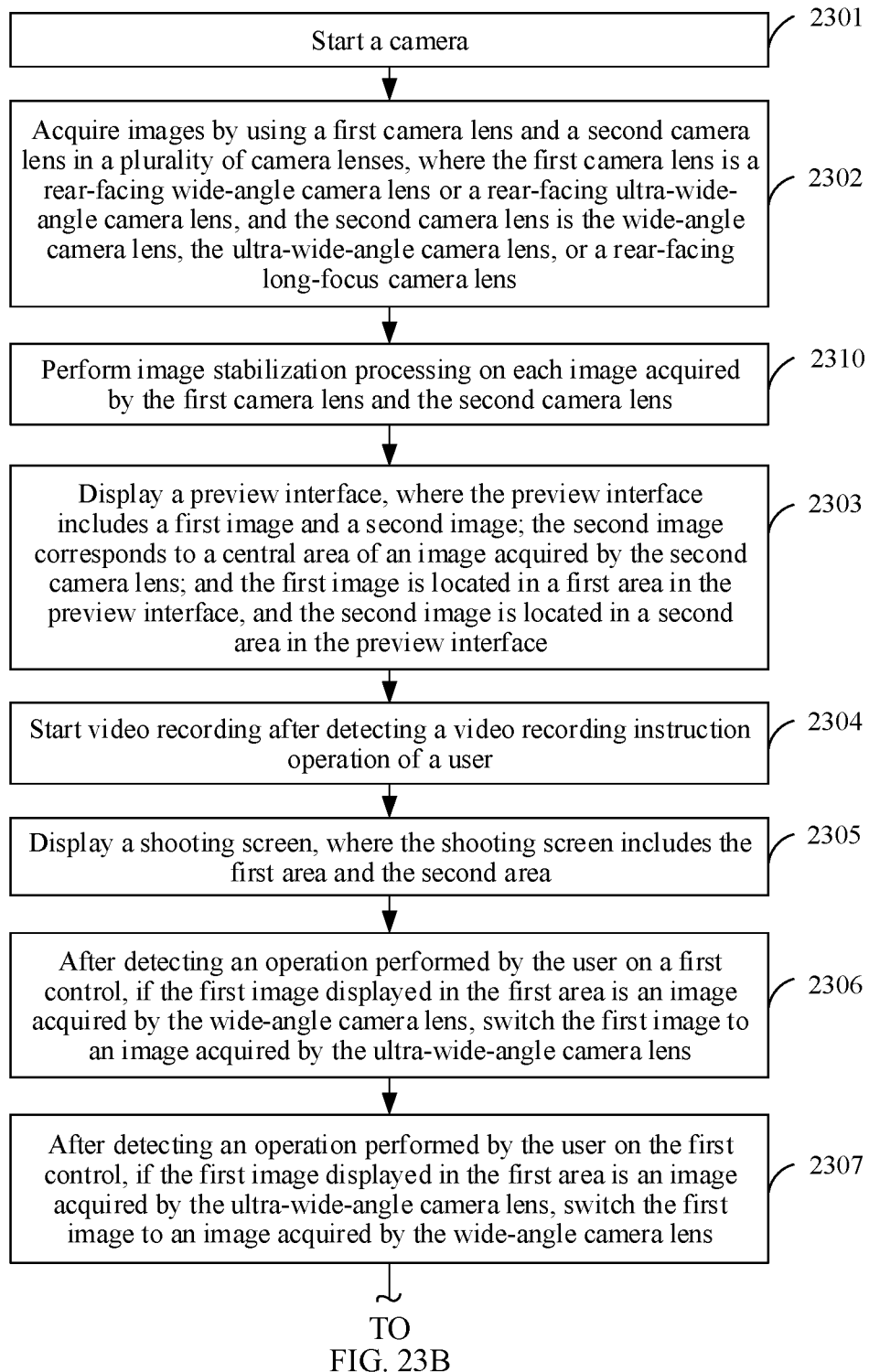

With reference to the foregoing embodiments and corresponding accompanying drawings, another embodiment of this application provides a multi-channel video recording method. The method may be implemented on an electronic device having a structure shown in FIG. 1. The electronic device may include a display screen and a plurality of camera lenses. Referring to FIG. 23A and FIG. 23B, the method may include the following operations.

Operation 2301. The electronic device starts a camera.

For example, the electronic device may start the camera after detecting that a user taps the control 201 shown in FIG. 2(*a*).

Operation 2302. The electronic device acquires images by using a first camera lens and a second camera lens in the plurality of camera lenses, where the first camera lens is a rear-facing wide-angle camera lens or a rear-facing ultra-wide-angle camera lens, and the second camera lens is the wide-angle camera lens, the ultra-wide-angle camera lens, or a rear-facing long-focus camera lens.

Operation 2303. The electronic device displays a preview interface, where the preview interface includes a first image and a second image; the first image is an image acquired by the first camera lens, the second image is from the second camera lens, and the second image corresponds to a central area of an image acquired by the second camera lens; and the first image is located in a first area in the preview interface, and the second image is located in a second area in the preview interface.

Specifically, the second image may be the central area of the image acquired by the second camera lens, or the second image is a zoomed-in image of the central area of the image acquired by the second camera lens.

For example, the preview interface may be the interface shown in FIG. 2(*c*), FIG. 6A, FIG. 6B, or the like. A first object may be a little girl who is jumping. The first area may be the area 205 shown in FIG. 2(*c*), and the second area may be the area 206 shown in FIG. 2(*c*). The first image may be a panoramic image displayed in the first area. The second image may be a close-up image displayed in the second area, and the close-up image is an image of the little girl who is jumping.

Operation 2304. The electronic device starts video recording after detecting a video recording instruction operation of a user.

For example, after detecting that the user taps the shooting control 603 shown in FIG. 6A, the electronic device may determine that the user instructs to record videos, and therefore start video recording.

Operation 2305. The electronic device displays a shooting screen, where the shooting screen includes the first area and the second area.

For example, the shooting screen may be the interface shown in FIG. 18A(a) and FIG. 18A(b) or FIG. 18B(a), FIG. 18B(b), and FIG. 18B(c). A panoramic image on the shooting screen is in the first area, and a close-up image on the shooting screen is in the second area.

In the solution described in operations 2301 to 2305, the electronic device may simultaneously record images by using the long-focus camera lens and the wide-angle camera lens or the ultra-wide-angle camera lens that have different fields of view, to obtain a panoramic image and a close-up image that correspond to different ranges and different zoom-in levels at a same moment or in a same scene, to present more abundant image information to the user.

Because the user usually sets a focus object or a key object that the user is concerned about in a central area of a field of view, an image of the focus object or the key object is usually presented in a central area of an image acquired by the second camera lens. In this embodiment of this application, when the close-up image is the central area of the image acquired by the second camera lens, a close-up picture of the focus object or the key object may be presented to the user, to provide the user with detail information of the focus object or the key object.

In some embodiments, an aspect ratio of the first area is equal to an image output ratio of a photosensitive element of the first camera lens, so that it can be ensured that the panoramic image has a maximum field of view. In addition, an area formed after the first area and the second area are spliced fully occupies a display area of the display screen. In this way, the display screen can be used to a maximum extent to present the images to the user.

In some other embodiments, the preview interface includes a first control, and the method may further include the following operations:

Operation 2306. After detecting an operation performed by the user on the first control, if the first image displayed in the first area is an image acquired by the wide-angle camera lens, the electronic device switches the first image to an image acquired by the ultra-wide-angle camera lens.

Operation 2307. After the electronic device detects an operation performed by the user on the first control, if the first image displayed in the first area is an image acquired by the ultra-wide-angle camera lens, the electronic device switches the first image to an image acquired by the wide-angle camera lens.

For example, the first control may be the control 601 shown in FIG. 6A. The first image acquired by the wide-angle camera lens may be the panoramic image shown in FIG. 6A, and the first image acquired by the ultra-wide-angle camera lens may be the panoramic image shown in FIG. 6E.

In some other embodiments, the preview interface includes a second control, and the method may further include the following operations.

Operation 2308. The plurality of camera lenses included in the electronic device further include a front-facing camera lens. After detecting an operation performed by the user on the second control, the electronic device switches the second image displayed in the second area to an image acquired by the front-facing camera lens.

For example, the second control may be the control 602 shown in FIG. 6A. The second image displayed in the second area may be the close-up image shown in FIG. 6A. The image acquired by the front-facing camera lens and displayed in the second area may be the front image shown in FIG. 6C.

Operation 2309. If detecting a further operation performed by the user on the second control, the electronic device switches, to the second image, the image that is acquired by the front-facing camera lens and that is displayed in the second area.

In some other embodiments, before operation 2303, the method may further include the following operation:

Operation 2310. The electronic device performs image stabilization processing on each image acquired by the first camera lens and the second camera lens.

In this way, the electronic device may obtain a clear image through image stabilization processing, and then display the clear image.

In some other embodiments, the method may further include the following operation:

Operation 2311. The electronic device adjusts a video resolution after detecting a preset operation of the user, where the video resolution corresponds to an aspect ratio of an area formed after the first area and the second area are spliced.

For descriptions of the video resolution, refer to related descriptions in the foregoing embodiments. Details are not described herein again.

In some other embodiments, the shooting screen includes a third control, and the method may further include the following operations:

Operation 2312. The electronic device adjusts a zoom ratio of the second image in the second area after detecting an operation performed by the user on the third control.

If an adjusted zoom ratio is equal to 1, the second camera lens is the wide-angle camera lens, and the second image is a central area of the image acquired by the wide-angle camera lens. If an adjusted zoom ratio is greater than 1 and less than a first preset value, the second camera lens is the wide-angle camera lens, and the second image is a zoomed-in image of a central area of the image acquired by the wide-angle camera lens. If an adjusted zoom ratio is equal to the first preset value, the second camera lens is the long-focus camera lens, and the second image is a central area of an image acquired by the long-focus camera lens. If an adjusted zoom ratio is greater than the first preset value, the second camera lens is the long-focus camera lens, and the second image is a zoomed-in image of a central area of an image acquired by the long-focus camera lens. If an adjusted zoom ratio is less than 1 and greater than a second preset value, the second camera lens is the ultra-wide-angle camera lens, and the second image is a zoomed-in image of a central area of the image acquired by the ultra-wide-angle camera lens. If an adjusted zoom ratio is equal to the second preset value, the second camera lens is the ultra-wide-angle camera lens, and the second image is a central area of the image acquired by the ultra-wide-angle camera lens.

In other words, the electronic device may switch the second camera lens to the wide-angle camera lens, the long-focus camera lens, or the ultra-wide-angle camera lens based on different zoom ratios.

For example, the third control may be the control 1806 shown in FIG. 18B(a), the control 1807 shown in FIG. 18B(b), or the like.

Operation 2313. The electronic device displays the second image in the second area based on an adjusted zoom ratio.

For example, for a schematic diagram of an effect corresponding to a zoom ratio adjustment in a video recording process, refer to the close-up image shown in FIG. 18B(a), FIG. 18B(b), and FIG. 18B(c). Similarly, for a schematic diagram of an effect corresponding to a zoom ratio adjustment in a preview state, refer to the close-up image shown in FIG. 13(*a*), FIG. 13(*b*), FIG. 13(*c*), and FIG. 13(*d*).

In some other embodiments, the method may further include the following operations.

Operation 2314. The electronic device stops video recording after detecting an end instruction operation of the user.

For example, after detecting that the user taps the end control 1801 shown in FIG. 18A(a), the electronic device stops a current video recording process.

Operation 2315. The electronic device generates a video file.

In some embodiments, each frame of image in the video file includes a first sub-image and a second sub-image, the first sub-image is the first image, and the second sub-image is the second image or the image acquired by the front-facing camera lens in the plurality of camera lenses.

In some other embodiments, before operation 2303, the electronic device may splice the first sub-image and the second sub-image, and then display the first sub-image and the second sub-image.

After splicing the sub-images, the electronic device may further perform processing such as encoding by using an encoder, and then generate a video file.

Operation 2316. The electronic device displays a playing interface after detecting a playing operation performed by the user on the video file, where the playing interface includes the first area and the second area.

Figure 22:
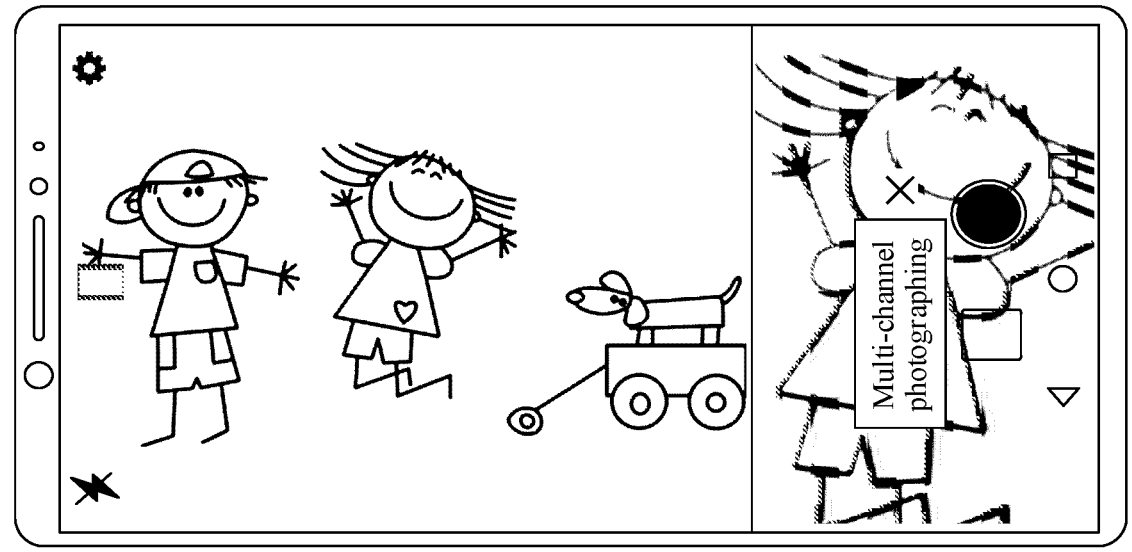
FIG. 22 is a schematic diagram of another interface according to an embodiment of this application.

For example, the playing interface may be the interface shown in FIG. 22. An image of a little boy, a little girl, a toy vehicle, and a puppy that are adjacent is displayed in the first area, and a zoomed-in image of the little girl is displayed in the second area.

It should be noted that the foregoing description is mainly made by using an example in which a rear panoramic image is displayed on a left side of the interface, and a rear close-up image and a front image are displayed on a right side of the interface. Display locations of the rear panoramic image, the rear close-up image, and the front image are not specifically limited in this embodiment of this application. For example, alternatively, the rear panoramic image may be displayed on the right side of the interface, and the rear close-up image and the front image may be displayed on the left side of the interface.

Another embodiment of this application provides an electronic device, including one or more camera lenses, configured to acquire an image; one or more display screens, configured to display an interface; one or more processors; one or more memories; and one or more computer programs, where the one or more computer programs are stored in the memory, and the one or more computer programs include an instruction; and when the instruction is executed by the processor, the electronic device is enabled to perform the multi-channel video recording method in the foregoing embodiment.

For example, when the electronic device is the mobile phone shown in FIG. 1, the processor in the electronic device may be the processor 110 in FIG. 1, the memory may be the internal memory 121 in FIG. 1, the display screen may be the display screen 194 in FIG. 1, and the N camera lenses may be the camera lens 193 in FIG. 1. The one or more computer programs are stored in the internal memory 121, and the one or more computer programs include an instruction. When the instruction is executed by the processor 110, the mobile phone is enabled to perform the multi-channel video recording method in the foregoing embodiment.

An embodiment of this application further provides a computer storage medium, where the computer storage medium stores a computer instruction, and when the computer instruction is run on an electronic device, the electronic device is enabled to perform the foregoing related operations to implement the multi-channel video recording method in the foregoing embodiment.

An embodiment of this application further provides a computer program product, where when the computer program product is run on a computer, the computer is enabled to perform the foregoing related operations to implement the multi-channel video recording method in the foregoing embodiment.

In addition, an embodiment of this application further provides an apparatus. The apparatus may be specifically a chip, a component, or a module. The apparatus may include a processor and a memory that are connected. The memory is configured to store a computer-executable instruction. When the apparatus runs, the processor may execute the computer-executable instruction stored in the memory, to enable the chip to perform the multi-channel video recording method in the foregoing method embodiments.

The electronic device, the computer storage medium, the computer program product, and the chip provided in the embodiments of this application are all configured to perform the related method provided above. Therefore, for beneficial effects that can be achieved by the electronic device, the computer storage medium, the computer program product, and the chip, refer to beneficial effects in the corresponding method provided above. Details are not described herein again.

Based on the description of the foregoing implementation manners, a person skilled in the art may clearly understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor to perform all or some of the operations of the methods described in the embodiments of this application. The foregoing storage medium includes: any medium that can store program code, such as a USB flash drive, a removable hard disk, a read-only memory (ROM), a random access memory ( ), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A video recording method, applied to an electronic device having a display screen and a plurality of cameras, comprising:
   launching, by the electronic device, a camera application;
   acquiring, by the electronic device, images by using a first camera and a second camera in the plurality of cameras, wherein the first camera is a rear-facing camera, and the second camera is a front-facing camera;
   displaying, by the electronic device, a preview interface of the camera application, wherein the preview interface comprises a first image and a second image, the first image is an image acquired by the first camera, the second image is an image acquired by the second camera, and the second image is displayed in a floating manner on the first image;
   adjusting, by the electronic device, a zoom ratio of the first image after detecting an operation performed on a zoom control;
   starting, by the electronic device, video recording after detecting a video recording instruction operation;
   displaying, by the electronic device, a shooting screen, wherein the shooting screen comprises the first image and the second image, and
   generating, by the electronic device, a video file wherein each frame in the video file comprises a first sub-image and a second sub-image, the first sub-image being the first image, and the second image sub-image being the second image.

2. The method of claim 1, further comprising:
   stopping, by the electronic device, video recording after detecting an end instruction operation of a user; and
   displaying, by the electronic device, a playing interface after detecting a playing operation performed by the user on the video file, wherein the playing interface comprises the first image and the second image.

3. The method of claim 1, further comprising:
   receiving, by the electronic device, an operation of tapping a switching control; and
   acquiring, by the electronic device, images by using the first camera and a third camera in the plurality of cameras, wherein the third camera is a rear-facing camera.

4. The method of claim 3, wherein the first camera is a wide-angle camera and the third camera is a long-focus camera.

5. The method of claim 3, wherein the first camera and the third camera have different fields of view.

6. The method of claim 1, further comprising:
   stopping, by the electronic device, video recording after detecting an end instruction operation of a user;
   generating, by the electronic device, a first video file and a second video file, wherein the first video file is recorded by the first camera, the second video file is recorded by the second camera; and
   storing, by the electronic device, the first video file and the second video file.

7. The method of claim 6, wherein the first video file and the second video file include a same quantity of image frames.

8. The method of claim 1, further comprising:
   adjusting, by the electronic device, a zoom ratio of the first image displayed on the shooting screen after detecting an operation performed on a zoom control.

9. A video recording method, applied to an electronic device having a display screen and at least two cameras, comprising:

starting, by the electronic device, a camera application;

acquiring, by the electronic device, images by using the at least two cameras;

displaying, by the electronic device, a first preview interface of the camera application, wherein the first preview interface comprises N preview areas, wherein each of the N preview areas is used to display a preview image acquired, N is a positive integer greater than or equal to 2;

stopping display, by the electronic device, at least one preview image in the N preview areas after detecting a first operation of a user;

displaying, by the electronic device, a second preview interface of the camera application, wherein the second preview interface comprises M preview areas, wherein each of the M preview areas is used to display a preview image acquired, M preview areas fully occupies a display area of the display screen, M is a positive integer greater than or equal to 2 and M is less than or equal to N;

starting, by the electronic device, video recording after detecting a video recording instruction operation; and displaying, by the electronic device, a shooting screen, wherein the shooting screen comprises M areas;

stopping, by the electronic device, video recording after detecting an end instruction operation of a user; and generating, by the electronic device, a video file.

10. The method of claim 9, wherein the M preview areas comprises a first image and a second image; the first image is an image acquired by a first camera, the second image is an image acquired by a second camera.

11. The method of claim 10, wherein the second image is displayed in a floating manner on the first image.

12. The method of claim 10, further comprising:

displaying, by the electronic device, the first image and the second image in a spliced style.

13. The method of claim 10, wherein the first camera is a wide-angle camera and the second camera is a long-focus camera.

14. The method of claim 9, wherein the M preview areas comprises a first image and a second image; the first image and the second image are acquired by one camera.

15. An electronic device, comprising:

a non-transitory memory comprising instructions; and a processor coupled to the non-transitory memory, the instructions being executed by the processor to cause the electronic device to:

launch a camera application;

acquire images by using a first camera and a second camera, wherein the first camera is a rear-facing camera, and the second camera is a front-facing camera;

display a preview interface of the camera application, wherein the preview interface comprises a first image and a second image, the first image is an image acquired by the first camera, the second image is an image acquired by the second camera, and the second image is displayed in a floating manner on the first image;

adjust a zoom ratio of the first image after detecting an operation performed on a zoom control;

start video recording after detecting a video recording instruction operation;

display a shooting screen, wherein the shooting screen comprises the first image and the second image, and generate a video file, wherein each image frame in the video file comprises a first sub-image and a second sub-image, the first sub-image being the first image, and the second sub-image being the second image.

16. The electronic device of claim 15, wherein the instructions further cause the electronic device to:

stop video recording after detecting an end instruction operation of a user; and display a playing interface after detecting a playing operation performed by the user on the video file, wherein the playing interface comprises the first image and the second image.

17. The electronic device of claim 16, wherein the instructions further cause the electronic device to:

receive an operation of tapping a switching control; and acquire images by using the first camera and a third camera of a plurality of cameras, wherein the third camera is a rear-facing camera.

18. The electronic device of claim 17, wherein the first camera and the third camera have different fields of view.

19. The electronic device of claim 15, wherein the instructions further cause the electronic device to:

stop video recording after detecting an end instruction operation of a user;

generate a first video file and a second video file, wherein the first video file is recorded by the first camera, the second video file is recorded by the second camera; and store the first video file and the second video file.

20. The electronic device of claim 15, wherein the instructions further cause the electronic device to:

display a zoom ruler in response to detecting the operation performed on the zoom control, wherein the zoom ratio of the zoom ruler comprises 1×, 2×, 5×, and 10×.

* * * * *

UNITED STATES PATENT AND TRADEMARK OFFICE
CERTIFICATE OF CORRECTION

PATENT NO. : 11,765,463 B2  
APPLICATION NO. : 17/440406  
DATED : September 19, 2023  
INVENTOR(S) : Yuanyou Li, Wei Luo and Jieguang Huo Page 1 of 1

It is certified that error appears in the above-identified patent and that said Letters Patent is hereby corrected as shown below:

In the Claims

Column 40, Claim 1, Line 28, delete "second image sub-image" and insert --second sub-image--.

Column 41, Claim 9, Line 2-3, delete "at least two cameras" and insert --a plurality of cameras--.

Signed and Sealed this  
Twentieth Day of May, 2025

Coke Morgan Stewart  
*Acting Director of the United States Patent and Trademark Office*